(12) United States Patent
Markoski et al.

(10) Patent No.: US 8,163,429 B2
(45) Date of Patent: Apr. 24, 2012

(54) HIGH EFFICIENCY FUEL CELL SYSTEM

(75) Inventors: Larry J. Markoski, Raleigh, NC (US); Dilip Natarajan, Cary, NC (US)

(73) Assignee: INI Power Systems, Inc., Cary, NC (US)

( * ) Notice: Subject to any disclaimer, the term of this patent is extended or adjusted under 35 U.S.C. 154(b) by 305 days.

(21) Appl. No.: 12/366,529

(22) Filed: Feb. 5, 2009

(65) Prior Publication Data
US 2010/0196800 A1    Aug. 5, 2010

(51) Int. Cl.
*H01M 8/06* (2006.01)
(52) U.S. Cl. ........ 429/448; 429/443; 429/447; 429/428; 429/408; 429/415
(58) Field of Classification Search .................. None
See application file for complete search history.

(56) References Cited

U.S. PATENT DOCUMENTS

| | | |
|---|---|---|
| 3,357,861 A | 12/1967 | Hunger |
| 3,849,275 A | 11/1974 | Candor |
| 3,902,916 A | 9/1975 | Warszawski |
| 3,992,223 A | 11/1976 | Gutbier |
| 4,066,526 A | 1/1978 | Yeh |
| 4,311,594 A | 1/1982 | Perry |
| 4,614,575 A | 9/1986 | Juda et al. |
| 4,652,504 A | 3/1987 | Ando |
| 4,722,773 A | 2/1988 | Plowman et al. |
| 4,732,822 A | 3/1988 | Wright et al. |
| 4,732,823 A | 3/1988 | Ito et al. |
| 4,783,381 A | 11/1988 | Tytgat et al. |
| 5,185,218 A | 2/1993 | Brokman et al. |
| 5,290,414 A | 3/1994 | Marple |
| 5,316,629 A | 5/1994 | Clifford et al. |
| 5,413,881 A | 5/1995 | Licht et al. |
| 5,534,120 A | 7/1996 | Ando et al. |
| 5,599,638 A | 2/1997 | Surampudi et al. |
| 5,648,183 A | 7/1997 | Licht et al. |
| 5,846,670 A | 12/1998 | Watanabe |
| 5,858,567 A | 1/1999 | Spear, Jr. et al. |
| 5,863,671 A | 1/1999 | Spear, Jr. et al. |
| 5,952,118 A | 9/1999 | Ledjeff et al. |
| 6,007,931 A | 12/1999 | Fuller et al. |
| 6,013,385 A | 1/2000 | DuBose |
| 6,024,848 A | 2/2000 | Dufner et al. |
| 6,039,853 A | 3/2000 | Gestermann et al. |
| 6,054,427 A | 4/2000 | Winslow |

(Continued)

FOREIGN PATENT DOCUMENTS
CA        2 473 329       10/2009
(Continued)

OTHER PUBLICATIONS
Machine translation of KR 10-2008-0045416, retrived from <http://kposd.kipo.go.kr:8088/up/kpion/> on Nov. 23, 2011.*
(Continued)

*Primary Examiner* — Cynthia Lee
(74) *Attorney, Agent, or Firm* — Evan Law Group LLC

(57) ABSTRACT

A fuel cell comprises an anode comprising an anode catalyst, a cathode comprising a gas diffusion electrode and a cathode catalyst on the gas diffusion electrode, a microfluidic channel contiguous with the anode, and a liquid comprising fuel in the channel. The concentration of the fuel in the liquid is 0.05-0.5 M.

18 Claims, 23 Drawing Sheets

U.S. PATENT DOCUMENTS

| | | | |
|---|---|---|---|
| 6,103,413 A | 8/2000 | Hinton et al. | |
| 6,110,613 A | 8/2000 | Fuller | |
| 6,136,272 A | 10/2000 | Weigl et al. | |
| 6,242,123 B1 | 6/2001 | Nezu et al. | |
| 6,255,012 B1 | 7/2001 | Wilson et al. | |
| 6,312,846 B1 | 11/2001 | Marsh et al. | |
| 6,432,918 B1 | 8/2002 | Winslow | |
| 6,437,011 B2 | 8/2002 | Steck et al. | |
| 6,444,343 B1 * | 9/2002 | Prakash et al. | 429/493 |
| 6,447,943 B1 | 9/2002 | Peled et al. | |
| 6,472,091 B1 | 10/2002 | Konrad et al. | |
| 6,485,851 B1 * | 11/2002 | Narayanan et al. | 429/415 |
| 6,492,047 B1 | 12/2002 | Peled et al. | |
| 6,497,975 B2 | 12/2002 | Bostaph et al. | |
| 6,528,200 B1 * | 3/2003 | Yoshitake et al. | 429/480 |
| 6,607,655 B1 | 8/2003 | Lowe et al. | |
| 6,638,654 B2 | 10/2003 | Jankowksi et al. | |
| 6,641,948 B1 | 11/2003 | Ohlsen et al. | |
| 6,713,206 B2 | 3/2004 | Markoski et al. | |
| 6,715,899 B1 | 4/2004 | Wu | |
| 6,716,548 B1 | 4/2004 | Kaliaguine et al. | |
| 6,720,105 B2 | 4/2004 | Ohlsen et al. | |
| 6,727,016 B2 | 4/2004 | Bostaph et al. | |
| 6,808,840 B2 | 10/2004 | Mallari et al. | |
| 6,811,916 B2 | 11/2004 | Mallari et al. | |
| 6,852,443 B1 | 2/2005 | Ohlsen | |
| 6,871,844 B2 | 3/2005 | Yan et al. | |
| 6,890,680 B2 | 5/2005 | Beckmann et al. | |
| 6,893,763 B2 | 5/2005 | Fan et al. | |
| 6,911,411 B2 | 6/2005 | Cox et al. | |
| 6,924,058 B2 | 8/2005 | Ohlsen et al. | |
| 6,960,285 B2 | 11/2005 | Schoeniger et al. | |
| 7,014,944 B2 | 3/2006 | Kordesch et al. | |
| 7,067,216 B2 | 6/2006 | Yan et al. | |
| 7,087,333 B2 * | 8/2006 | Schafer | 429/444 |
| 7,090,793 B2 | 8/2006 | Ma et al. | |
| 7,205,064 B2 | 4/2007 | Markoski et al. | |
| 7,252,898 B2 | 8/2007 | Markoski et al. | |
| 7,635,530 B2 | 12/2009 | Kenis et al. | |
| 7,651,797 B2 | 1/2010 | Markoski et al. | |
| 7,901,817 B2 | 3/2011 | Markoski et al. | |
| 8,119,305 B2 | 2/2012 | Markoski et al. | |
| 2001/0033960 A1 * | 10/2001 | Cavalca et al. | 429/40 |
| 2001/0041283 A1 | 11/2001 | Hitomi | |
| 2001/0053472 A1 | 12/2001 | Edlund | |
| 2002/0015868 A1 | 2/2002 | Surampudi et al. | |
| 2002/0028372 A1 | 3/2002 | Ohlsen et al. | |
| 2002/0031695 A1 | 3/2002 | Smotkin | |
| 2002/0041991 A1 | 4/2002 | Chan et al. | |
| 2002/0083640 A1 | 7/2002 | Finkelshtain et al. | |
| 2002/0091225 A1 | 7/2002 | McGrath et al. | |
| 2002/0127454 A1 | 9/2002 | Narang et al. | |
| 2003/0003336 A1 | 1/2003 | Colbow et al. | |
| 2003/0003341 A1 | 1/2003 | Kinkelaar et al. | |
| 2003/0003348 A1 | 1/2003 | Hanket | |
| 2003/0091883 A1 | 5/2003 | Peled et al. | |
| 2003/0096151 A1 | 5/2003 | Blunk et al. | |
| 2003/0134163 A1 | 7/2003 | Markoski et al. | |
| 2003/0148159 A1 | 8/2003 | Cox et al. | |
| 2003/0170524 A1 | 9/2003 | Kordesch et al. | |
| 2003/0175581 A1 | 9/2003 | Kordesch et al. | |
| 2003/0194598 A1 | 10/2003 | Chan | |
| 2003/0198852 A1 | 10/2003 | Masel et al. | |
| 2003/0219640 A1 | 11/2003 | Nam et al. | |
| 2003/0231004 A1 | 12/2003 | Takahashi et al. | |
| 2004/0018415 A1 | 1/2004 | Lai et al. | |
| 2004/0039148 A1 | 2/2004 | Cao et al. | |
| 2004/0045816 A1 | 3/2004 | Masel et al. | |
| 2004/0058217 A1 | 3/2004 | Ohlsen et al. | |
| 2004/0062965 A1 | 4/2004 | Morse et al. | |
| 2004/0072047 A1 | 4/2004 | Markoski et al. | |
| 2004/0084789 A1 | 5/2004 | Yan et al. | |
| 2004/0096721 A1 | 5/2004 | Ohlsen et al. | |
| 2004/0101740 A1 | 5/2004 | Sanders | |
| 2004/0115518 A1 | 6/2004 | Masel et al. | |
| 2004/0121208 A1 | 6/2004 | James et al. | |
| 2004/0121209 A1 | 6/2004 | Yan et al. | |
| 2004/0126666 A1 | 7/2004 | Cao et al. | |
| 2004/0151965 A1 | 8/2004 | Forte et al. | |
| 2004/0209153 A1 | 10/2004 | Peled et al. | |
| 2004/0209154 A1 | 10/2004 | Ren et al. | |
| 2004/0265681 A1 | 12/2004 | Markoski et al. | |
| 2005/0001352 A1 | 1/2005 | Ma et al. | |
| 2005/0003263 A1 | 1/2005 | Mallari et al. | |
| 2005/0008923 A1 | 1/2005 | Malhotra | |
| 2005/0026026 A1 | 2/2005 | Yen et al. | |
| 2005/0053826 A1 | 3/2005 | Wang et al. | |
| 2005/0074657 A1 | 4/2005 | Rusta-Sallehy et al. | |
| 2005/0084737 A1 | 4/2005 | Wine et al. | |
| 2005/0084738 A1 | 4/2005 | Ohlsen et al. | |
| 2005/0089748 A1 | 4/2005 | Ohlsen et al. | |
| 2005/0123812 A1 * | 6/2005 | Okamoto | 429/24 |
| 2005/0136309 A1 | 6/2005 | Masel et al. | |
| 2005/0161342 A1 | 7/2005 | Carson et al. | |
| 2005/0191541 A1 | 9/2005 | Gurau et al. | |
| 2005/0202305 A1 | 9/2005 | Markoski et al. | |
| 2005/0252784 A1 | 11/2005 | Choban et al. | |
| 2006/0003217 A1 | 1/2006 | Cohen et al. | |
| 2006/0035136 A1 | 2/2006 | Markoski et al. | |
| 2006/0040146 A1 | 2/2006 | Yamaguchi | |
| 2006/0040147 A1 | 2/2006 | Yamaguchi | |
| 2006/0059769 A1 | 3/2006 | Masel et al. | |
| 2006/0078785 A1 | 4/2006 | Masel et al. | |
| 2006/0088744 A1 | 4/2006 | Markoski et al. | |
| 2006/0141328 A1 | 6/2006 | Johnston et al. | |
| 2006/0147785 A1 | 7/2006 | Chiang et al. | |
| 2006/0210867 A1 | 9/2006 | Kenis | |
| 2006/0228622 A1 | 10/2006 | Cohen et al. | |
| 2007/0020491 A1 * | 1/2007 | Ogburn | 429/13 |
| 2007/0190393 A1 | 8/2007 | Markoski et al. | |
| 2008/0070083 A1 | 3/2008 | Markoski et al. | |
| 2008/0248343 A1 | 10/2008 | Markoski et al. | |
| 2008/0274393 A1 | 11/2008 | Markoski et al. | |
| 2009/0035644 A1 | 2/2009 | Markoski et al. | |
| 2010/0196800 A1 | 8/2010 | Markoski et al. | |
| 2011/0003226 A1 | 1/2011 | Markoski et al. | |
| 2011/0008713 A1 | 1/2011 | Markoski et al. | |

FOREIGN PATENT DOCUMENTS

| | | |
|---|---|---|
| EP | 0 252 559 | 6/1991 |
| EP | 0 664 930 B1 | 5/1996 |
| EP | 1 818 654 A1 | 8/2007 |
| EP | 1 819 004 A1 | 8/2007 |
| GB | 1018825 | 2/1966 |
| GB | 1 416 483 | 12/1975 |
| JP | 46-16452 | 5/1971 |
| JP | 63 313472 A | 12/1988 |
| JP | 4-284889 | 10/1992 |
| JP | 10-211447 A | 8/1998 |
| JP | 2005-515602 | 5/2005 |
| KR | 10-2008-0045416 * | 5/2008 |
| WO | WO 94/09524 | 4/1994 |
| WO | WO 96/12317 | 4/1996 |
| WO | WO 98/06145 | 2/1998 |
| WO | WO 00/15872 | 3/2000 |
| WO | WO 01/37357 | 5/2001 |
| WO | WO 01/39307 A2 | 5/2001 |
| WO | WO 01/54216 A2 | 7/2001 |
| WO | WO 01/94450 A2 | 12/2001 |
| WO | WO 02/11226 A2 | 2/2002 |
| WO | WO 03/002247 A1 | 1/2003 |
| WO | WO 03/009410 A2 | 1/2003 |
| WO | WO 03/061037 | 7/2003 |
| WO | WO 03/106966 A2 | 12/2003 |
| WO | WO 2004/027891 A2 | 4/2004 |
| WO | WO 2004/027901 A2 | 4/2004 |
| WO | WO 2005/001975 | 1/2005 |
| WO | WO 2005/004262 | 1/2005 |
| WO | WO 2005/082024 | 9/2005 |
| WO | WO 2005/088759 A2 | 9/2005 |
| WO | WO 2006/101967 | 9/2006 |
| WO | WO 2007013880 | 2/2007 |
| WO | WO 2007/095492 | 8/2007 |
| WO | WO 2008/122042 | 10/2008 |

OTHER PUBLICATIONS

Chen et al., "Ion exchange resin/polystyrene sulfonate composite membranes for PEM fuel cells", Journal of Membrane Science, 243, pp. 327-333, 2004.
Granados-Focil et al., "Polyphenylene Sulfonic Acid: a new PEM", http://www1.eere.energy.gov/hydrogenandfuelcells/pdfs/hi_tem_pems_talk.pdf, 26 pages, 2003.
Jiang et al., "$CO_2$ Crossover Through a Nafion Membrane in a Direct Methanol Fuel Cell", Electrochemical and Solid-State Letters, 5 (7), pp. A156-A159, 2002.
Service, "New Polymer May Rev Up the Output of Fuel Cells Used to Power Cars", Science, vol. 312, p. 35, 2006.
Thomas et al., "Fuel Cells—Green Power", Los Alamos National Laboratory, http://www.scied.science.doe.gov/nmsb/hydrogen/Guide%20to%20Fuel%20Cells.pdf, 36 pages, 1999.
Hejze et al., "Preparation of Pd-coated polymer electrolyte membranes and their application in direct methanol fuel cells", Journal of Power Sources, 140, pp. 21-27, 2005.
Kordesch et al., "Direct methanol-air fuel cells with membranes plus circulating electrolyte", Journal of Power Sources, 96, pp. 200-203, 2001.
Li et al., "An improved palladium-based DMFCs cathode catalyst", Chem. Commun., pp. 2776-2777, 2004.
Peled et al., "0.5 $W/cm^2$ Direct Methanol-Air Fuel Cell", Electrochemical and Solid-State Letters, 7 (12), pp. A507-A510, 2004.
Baker, "Membrane Technology," Encyclopedia of Polymer Science and Technology, vol. 3, pp. 184-249, 2001.
Kim et al., "Non-Naifion Membrane Electrode Assemblies", Los Alamos National Laboratory, http://www.hydrogen.energy.gov/pdfs/review06/fc_3_kim.pdf, pp. 1-24, 2005.
Shim et al., Naifion-impregnated polyethylene-terephthalate film used as the electrolyte for direct methanol fuel cells, Electrochimica Acta, 50, pp. 2385-2391, 2005.
"Celtec® V-Membrane for DMFC Applications", PEMAS Fuel Cell Technologies, 6 pages, printed Jul. 19, 2005.
Rozière et al., "Non-Fluorinated Polymer Materials for Proton Exchange Membrane Fuel Cells", Annu. Rev. Mater. Res., 33, pp. 503-555, 2003.
Shim et al., "Electrochemical Acceleration of Hydrogen Transfer Through a Methanol Impermeable Metallic Barrier", Journal of the Electrochemical Society, 150 (12), pp. A1583-A1588, 2003.
Tang et al., "Modification of Nafion™ membrane to reduce methanol crossover via self-assembled Pd nanoparticles", Materials Letters, 59, pp. 3766-3770, 2005.
Peled et al., "A Direct Methanol Fuel Cell Based on a Novel Low-Cost Nanoporous Proton-Conducting Membrane", Electrochemical and Solid-State Letters, 3 (12), pp. 525-528, 2000.
Peled et al., "Novel approach to Recycling Water and Reducing Water Loss in DMFCs", Electrochemical and Solid-State Letters, 6 (12), pp. A268-A271, 2003.
Blum et al., "Water-neutral micro direct-methanol fuel cell (DMFC) for portable applications", Journal of Power Sources, 117, pp. 22-25, 2003.
Zhu et al., "The behavior of palladium catalysts in direct formic acid fuel cells", Journal of Power Sources, 139, pp. 15-20, 2005.
Sigracet, GDL 24 & 25 Series Gas Diffusion Layer, product information, SGL Carbon Group, 2 pages, 2004.
Choi et al., "Modification of proton conducting membrane for reducing methanol crossover in a direct-methanol fuel cell", Journal of Power Sources, 96, pp. 411-414, 2001.
Pu et al., "A Methanol Impermeable Proton Conducting Composite Electrolyte System", Journal of the Electrochemical Society, 142, pp. L119-L120, 1995.
Kim et al., "Evaluation of a palladinized Nafion™ for direct methanol fuel cell application", Electrochimica Acta, 49, pp. 3227-3234, 2004.
Halliday. et al., "Fundamentals of Physics", Extended Third Edition, pp. 662-685, 1988.
OSMONICS The Filtration Spectrum, Osmonics, Inc., Minnetonka, Minnesota, 1 page, (1984).
Xia, S.J. et al., Proceedings of the $207^{th}$ Meeting of the Electrochemical Society, Abstract #779, Quebec City, Canada, May 21-25, 2005.
Choban, E.R. et al., "Microfluidic Fuel Cells That Lack a PEM", Power Sources Proceedings, vol. 40, pp. 317-320, (2002).
Choban, E.R. et al., "Membraneless Fuel Cell Based on Laminar Flow," ASME Fuel Cell Science, Engineering and Technology Proceedings, pp. 261-265, (2003).
Ferrigno, R. et al., "Membraneless Vanadium Redox Fuel Cell Using Laminar Flow", J. Am. Chem. Soc., vol. 124, pp. 12930-12931, (2002).
Choban, E.R. et al., "Characterization of Limiting Factors in Laminar Flow-Based Membraneless Microfuel Cells", Electrochemical and Solid-State Letters, 8 (7), pp. A348-A352, (2005).
Choban, E.R. et al., "Microfluidic Fuel Cell Based on Laminar Flow", J. Power Sources, 128, pp. 54-60, (2004).
www.whatman.com "Leadership in separations technology for the life Sciences", 1 page, (2009).
Jankowski, A.F. et al., "Micro-Fabricated Thin-film Fuel Cells for Portable Power Requirements", Spring Meeting of the Materials Research Society, San Francisco, CA, Apr. 1-5, 2002, 7 pages, (2002).
Chan, K-Y et al., "Meniscus behavior and oxygen reduction in tapered pore gas diffusion electrodes", Electrochimica Acta, vol. 33, No. 12, pp. 1767-1773, (1988).
Chan, K-Y et al., "A wedge-meniscus model of Gas-Diffusion Electrodes", Electrochimica Acta, 32, 8, pp. 1227-1232, (1987).
Waszczuk, P. et al., "Methanol Electrooxidation on Platinum/Ruthenium Nanoparticle Catalysts", Journal of Catalysis, 203, pp. 1-6, (2001).
Peng, F.Z. et al., "A new ZVS bidirectional dc-dc converter for fuel cell and battery application," IEEE Transactions on Power Electronics, 19, 1, pp. 54-65, (2004).
Krein, P.T. et al., "Low cost inverter suitable for medium-power fuel cells," IEEE Power Electronics Specialists Conference, vol. 1, pp. 321-326, (2002).
Cygan, P.J. et al., "Hybrid Power Sources for Military Applications," The Eighteenth Annual Battery Conference on Applications and Advances, pp. 85-90, (1998).
Jarvis, L.P. et al., "Hybrid Power Source for Manportable Applications," IEEE Aerospace and Electronic Systems Magazine, 18, 1, pp. 13-16, (2003).
Atwater, T.B. et al., "Man portable power needs of the $21^{st}$ century," Journal of Power Sources, vol. 91, No. 1, pp. 27-36, (2000).
Jarvis, L.P. et al., "Fuel cell/Lithium-ion battery hybrid for manportable applications," The Seventeenth Annual Battery Conference on Applications and Advances, pp. 69-72, (2002).
Gao, L. et al. "An actively controlled fuel cell/battery to meet pulsed power demands," Journal of Power Sources, 130, pp. 202-207, (2004).
Zheng, J.P. et al., "Hybrid power sources for pulsed current applications," IEEE Transactions on Aerospace and Electronic Systems, vol. 37, pp. 288-292, (2001).
Jiang, Z. et al., "Design and experimental tests of control strategies for active hybrid fuel cell/battery power sources," Journal of Power Sources, 130, pp. 163-171 (2004).
Acharya, P. et al., "An advanced fuel cell simulator," IEEE Applied Power Electronics Conference, pp. 1554-1558, (2004).
Weigl, B.H. et al., "Microfluidic diffusion-based separation and detection", Science, 283, pp. 346-347, (1999).
Kenis, P.J.A. et al., "Microfabrication Inside Capillaries Using Multiphase Laminar Flow Patterning", Science, vol. 285, pp. 83-85, (1999).
Wesseler, E.P. et al., "The Solubility of Oxygen in Highly Fluorinated Liquids", Journal of Fluorine Chemistry, 9, pp. 137-146, (1977).
Riess, J.G. et al., "Solubility and Transport Phenomena in Perfluorochemicals Relevant to Blood Substitution and Other Biomedical Applications", Pure & Appl. Chem., vol. 54, No. 12, pp. 2383-2406, (1982).
International Search Report dated Oct. 25, 2006 for PCT application No. PCT/US05/05962.
Rice, C. et al., "Direct Formic Acid Fuel Cells", Journal of Power Sources, vol. 111, pp. 83-89, (2002).
Lu, G-Q et al., "Formic Acid Decomposition on Polycrystalline Platinum and Palladized Platinum Electrodes", J. Phys. Chem., vol. 103, pp. 9700-9711, (1999).

Waszczuk, P. et al., "A nanoparticle catalyst with superior activity for electrooxidation of formic acid", Electrochemistry Communications, vol. 4, pp. 599-603, (2002).

International Search Report dated Mar. 30, 2007 for PCT application No. PCT/US05/32990.

Park, S. et al., "Electrochemical Infrared Characterization of CO Domains on Ruthenium-Decorated Platinum Nanoparticles" J. Am. Chem. Soc. 125, pp. 2282-2290, (2003).

Babu, P.K. et al., "Electronic Alterations Caused by Ruthenium in Pt—Ru Alloy Nanoparticles as Revealed by Electrochemical NMR", J. Phys. Chem., 107, pp. 7595-7600, (2003).

Hentges, P.J. et al., "Planar tunneling spectroscopic studies of splitting vs. non-splitting of the zero-bias conductance peak in $YBa_2Cu_3O_7$.• thin films", Physica C, 408-410, pp. 801-803, (2004).

Hentges, P.J. et al., "Solution-growth of ultra-thin, insulating layers of zirconia for passivation and tunnel junction fabrication on YBCO thin films", IEEE Transactions on Applied Superconductivity, v. 13, No. 2, pp. 801-804, (2003).

Greene, L.H. et al., "Planar tunneling spectroscopy of high-temperature superconductors: Andreev bound states and broken symmetries", Physica C, 387, pp. 162-168, (2003).

Greene, L.H. et al., "Detection and Control of Broken Symmetries with Andreev Bound State Tunneling Spectroscopy: Effects of Atomic-Scale Disorder", Physica C, 408-410, pp. 804-806, (2004).

Kimball, J.W. et al., "Issues with low-input-voltage boost converter design," IEEE Power Electronics Specialists Conference, Aachen, Germany, pp. 2152-2156, (2004).

Ismagilov, R.F. et al., "Experimental and theoretical scaling laws for transverse diffusive broadening in two-phase laminar flows in microchannels," Applied Physics Letters, vol. 76, No. 17, pp. 2376-2378, (2000).

Kenis, P.J.A. et al., "Microfabrication Inside Capillaries Using Multiphase Laminar Flow Patterning," Science, vol. 285, pp. 83-85, (1999).

Ismagilov, R.F. et al., "Pressure-driven laminar flow in tangential microchannels: an elastomeric microfluidic switch", Anal. Chem., 73, pp. 4682-4687, (2001).

Dobbs, B.G. et al., "A multiple-input dc-dc converter topology", IEEE Power Electronic Letters, vol. 1, No. 1, pp. 6-9, (2003).

Musunuri, S. et al., "Fabrication and Characterization of PDMA Inductors", IEEE Power Electronics Specialists Conference, Aachen, Germany, pp. 4460-4466, (2004).

Coutanceau, C. et al., "Radioactive Labeling Study and FTIR Measurements of Methanol Adsorption and Oxidation on Fuel Cell Catalysts", Fuel Cells, 2, pp. 153-158, (2002).

Jankowski A.F., et al., "Sputter Deposition of Metallic Sponges", 48th International Symposium on the American Vacuum Society, San Francisco, CA, Oct. 26-Nov. 2, 2001, 14 pages. (2001).

Guo, J-W., et al., "Effect of Current collector corrosion made from Printed Circuit Board (PCB) on the degradation of self-breathing direct methanol fuel cell stack", Electrochimica Acta, 53, pp. 3056-3064, (2008).

Morse, J. et al., "An Integrated Microfluidic Fuel Cell System for Energy Conversion from Hydrocarbon Fuels", Electrochemical Society Spring Symposium, Philadelphia, PA, May 12-17, 2002, 1 page, (2002).

Park H.G. et al., "Transport in a Microfluidic Catalytic Reactor", Proceedings of HT2003, ASME Summer Heat Transfer Conference, Jul. 21-23, 2003, Las Vegas, Nevada, pp. 1-10, (2003).

Zhang, J. et al., "Electrochemical Measurement of $O_2$ Permeation Rate through Polymer Electrolyte Membranes", 216th ECS Meeting, Abstract #830, The Electrochemical Society, 1 page, (2009).

Chu, D. et al., Alkaline Membrane Electrolyte Fuel Cell Research and Development at the U.S. Army Research Laboratory, 216th ECS Meeting, Abstract #385, The Electrochemical Society, 1 page, (2009).

Jiang, R. et al., "Water and Fuel Crossover in a Direct Methanol Fuel Cell Stack", 212th ECS Meeting, Abstract #601, The Electrochemical Society, 1 page, (2007).

Jiang, R. et al., "A Palladium Deposited Nafion Membrane via Supercritical Carbon Dioxide (sc-$CO_2$) Medium for DMFCs", 207th ECS Meeting, Abstract #784, The Electrochemical Society, 1 page, (2005).

Jiang, R. et al., "Sol-Gel Derived Nafion/Silica Hybrid Electrolyte Membranes for Direct Methanol Fuel Cells (DMFCs)", 207th ECS Meeting, Abstract #56, The Electrochemical Society, 1 page, (2005).

Jiang, R. et al., "Direct Methanol Fuel Cell System Performance: From Materials, Components, to System and Fuel Efficiency", 209th ECS Meeting, Abstract #1143, The Electrochemical Society, 1 page, (2006).

Jiang, R. et al., "Durability Evaluation of Direct Methanol Fuel Cells", 208th ECS Meeting, Abstract #1216, The Electrochemical Society, 1 page, (2005).

Jiang, R. et al., "Comparison of Several Research Approaches for Direct Methanol Fuel Cell Membranes", 208th ECS Meeting, Abstract #965, The Electrochemical Society, 1 page, (2005).

Jankowski, A.F. et al., Micro-Fabricated Thin-Film Fuel Cells for Portable Power Requirements, Mat. Res. Soc. Symp.Proc., vol. 730, pp. V4.2.1-V4.2.6, (2002).

Choban, E.R, et al, "Microfluidic fuel cell based on laminar flow", Journal of Power Sources, vol. 128, pp. 54-60, (2004).

International Search Report dated May 29, 2006 for application No. PCT/US2004/020597.

Kenis, P.J.A, et al, "Fabrication inside microchannels using fluid flow", Accounts of Chemical Research, vol. 33, No. 12, pp. 841-847, (2000).

E. Choban, et al, "Microfluidic Fuel Cells That Lack a PEM" Power Sources Proceedings, vol. 40, 2002, pp. 317-320, XP009031634.

R. Ferrigno, et al, "Membraneless Vanadium Redox Fuel Cell Using Laminar Flow" JACS Communications, vol. 124, 2002, pp. 12930-12931, XP002282850.

M. Mench, et al, "Design of Micro Direct Methanol Fuel Cell (Proceedings of the IMECE'01, Nov. 11-16, 2001)", 2001, The American Society of Mechanical Engineers, New York XP002282851.

S. C. Kelley, et al, "A Miniature Methanol/Air Polymer Electrolyte Fuel Cell", Electrochemical and Solid-State Letters, IEEE Service Center, Piscataway, NJ, vol. 3, No. 9, 2000, pp. 407-409, XP001023907.

Branebjerg et al, "Application of Miniature Analyzers from Microfluidic Components to uTAS," Proceedings of Micro Total Analysis Systems Conference, Netherlands, 1994, pp. 141-151.

Brody et al, "Diffusion-Based Extraction in a Microfabricated Device," Sensors and Actuators, 1997, pp. 13-18, vol. A58.

Carrette et al, "Fuel Cells—Findamentals and Applications," Fuel Cells, 2001, pp. 5-39, vol. I.

Duffy et al, "Rapid Prototyping of Microfluidic Systems in Poly(dimethylsiloxane),"Anal. Chem, 1998, pp. 4974-4984, vol. 70.

EG&G Services et al, Fuel Cell Handbook, Fifth Edition, 2000, U.S. Department of Energy, Office of Fossil Energy, National Energy Technology Laboratory, pp. I-xiii, 1-1 to 12-4.

Heinzel et al, "A Review of the State-of-the-Art of the Methanol Crossover in Direct Methanol Fuel Cells," J. Power Sources, 1999, pp. 70-74, vol. 84.

Kenis et al, "Microfabrication Inside Capillaries Using Multiphase Laminar Flow Patterning," Science, 1999, pp. 83-85, vol. 285.

Kim et al, "Diffusion-Based Sample Cleanup Microchip for Protein Analysis by Electrospray Ionization Mass Spectrometry," obtained at http://pittcon.omnibooksonline.comR001/papers/0226.pdf as of at least Jul. 24, 2001, 2 pages.

Pickett et al, "Ionic Mass Transfer in Parallel Plate Electrochemical Cells," J. Applied Electrochemistry, 1972, pp. 151-156, vol. 2.

Thomas et al, "Los Alamos National Laboratory Monograph LA-UR-99-3231," Fuel Cells: Green Power, 1999, pp. 1-33.

Waszczuk et al, "Methanol Electrooxidation on Platinum-RutheniumNanoparticle Catalysts," J. Catalysis, 2001, pp. 1-6, vol. 203.

Zhao et al, "Surface-Directed Liquid Flow Inside Microchannels," Science, 2001, pp. 1023-1026, vol. 291.

Markoski, "Summary of Knowledge About Laminar Flow Fuel Cells," 2002, 1 page.

Ro et al, "Sample Clean-Up Using Multiphase Laminar Microfluidics for Electrospray Ionization Mass Spectrometry," obtained at http://nanotech.osu.edu/abstracts/hahn.htm as of at least Jul. 24, 2001, 2 pages.

Delphion search conducted Oct. 23, 2002, for U.S. patents containing "perfluorocarbon" and fuel cell in the claims, 1 page.

Delphion search conducted Oct. 23, 2002, for U.S. patents containing fuel cell and oxygen carrier and "perfluror",1 page.
Delphion search conducted Aug. 23, 2002, for U.S. patents and applications containing "pefluoro" and "ballard",1 page.
Delphion search conducted Aug. 23, 2002, for U.S. patents containing "perflurocarbons", 2 pages.
Davis, "NISTIR 6848, Proposed Testing Methodology and Laboratory Facilities for Evaluating Residential Fuel Cell Systems," NIST, 2002, 14 pages.
Dupont Zonyl FS-62, Fluorosurfactant Information Sheet, 2001, 2 pages.
Riess et at, °Solubility and Transport Phenomena in Perfluorochemicals Relevant to Blood Substitution and Other Biomedical Applications, Pure & Appl. Chem, 1982, pp. 2383-2406, vol. 54.
Wesseler et al, The Solubility of Oxygen in Highly Fluorinated Liquids, J. Fluorine Chem, pp. 137-146, vol. 9.
Gang, X, et al, "Electrolyte additives for phosphoric acid fuel cells", Journal of the Electrochemical Society, vol. 140, No. 4, pp. 896-902, (1993).
International Search Report dated Dec. 13, 2005 for PCT application No. PCT/US2004/020342.
Kronberger, H, et al, "Reduction of oxygen from electrolyte emulsions with high oxygen contents", Journal of Power Sources, vol. 86, pp. 562-567, (2000).
International Search Report dated Jun. 21, 2004 for PCT application No. PCT/US2003/00226.
Kelley et al, "Miniature Fuel Cells Fabricated on Silicon Substrates," AIChE Journal 48, pp. 1071-1082, 2002.
Maynard et al, "Miniature fuel cells for portable power: Design considerations and challenges," J. Vac. Sci. Technol, B 20(4), pp. 1287-1297, 2002.
Steele et al, "Materials for fuel-cell technologies", Nature, vol. 414, pp. 345-352, 2001.
Lu et al, Development and characterization of a silicon-based micro direct methanol fuel cell, Electrochimica Acta 49, pp. 821-828, 2004.
Yeom et al, "Microfabrication and characterization of a silicon-based millimeter scale, PEM fuel cell operating with hydrogen, methanol, or formic acid," Sensors and Actuators, B, 107, pp. 882-891, 2005.
Lee et al, "Design and fabrication of a micro fuel cell array with "flip-flop" interconnection," Journal of Power Sources, 112, pp. 410-418, 2002.
Hahn et al, "Development of a planar micro fuel cell with thin film and micropatterning technologies," Journal of Power Sources, 131, pp. 73-78, 2004.
Mitrovski et al, "Microfluidic Devices for Energy Conversion: Planar Integration and Performance of a Passive, Fully Immersed H2-O2 Fuel Cell," Langmuir, 20, pp. 6974-6976, 2004.
Meyers et al, "Design considerations for miniaturized Pem fuel cells," Journal of Power Sources, 109, pp. 76-88 2002.
Yen et al, "A micro methanol fuel cell operating at near room temperature," Applied Physics Letters, vol. 83, No. 19, pp. 4056-4058, 2003.
Motokawa et al, MEMS-based design and fabrication of a new concept micro direct methanol fuel cell (µ-DMFC), Electrochemistry Communications, 6, pp. 562-565, 2004.
Ha, et al, "A miniature air breathing direct formic acid fuel cell," Journal of Power Sources, 128, pp. 119-124, 2004.
Ismagilov et al, "Experimental and theoretical scaling laws for transverse diffusive broadening in two-phase laminar flows in microchannels," Applied Physics Letters, vol. 76, No. 17, pp. 2376-2378, 2000.
Kamholz et al, "Quantitative Analysis of Molecular Interaction in a Microfluidic Channel: The T-Sensor," Anal. Chem, 71, pp. 5340-5347, 1999.
Krishnan et al, "Microfabricated reaction and separation systems", Current Opinion in Biotechnology 12, p. 92, 2001.
Zheng et al, "Formation of Arrayed Droplets by Soft Lithography and Two-Phase Fluid Flow, and Application in Protein Crystallization," Adv. Mater, 16, No. 15, 1365-1368, 2004.
Cohen et al, "Fabrication and preliminary testing of a planar membraneless microchannel fuel cell", J. Power Sources, 139, pp. 96-105, 2005.

Spendelow et al, "Electrooxidation of adsorbed CO in Pt(1 1 1) and Pt(1 1 1)/Ru in alkaline media and comparison with results from acidic media," Journal of Electroanalytical Chemistry, 568, pp. 215-224, 2004.
McLean et al, "An assessment of alkaline fuel cell technology," International Journal of Hydrogen Energy, 27, pp. 507-526, 2002.
Prabhuram et al, "Investigation of methanol oxidation on unsupported platinum electrodes in strong alkali and strong acid," Journal of Power Sources, 74, pp. 54-61, 1998.
Tripkovic et al, "Methanol oxidation at platinum electrodes in alkaline solution: comparison between supported catalysts and model systems," Journal of Electroanalytical Chemistry, 572, pp. 119-128, 2004.
Agel et al, "Characterization and use of anionic membranes for alkaline fuel cells," Journal of Power Sources, 101, pp. 267-274, 2001.
Wang et al, "A feasibility analysis for alkaline membrane direct methanol fuel cell: thermodynamic disadvantages versus kinetic advantages," Electrochemistry Communications, 5, 662-666, 2003.
Danks et al, "Alkaline anion-exchange radiation-grafted membranes for possible electrochemical application in fuel cells," J. Mater. Chem, 13, pp. 712-721, 2003.
Yu et al, "Development of direct methanol alkaline fuel cells using anion exchange membranes," Journal of Power Sources, 137, pp. 248-256, 2004.
Iwasita, "Electrocatalysis of methanol oxidation", Electrochim. Acta 47, pp. 3663-3674, 2002.
Barton et al, "Enzymatic Biofuel Cells for Implantable and Microscale Devices," Chem. Rev, 104, pp. 4867-4886, 2004.
Astris Energi Inc, "Advantages of the Alkaline Fuel Cell," can be located at: http://www.fuelcellmarkets.com/article_default_view.fcm?articleid=6194&subsite=912, 1 page, 2005.
Chen et al, "A Miniature Biofuel Cell," J. Am. Chem. Soc, 123, pp. 8630-8631, 2001.
Mano et al, "A Miniature Biofuel Cell Operating in a Physiological Buffer," J. Am. Chem. Soc, 124, pp. 12962-12963, 2002.
Kim et al, "A Miniature Membrane-less Biofuel Cell Operating under Physiological Conditions at 0.5 V," A. J. Electrochem. Soc. 150 (2), A209-A213, 2003.
Mano et al, "A Miniature Membraneless Biofuel Cell Operating at 0.36 V under Physiological Conditions," Journal of The Electrochemical Society, 150, 8, pp. A1136-A1138, 2003.
Mano et al, "Characteristics of a Miniature Compartment-less Glucose-O2 Biofuel Cell and Its Operation in a Living Plant," J. Am. Chem. Soc, 125, pp. 6588-6594, 2003.
Choban et al, "Characterization of Limiting Factors in Laminar Flow-Based Membraneless Microfuel Cells," Electrochemical and Solid State Letters,8 (7), pp. A348-A352, 2005.
Choban et al, "Membraneless laminar flow-based micro fuel cells operating in alkaline, acidic, and acidic/alkaline media," Electrochimica Acta, vol. 50, No. 27, pp. 5390-5398, 2005.
Cohen et al, "A Dual Electrolyte H2/O2 Planar Membraneless Microchannel Fuel Cell System with Open Circuit Potentials in Excess of 1.4 V," Lagmuir 21, pp. 3544-3550, available online Mar. 16, 2005.
Skoog et al, "Electrochemical Cells," Fundamentals of Analytical Chemistry, CBS College Publishing, 4th ed, p. 306, 1982.
FCTec, "Alkaline Fuel Cells (AFC)," can be located at: http://www.fctec.com/fctec_types_afc.asp, 1 page, 2005.
Tse, "Alkaline Fuel Cell," can be located at: http://www.visionengineer.com/env/al.php, 1 page, 2005.
Neah Power Systems, located at www.neahpower.com, 42 pages, 2003-2004.
INI Power Systems, located at www.inipower.com, 3 pages, 2004.
Yeom et al, "A Silicon Microfabricated Direct Formic Acid Fuel Cell," ASME Fuel Cell Science, Engineering and Technology Proceedings, pp. 267-272, 2003.
Yeom et al, "A Microscale Vapor-Fed Formic Acid Fuel Cell," Solid-State Sensors and Actuators Workshop, Hilton Head Island, SC, pp. 125-128, Jun. 2004.
Choban et al, "Membraneless Fuel Cell Based on Laminar Flow," ASME Fuel Cell Science, Engineering and Technology Proceedings, pp. 261-265, 2003.

Choban et al, "Microfluidic Fuel Cells That Lack a PEM," Power Sources Proceedings, 40, pp. 317-320, 2002.

Invitation to Pay Additional Fees and Partial Search Report dated Feb. 5, 2007 for PCT application No. PCT/US2006/009502, 9 Pages.

Chen, C.Y. et al., "Portable DMFC system with methanol sensor-less control", Journal of Power Sources, 167, pp. 442-449, (2007).

Livshits, V. et al., "Direct ethylene glycol fuel-cell stack—Study of oxidation intermediate products", Journal of Power Sources, 178, pp. 687-691, (2008).

Cooper, K.R. et al., "Electrical Test Methods for On-Line Fuel Cell Ohmic Resistance Measurement", Journal of Power Sources, vol. 160, pp. 1088-1095, (2006).

Niemann, J., "Unraveling Fuel Cell Electrical Measurements", Fuel Cell Magazine, April/May, pp. 26-31, (2005).

Smith, M. et al., "Comparison of Fuel Cell Electrolyte Resistance Measurement Techniques", Fuel Cell Magazine, April/May, pp. 32-37, (2005)

Hollinger et al., "Nanoporous separator and low fuel concentration to minimize crossover in direct methanol laminar flow fuel cells," Journal of Power of Sources, pp. 3523-3528, (2010).

Mench, et al., "Design of a Micro Direct Methanol Fuel Cell (µDMFC)," Proceedings of the IMECE, 8 pages (2001).

International Search Report dated Sep. 12, 2007 for PCT Appl. No. PCT/US2007/061980.

Primak et al., "Improved Performance of Direct Methanol Laminar Flow Fuel Cells," Proceedings 207$^{th}$ ECS Meeting, Abstract #137, Quebec City, Canada, May 15-20, 2005.

International Search Report dated Jun. 24, 2008 for PCT Appl. No. PCT/US2008/059146.

\* cited by examiner

HIGH EFFICIENCY FUEL CELL SYSTEM

BACKGROUND

Fuel cell technology shows great promise as an alternative energy source for numerous applications. Several types of fuel cells have been constructed, including polymer electrolyte membrane fuel cells, direct methanol fuel cells, alkaline fuel cells, phosphoric acid fuel cells, molten carbonate fuel cells, and solid oxide fuel cells. For a comparison of several fuel cell technologies, see Los Alamos National Laboratory monograph LA-UR-99-3231 entitled Fuel Cells: Green Power by Sharon Thomas and Marcia Zalbowitz.

FIG. 1 represents an example of a fuel cell 100, including a high surface area anode 110 including an anode catalyst 112, a high surface area cathode 120 including a cathode catalyst 122, and an electrolyte 130 between the anode and the cathode. The electrolyte may be a liquid electrolyte; it may be a solid electrolyte, such as a polymer electrolyte membrane (PEM); or it may be a liquid electrolyte contained within a host material, such as the electrolyte in a phosphoric acid fuel cell (PAFC).

In operation of the fuel cell 100, fuel in the gas and/or liquid phase is brought over the anode 110 where it is oxidized at the anode catalyst 112 to produce protons and electrons in the case of hydrogen fuel, or protons, electrons, and carbon dioxide in the case of an organic fuel. The electrons flow through an external circuit 140 to the cathode 120 where air, oxygen, or an aqueous oxidant (e.g., peroxide) is being fed. Protons produced at the anode 110 travel through electrolyte 130 to cathode 120, where oxygen is reduced in the presence of protons and electrons at cathode catalyst 122, producing water in the liquid and/or vapor state, depending on the operating temperature and conditions of the fuel cell.

Hydrogen and methanol have emerged as important fuels for fuel cells, particularly in mobile power (low energy) and transportation applications. The electrochemical half reactions for a hydrogen fuel cell are listed below.

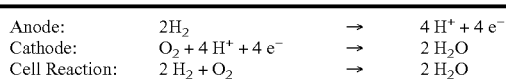

To avoid storage and transportation of hydrogen gas, the hydrogen can be produced by reformation of conventional hydrocarbon fuels. In contrast, direct liquid fuel cells (DLFCs) utilize liquid fuel directly, and do not require a preliminary reformation step of the fuel. As an example, the electrochemical half reactions for a Direct Methanol Fuel Cell (DMFC) are listed below.

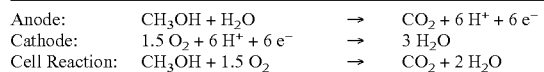

A key component in conventional fuel cells is a semipermeable membrane, such as a solid polymer electrolyte membrane (PEM), that physically and electrically isolates the anode and cathode regions while conducting protons ($H^+$) through the membrane to complete the cell reaction. Typically, PEMs have finite life cycles due to their inherent chemical and thermal instabilities. Moreover, such membranes typically exhibit relatively poor mechanical properties at high temperatures and pressures, which can seriously limit their range of use.

In contrast, a laminar flow fuel cell (LFFC) can operate without a PEM between the anode and cathode. An LFFC uses the laminar flow properties of a microfluidic liquid stream to deliver a reagent to one or both electrodes of a fuel cell. In one example of an LFFC, fuel and oxidant streams flow through a microfluidic channel in laminar flow, such that fluid mixing and fuel crossover is minimized. In this example, an induced dynamic conducting interface (IDCI) is present between the two streams, replacing the PEM of a conventional fuel cell. The IDCI can maintain concentration gradients over considerable flow distances and residence times, depending on the dissolved species and the dimensions of the flow channel. IDCI-based LFFC systems are described, for example, in U.S. Pat. No. 6,713,206 to Markoski et al., in U.S. Pat. No. 7,252,898 to Markoski et al., and in U.S. Patent Application Publication 2006/0088744 to Markoski et al.

An LFFC can be operated with a single flowing electrolyte. The use of one flowing electrolyte in a microfluidic channel, instead of two flowing electrolytes, may provide additional advantages, such as increased simplicity of the fuel cell and smaller physical dimensions for the cell. Single flowing electrolyte based LFFC systems are described, for example, in U.S. patent application Ser. No. 12/061,349, filed Apr. 2, 2008, entitled "Microfluidic Fuel Cells". IDCI-based LFFC systems and LFFC systems using a single flowing electrolyte are each examples of flowing electrolyte fuel cells.

One challenge faced in developing fuel cells is to reduce their physical dimensions without sacrificing their electrochemical performance. As the dimensions of a flowing electrolyte fuel cell are reduced, it becomes increasingly difficult to maintain uniform distribution of reagents and temperature throughout the cell. It would be desirable to provide a fuel cell that has the advantages and electrochemical performance of a flowing electrolyte fuel cell, but that has smaller physical dimensions. It would also be desirable to ensure that reagents and operating temperature are uniformly distributed throughout the cell.

SUMMARY

In a first aspect, the invention provides a fuel cell, comprising an anode comprising an anode catalyst, a cathode comprising a gas diffusion electrode and a cathode catalyst on the gas diffusion electrode, a microfluidic channel contiguous with the anode, and a liquid comprising fuel in the channel. The concentration of the fuel in the liquid is 0.05-0.5 M.

In a second aspect, the present invention provides a fuel cell, comprising an anode comprising an anode catalyst, a cathode comprising a gas diffusion electrode and a cathode catalyst on the gas diffusion electrode, a microfluidic channel contiguous with the anode, and a liquid comprising fuel in the channel. The concentration of the fuel in the liquid is 0.05-0.5 M, and the liquid flows through the fuel cell at a stoichiometric fuel flow rate of 1-30.

In a third aspect, the present invention provides a fuel cell stack, comprising at least 5 fuel cells. Each fuel cell comprises an anode comprising an anode catalyst, a cathode comprising a gas diffusion electrode and a cathode catalyst on the gas diffusion electrode, a microfluidic channel contiguous with the anode, and a liquid comprising fuel, in the channel. The concentration of the fuel in the liquid is 0.05-0.5 M, and fuel efficiency of the fuel cell stack is at least 70%.

The following definitions are included to provide a clear and consistent understanding of the specification and claims.

The term "gas diffusion electrode" means an electrically conducting porous material.

The term "on", in the context of components of a fuel cell, means supported by. A first component that is on a second component may be separated from the second component by one or more other components. The first component may or may not be above the second component during the formation or operation of the cell.

The term "convective contact" means that a material is in direct contact with a flowing fluid. If an electrode having a catalyst is in convective contact with a flowing fluid, then the catalyst and fluid are in direct contact, without an intervening layer or diffusion medium.

The term "non-compressible" means that a material has a thickness dimension that is reduced by less than 35% when compressed in the thickness direction at a pressure of 160 pounds per square inch (psi) for 20 minutes.

The term "ionically insulating" means that a material does not conduct ions.

The term "hydraulic barrier" means a fluid-tight material that can maintain a concentration gradient between two fluids on either side of the barrier. The two fluids may be two gases, two liquids, or a gas and a liquid. A hydraulic barrier includes a liquid-tight material that can maintain a concentration gradient between two liquids of differing concentration on either side of the barrier. A hydraulic barrier may permit a net transport of molecules between the two fluids, but prevents mixing of the bulk of the two fluids.

The term "stoichiometric fuel flow rate", $V_{stoich}$, for a fuel cell stack is defined as $$V_{stoich} = (V_{fuel} \cdot C_{fuel})/(I_{stack} \cdot N_{cells} M),$$

where $V_{fuel}$ is the flow rate of the fuel stream in mL/min.;

$C_{fuel}$ is the concentration of the fuel in the fuel steam, in moles/L;

$I_{stack}$ is the operating current of the stack, in Amps;

$N_{cells}$ is the number of fuel cells in the fuel cell stack; and

M is the fuel factor, which is 0.103 for methanol. The fuel factor is proportional to the amount of energy derived from the fuel from oxidation in the fuel cell. The fuel factor for other fuels, such as ethanol or propanol, may be determined by extrapolation from the value for methanol and from the amount of energy derived from these other fuels during oxidation in the fuel cell.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Figure 1:
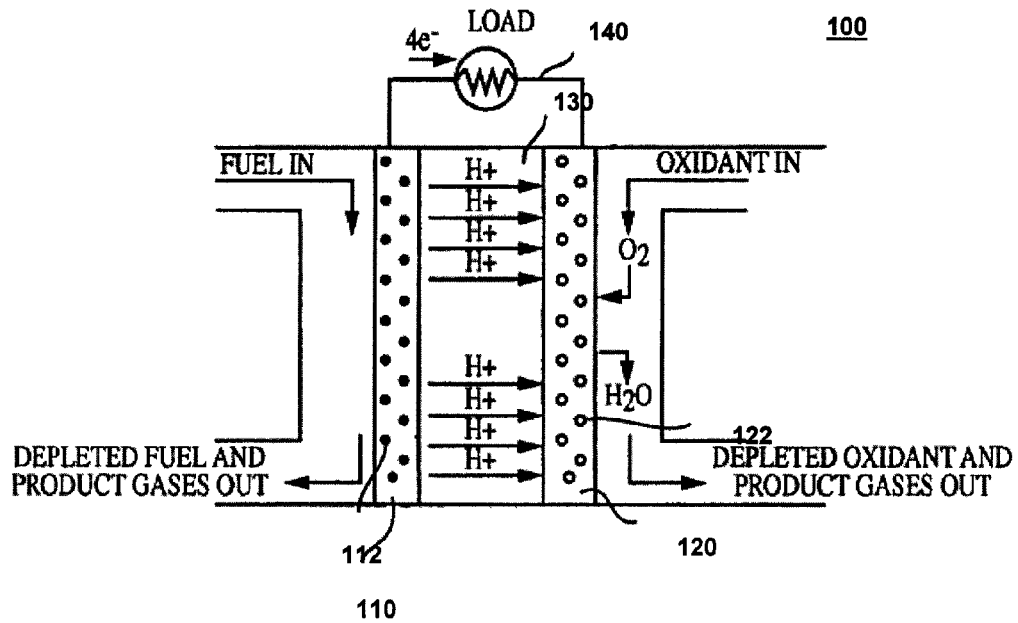
FIG. 1 is a schematic representation of a fuel cell.

The total system efficiency of a fuel cell system is the product of the individual efficiencies: voltage efficiency, balance-of-plant (BOP) efficiency, and fuel efficiency. Given the limits of commercially available electro-catalysts and BOP/electronics components, the key variable which system designers can improve upon is fuel efficiency. Sixty percent fuel efficiency is what has been achieved in the commercially available active methanol system using a conventional direct methanol fuel cell (DMFC) stack design and state of the art materials. To understand why the fuel efficiency is only 60% one must trace where and how fuel is lost.

Fuel may be lost when it diffuses to the cathode where it is i) either partially or completely oxidized to formic acid, formaldehyde, methyl formate, CO, (incomplete oxidation products) or $CO_2$, with excess oxygen from the air stream, or ii) evaporates into the air stream and exits the system as either incomplete oxidation products, $CO_2$ or fuel vapor. This phenomena as a whole is typically referred to as fuel cross-over and represents one of the major mechanisms whereby fuel is lost from the system.

A second major mechanism for fuel loss occurs from unspent fuel in the stream that exits the stack which now contains $CO_2$ gas. The $CO_2$ gas and aqueous fuel mixture are then returned to the fluid reservoir where the $CO_2$ must be separated from the fluid and vented to the atmosphere along with any excess water vapor created in the system. The stream which contains the fluid/$CO_2$ mixture is typically at 80-90° C. at steady state. Methanol, the preferred fuel, is the lowest molecular weight carbon based alcohol and has a boiling point of 65° C. These physical properties give methanol a high vapor pressure in aqueous solutions at these temperatures and it therefore has a tendency to evaporate into the stream of $CO_2$ gas bubbling through the reservoir and venting.

These two mechanisms represent the two major ways in which methanol can be lost from the system, as methanol vapor, incomplete oxidation products, or $CO_2$. The former two must be minimized to very low parts-per-million levels for safe indoor operation. We can better quantify these losses in a simple fuel efficiency ($F_e$) equation:

$$F_e = (MeOH_{(useful)}/(MeOH_{(x-over)} + MeOH_{(evap)} + MeOH_{(useful)})) \times 100.$$

Here $F_e$ is equal to the $MeOH_{(useful)}$ that is consumed to produce useful power within the stack divided by the sum of all the methanol consumed by the system which is equal to: $MeOH_{(x-over)}$ that is lost to the cathode stream plus $MeOH_{(evap)}$ that is lost by evaporation from the reservoir, and $MeOH_{(useful)}$ that is consumed within the stack to produce useful power.

Because both of these fuel loss mechanisms as depicted in the equation are very strong functions of the average concentration of the fuel in fuel stream, the most logical approach to minimize these losses would be to build a stack and a system that operates at the lowest feasible methanol concentration without imposing any other major system constraints or losses. Conventional DMFC stacks were designed and optimized to operate at 1.0-2.0 M methanol and with low volumetric flow rates; this is about 5-10 times greater than the concentration we have determined for to maximize fuel efficiency.

The present invention makes use of the discovery that high fuel efficiency may be achieved by using a low concentration of fuel in the fuel stream, for example 0.05-0.5 M, preferably 0.1-0.3 M or 0.1-0.2 M. Furthermore, in order to obtain desirable power for a fuel cell stack using a low concentration of fuel in the fuel stream, the fuel stream must have a high flow rate, for example a stoichiometric fuel flow rate of 1-30, preferably 2-10 or 3-7. Using a combination of low concentration fuel in the fuel stream and a high fuel stream flow rate, a fuel efficiency can be achieved of at least 70% (such as 70-95%), preferably at least 80% (such as 80-95%), more preferably at least 85% (such as 85-90%), with a fuel cell or fuel cell stack designed for a low concentration of fuel in the fuel stream.

A flowing electrolyte fuel cell (also referred to as a flowing fuel stream fuel cell herein) includes an anode, a cathode, a microfluidic channel that is contiguous with the anode, and a liquid electrolyte in the microfluidic channel. The anode includes an anode catalyst. The cathode includes a gas diffusion electrode (GDE), and a cathode catalyst on the gas diffusion electrode.

The anode includes an anode catalyst for the oxidation of a fuel, which is one of the half-cell reactions of the fuel cell. The half cell reaction at the anode in a fuel cell typically produces electrons and protons. The electrons produced provide an electric potential in a circuit connected to the fuel cell. Examples of anode catalysts include platinum, and combinations of platinum with another metal, such as ruthenium, tin, osmium or nickel. The anode also may include a porous conductor, such as a GDE.

The fuel may be any substance that can be oxidized to a higher oxidation state by the anode catalyst. Examples of fuels include hydrogen, oxidizable organic molecules, ferrous sulfate, ferrous chloride, and sulfur. Oxidizable organic molecules that may be used as fuels in a fuel cell include organic molecules having only one carbon atom. Oxidizable organic molecules that may be used as fuels in a fuel cell include organic molecules having two or more carbons but not having adjacent alkyl groups, and where all carbons are either part of a methyl group or are partially oxidized. Examples of such oxidizable organic molecules include methanol, formaldehyde, formic acid, glycerol, ethanol, isopropyl alcohol, ethylene glycol and formic and oxalic esters thereof, oxalic acid, glyoxylic acid and methyl esters thereof, glyoxylic aldehyde, methyl formate, dimethyl oxalate, and mixtures thereof.

Preferred fuels include gaseous hydrogen, gaseous pure methanol, liquid pure methanol and aqueous mixtures of methanol, including mixtures of methanol and a liquid electrolyte. Preferably the fuel includes methanol. More preferably the fuel includes an aqueous mixture of methanol, which preferably includes methanol at a concentration of 0.10 molar (M) to 1.0 M, and more preferably includes methanol at a concentration of 0.25 M to 0.75 M. More preferably the fuel includes a mixture of methanol in an aqueous protic acid, which preferably includes sulfuric acid, and more preferably includes sulfuric acid at a concentration of at least 0.1 M.

The cathode includes a cathode catalyst for the reduction of an oxidant, which is the other half-cell reaction of the fuel cell. The half-cell reaction at the cathode in a fuel cell typically is a reaction between an oxidant and ions from the liquid electrolyte, such as $H^+$ ions. Examples of cathode catalysts include platinum, and combinations of platinum with another metal, such as cobalt, nickel or iron. The cathode catalyst is on a GDE. A GDE may include a porous carbon substrate, such as a carbon paper treated with poly(tetrafluoroethylene) (PTFE). In one example, a GDE includes a carbon paper having a PTFE content of 0-50%, and a thickness of 50-250 micrometers.

The oxidant may be any substance that can be reduced to a lower oxidation state by the cathode catalyst. Examples of oxidants include molecular oxygen ($O_2$), ozone, hydrogen peroxide, permanganate salts, manganese oxide, fluorine, chlorine, bromine, and iodine. The oxidant may be present as a gas or dissolved in a liquid. Preferably the oxidant is gaseous oxygen, which is preferably present in a flow of air.

The microfluidic channel is contiguous with the anode, and may also be contiguous with the cathode. For an individual anode, a plurality of microfluidic channels may be in contact with the anode. In one example, the microfluidic channel is contiguous with the anode only, and the anode and cathode are separated by a stationary electrolyte. A stationary electrolyte may be a liquid that is sealed in the cell. A stationary electrolyte may be a liquid in a hydrogel. In another example, the microfluidic channel is contiguous with both the anode and the cathode. The liquid electrolyte in this microfluidic channel provides the ionic conduction between the anode and cathode.

The liquid electrolyte may include any aqueous mixture of ions. Preferably the liquid electrolyte includes a protic acid. Examples of protic acids include hydrochloric acid (HCl), chloric acid ($HClO_3$), perchloric acid ($HClO_4$), hydroiodic acid (HI), hydrobromic acid (HBr), nitric acid ($HNO_3$), nitrous acid ($HNO_2$), phosphoric acid ($H_3PO_4$), sulfuric acid ($H_2SO_4$), sulfurous acid ($H_2SO_3$), trifluoromethanesulfonic acid (triflic acid, $CF_3SO_3H$), and combinations of these. More preferably the liquid electrolyte includes sulfuric acid. The liquid electrolyte may also contain non-acidic salts, such as halide, nitrate, sulfate, and/or triflate salts of alkali metals and/or alkaline earth metals. Preferably the liquid electrolyte includes sulfuric acid at a concentration of at least 0.1 M. Preferably the liquid electrolyte includes sulfuric acid at a concentration of from 0.1 M to 1.0 M, more preferably of from 0.1 M to 0.7 M, and more preferably of from 0.1 to 0.5 M.

The liquid electrolyte preferably passes through the microfluidic channel in a laminar flow. The term "laminar flow" means the flow of a liquid with a Reynolds number less than 2,300. The Reynolds number ($R_e$) is a dimensionless quantity defined as the ratio of inertial forces to viscous forces, and can be expressed as:

$$R_e = (\rho v L)/\mu$$

where L is the characteristic length in meters, $\rho$ is the density of the fluid ($g/cm^3$), v is the linear velocity (m/s), and $\mu$ is the viscosity of the fluid (g/(s cm)). Laminar flow of the liquid electrolyte may include flow of the electrolyte in a microfluidic channel together with a gaseous phase in the channel, such as a phase containing a gaseous reaction product, such as $CO_2$.

Increased uniformity of fluid flow within a flowing electrolyte fuel cell may be advantageous for a fuel cell that includes an anode in convective contact with the fuel. Increased uniformity of fluid flow within a flowing electrolyte fuel cell may be facilitated by components such as non-compressible electrodes, a non-compressible spacer defining the microfluidic channel for the liquid electrolyte, a controlled liquid pressure drop in the microfluidic channel across the anode, a seal having a controlled minimum thickness, a screen between the microfluidic channel and a hydraulic barrier on the cathode, and interdigitated gas flow channels for the oxidant. Increased uniformity of electrical contacts within a flowing electrolyte fuel cell may be facilitated by components such as rigid conductive plates, electrolyte ports that are electrically and ionically insulated, and controllable sealing of the cell without multiple through-bolts around the cell.

Figure 7:
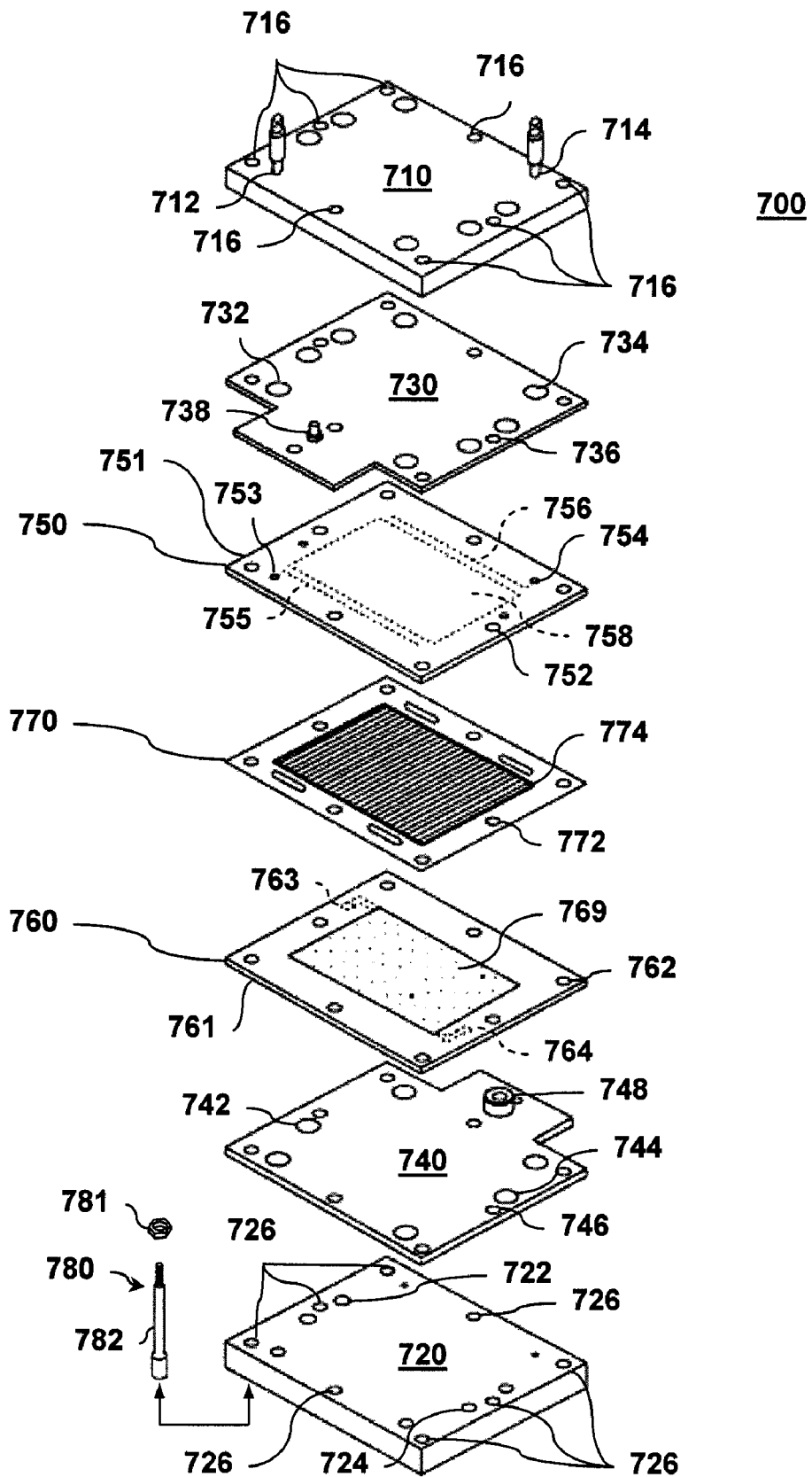
FIG. 7 is a representation of a flowing electrolyte fuel cell.
Figure 7A:
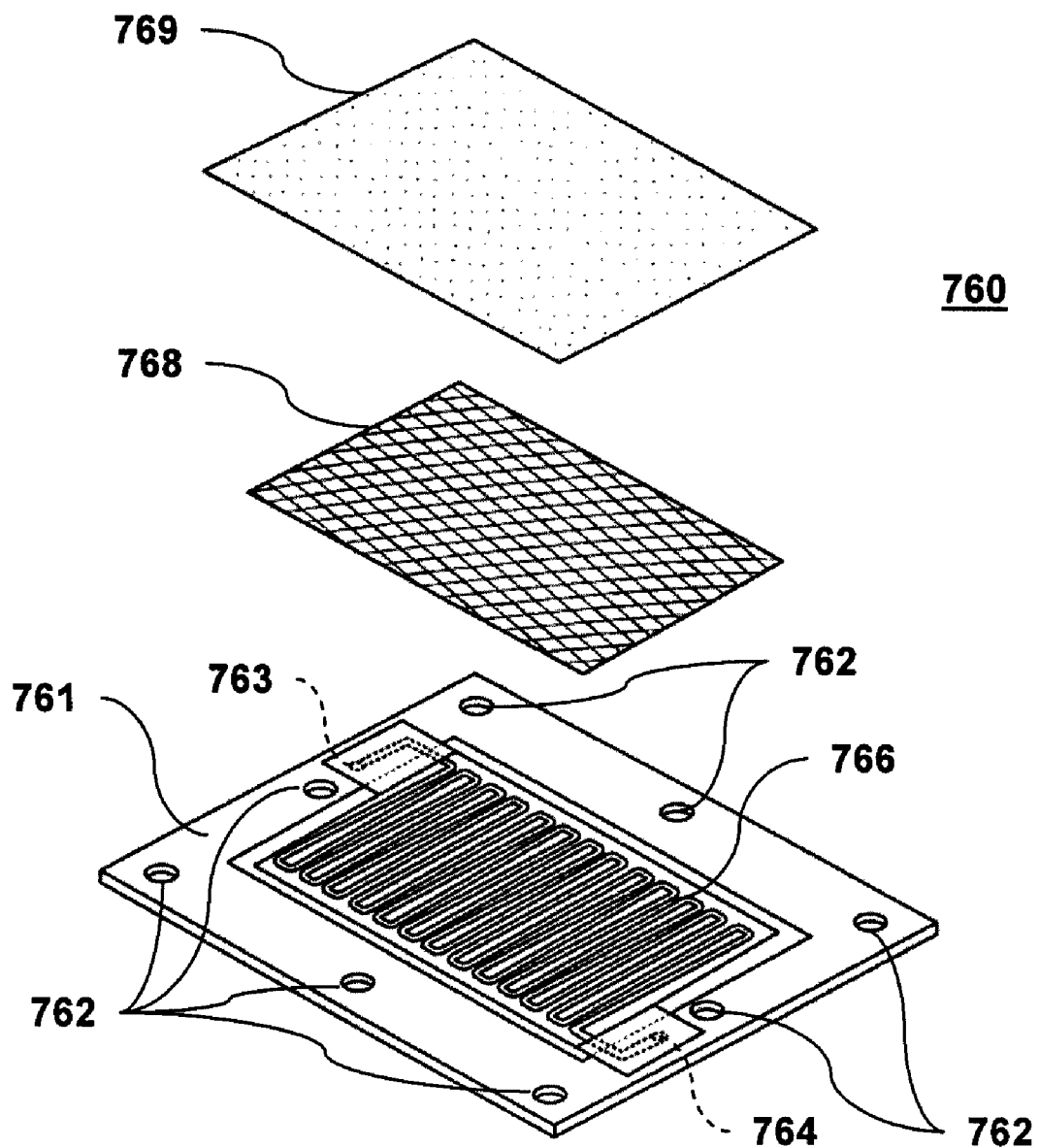
FIG. 7A is a representation of the cathode plate 760 of FIG. 7.

FIGS. 7 and 7A together are an exploded perspective representation of an example of a microfluidic fuel cell 700 having increased uniformity of fluid flow and/or increased uniformity of electrical contacts within the cell. Fuel cell 700 includes back plates 710 and 720, current collectors 730 and 740, anode plate 750, cathode plate 760, microfluidic channel layer 770, and through-bolts 780. Back plate 710 includes an electrolyte inlet 712, an electrolyte outlet 714, and eight bolt holes 716 for through-bolts 780. Back plate 720 includes a gas inlet 722, a gas outlet 724, and eight bolt holes 726 for through-bolts 780. The back plates 710 and 720 may be any rigid material, and preferably are electrically insulating. Examples of back plate materials include plastics such as polycarbonates, polyesters, and polyetherimides. The through-bolts 780 include nuts 781, and may include optional insulating sleeves 782.

Current collector 730 includes electrolyte holes 732 and 734, bolt holes 736 (only one labeled in FIG. 7), and electrical connector 738. Current collector 740 includes gas holes 742 and 744, bolt holes 746 (only one labeled in FIG. 7), and electrical connector 748. The current collectors 730 and 740 may include any conducting material, for example metal, graphite, or conducting polymer. The current collectors preferably are rigid, and may include an electrically insulating substrate and an electrically conductive layer on the substrate. Examples of current collector materials include copper plates, gold plates, and printed circuit boards coated with copper and/or gold.

The anode plate 750 includes a conductive plate 751 having bolt holes 752 (only one labeled in FIG. 7), electrolyte inlet 753, electrolyte outlet 754, inlet manifold 755, outlet manifold 756, and anode 758. Electrolyte inlet 753 is in fluid communication with inlet manifold 755, and electrolyte outlet 754 is in fluid communication with outlet manifold 756. The conductive plate 751 may include any conducting material, for example metal, graphite, or conducting polymer.

The microfluidic channel layer 770 includes bolt holes 772 (only one labeled in FIG. 7), and a channel pattern 774 that includes multiple spaces parallel with the width of the layer. The channel pattern 774 overlays the manifolds 755 and 756 and the anode 758.

FIG. 7A is an exploded perspective representation of the cathode plate 760. The cathode plate 760 includes a conductive plate 761 having bolt holes 762 (only one labeled in FIG. 7), gas inlet 763, gas outlet 764, one or more gas flow channels 766, cathode 768 and optional screen 769. The gas inlet 763 and gas outlet 764 are in fluid communication through the one or more gas flow channels 766. The conductive plate 761 may include any conducting material, for example metal, graphite, or conducting polymer. The cathode 768 preferably includes a GDE, a cathode catalyst on the GDE, and a hydraulic barrier on the catalyst. Optional screen 769 overlays the cathode 768 and the gas flow channel 766.

The cell 700 may be assembled by combining the back plates 710 and 720, the current collectors 730 and 740, the anode plate 750, the cathode plate 760 and the microfluidic channel layer 770, such that the microfluidic channel layer is sandwiched between the anode plate and the cathode plate. Seals such as o-rings or gaskets may be present, such as at one or more of the holes for the electrolyte and gas inlets and outlets. Optional adhesive or sealing layers (not shown) may be present between the anode plate 750 and the microfluidic channel layer 770 and/or between the cathode plate 760 and the microfluidic channel layer 770. A through-bolt 780 is placed through each aligned bolt hole, and each bolt is secured at the end with a nut 781.

The cell 700 may be operated by connecting the hole 712 to an electrolyte supply, connecting the hole 714 to an electrolyte outlet, connecting the hole 722 to a gas supply, connecting the hole 724 to a gas outlet, and connecting electrical collectors 738 and 748 to an electrical circuit. When a liquid electrolyte containing a fuel is circulated through the electrolyte inlet and outlet, and a gas containing an oxidant is circulated through the gas inlet and outlet, an electric potential is generated, and current flows through the electrical circuit in proportion to the external load.

An individual fuel cell increased uniformity of fluid flow and/or increased uniformity of electrical contacts within the cell may be incorporated into a fuel cell stack, which is a combination of electrically connected fuel cells. The fuel cells in a stack may be connected in series or in parallel. The individual fuel cells may have individual electrolyte, fuel and/or oxidant inputs. Two or more of the cells in a stack may use a common source of electrolyte, fuel and/or oxidant. A fuel cell stack may include only one type of fuel cell, or it may include at least two types of fuel cells. Preferably a fuel cell stack includes multiple fuel cells, where the cells are connected in series, and where the electrolyte, fuel and oxidant each are supplied from single sources.

Figure 8:
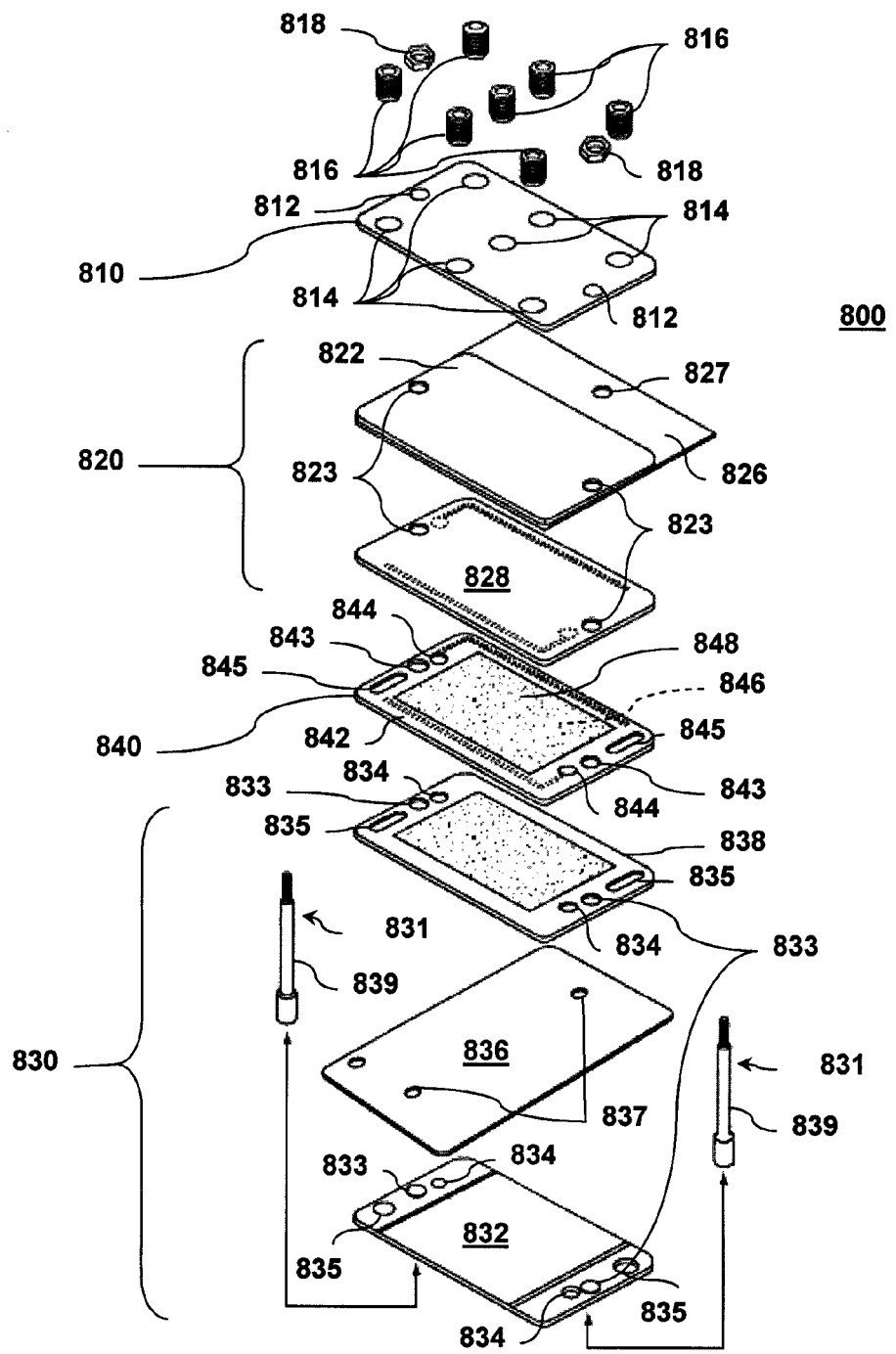
FIG. 8 is a representation of a fuel cell stack.

FIG. 8 is an exploded perspective representation of an example of a microfluidic fuel cell stack 800 including microfluidic fuel cells that have increased uniformity of fluid flow and/or increased uniformity of electrical contacts within the cell. Fuel cell stack 800 includes a compression plate 810, an anode endplate 820, a cathode endplate 830, and multiple electrode assemblies 840. The compression plate 810 includes holes 812 on either end and includes threaded holes 814 along the length of the plate and in the center of the plate. Holes 812 are for through-bolts 831, which pass through the height of the stack 800, and are secured with nuts 818. Set screws 816 may be threaded into the threaded holes 814 and tightened against the anode endplate 820.

The anode endplate 820 includes a back plate 822, holes 823 for the through-bolts 831, a current collector 826, and an anode assembly 828. The back plate 822 may be any rigid material, for example metal, glass, ceramic or plastic. The current collector 826 may include any conducting material, for example metal, graphite, or conducting polymer. The current collector can be connected to an electrical circuit, such as by attaching an electrical binding post to an optional hole 827 at the side edge of the current collector. The back plate and current collector optionally may be separated by an insulating layer (not shown). An insulating layer may be unnecessary if the back plate is not electrically conductive. The anode assembly 828 preferably includes a conductive plate, an anode having an anode catalyst, and a microfluidic channel structure.

The cathode endplate 830 includes through-bolts 831, a back plate 832, holes 833 for the through-bolts 831, holes 834 for electrolyte conduits, holes 835 for gas conduits, a current collector 836, and a cathode assembly 838. The back plate 832 may be any rigid material, for example metal, glass, ceramic or plastic. The current collector 836 may include any conducting material, for example metal, graphite, or conducting polymer. The current collector can be connected to an electrical circuit, such as by attaching an electrical binding post to an optional hole 837 at the side edge of the current collector. The back plate and current collector optionally may be separated by an insulating layer (not shown). An insulating layer may be unnecessary if the back plate is not electrically conductive. The through-bolts 831 may include optional insulating sleeves 839. The cathode assembly 838 preferably includes a conductive plate, a GDE, a cathode catalyst, and optionally a hydraulic barrier.

The electrode assembly 840 includes a conductive bipolar plate 842, holes 843 for the through-bolts 831, holes 844 for electrolyte conduits, holes 845 for gas conduits, an anode face 846, and a cathode face 848. The bipolar plate 842 provides for electrical conduction between the anode face 846 and the cathode face 848. The combination of a single electrode assembly 840 with an anode endplate 820 and a cathode endplate 830 provides for two complete fuel cells connected in series, with one cell between the anode endplate and the cathode face of the electrode assembly, and the other cell between the cathode endplate and the anode face of the electrode assembly. Multiple electrode assemblies may be arranged in series, such that the cathode face 848 of one assembly is in contact with the anode face 846 of the other assembly. The number of fuel cells in stack 800 is one plus the number of electrode assemblies 840 in the stack.

The stack 800 may be assembled by combining the compression plate 810, the anode endplate 820, multiple electrode assemblies 840, and the cathode endplate 830, such that the anode assembly 828 is in contact with the cathode face 848 of an electrode assembly, the cathode assembly 838 is in contact with the anode face 846 of another electrode assembly, and the electrode assemblies are oriented such that the cathode and anode faces are in contact in pairs. A through-bolt 831 is placed through each bolt hole provided when the components are aligned, and each bolt is secured at the end with a nut 818.

The stack 800 may be operated by connecting one hole 834 to an electrolyte supply, connecting the other hole 834 to an electrolyte outlet, connecting one hole 835 to a gas supply, connecting the other hole 835 to a gas outlet, and connecting current collectors 826 and 836 to an electrical circuit. When a liquid electrolyte containing a fuel is circulated through the electrolyte inlet and outlet, and a gas containing an oxidant is circulated through the gas inlet and outlet, an electric potential is generated, and current flows through the electrical circuit in proportion to the external load.

Figure 9:
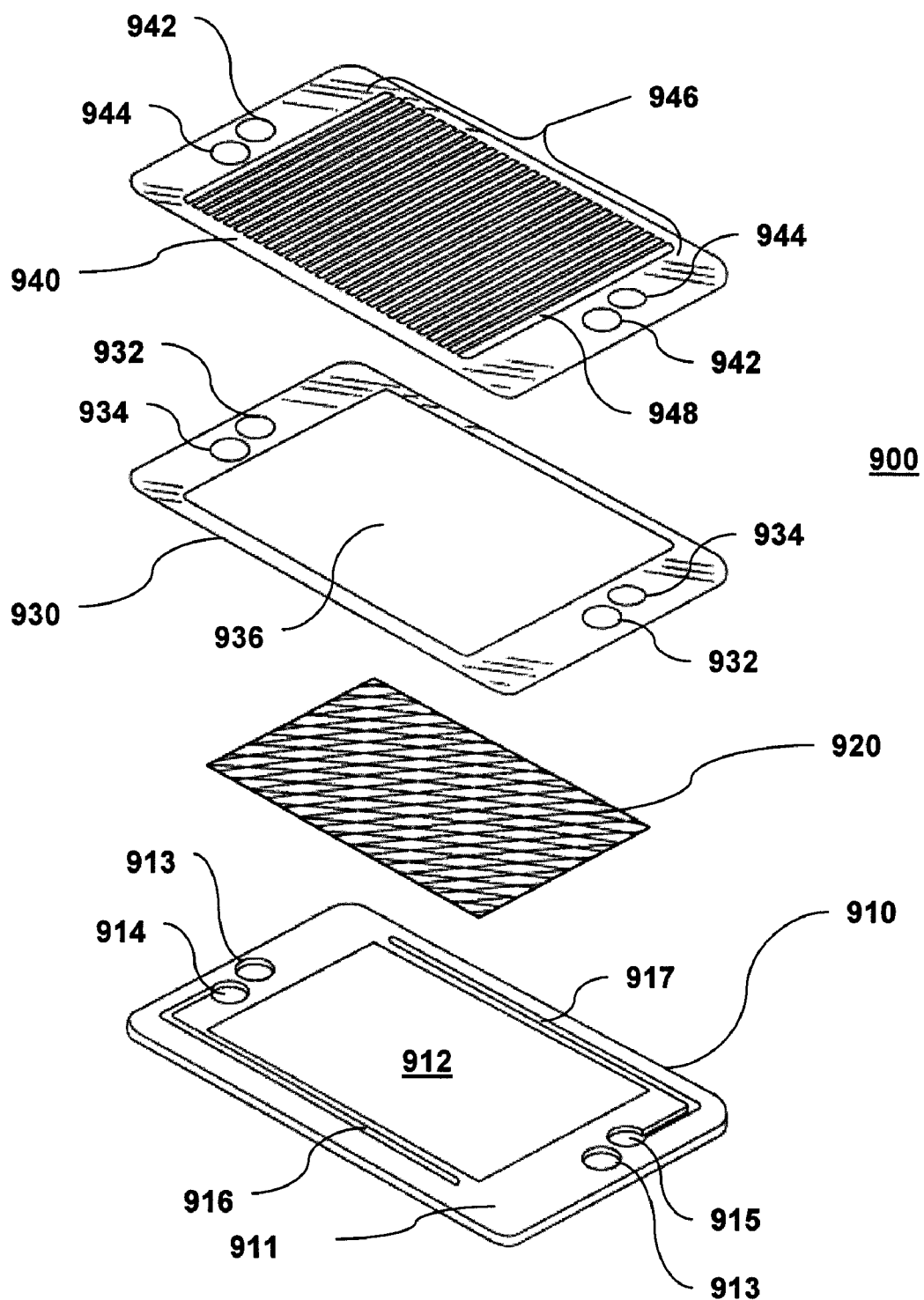
FIG. 9 is a representation of an anode endplate for a fuel cell stack.

FIG. 9 is an exploded perspective representation of an example of an anode assembly 900 that may be used as an anode assembly 828 in fuel cell stack 800. Anode assembly 900 includes a conductive anode plate 910, an anode 920, optional gasket 930, and a microfluidic channel layer 940. The anode plate 910 includes a perimeter 911, a conductive region 912 inside the perimeter, holes 913, indentations 914 and 915, and manifolds 916 and 917.

The top surfaces of the perimeter 911 and the conductive region 912 may be co-planar, or they may be in different planes. For example, at least a portion of the conductive region may be inset into the plate, such that it forms a trough in the center of the plate. The holes 913 align with through-bolt holes that pass through the height of a stack in which the anode assembly is present. The indentations 914 and 915 are an inlet and an outlet, respectively, for a liquid electrolyte. Inlet indentation 914 is in fluid communication with inlet manifold 916. Outlet indentation 915 is in fluid communication with outlet manifold 917. Preferably each manifold terminates at a point in line with the end of the conductive region 912.

The anode 920 includes an anode catalyst, and optionally includes a carbon layer. The optional gasket 930 includes a hole 932 at each end for a through-bolt, a hole 934 at each end for an electrolyte conduit, and a central opening 936. The microfluidic channel layer 940 includes a hole 942 at each end for a through-bolt, a hole 944 at each end for an electrolyte conduit, and a channel pattern 946 that includes multiple spaces 948. The channel pattern 946 overlays the manifolds 916 and 917 and the anode 920.

Figure 10:
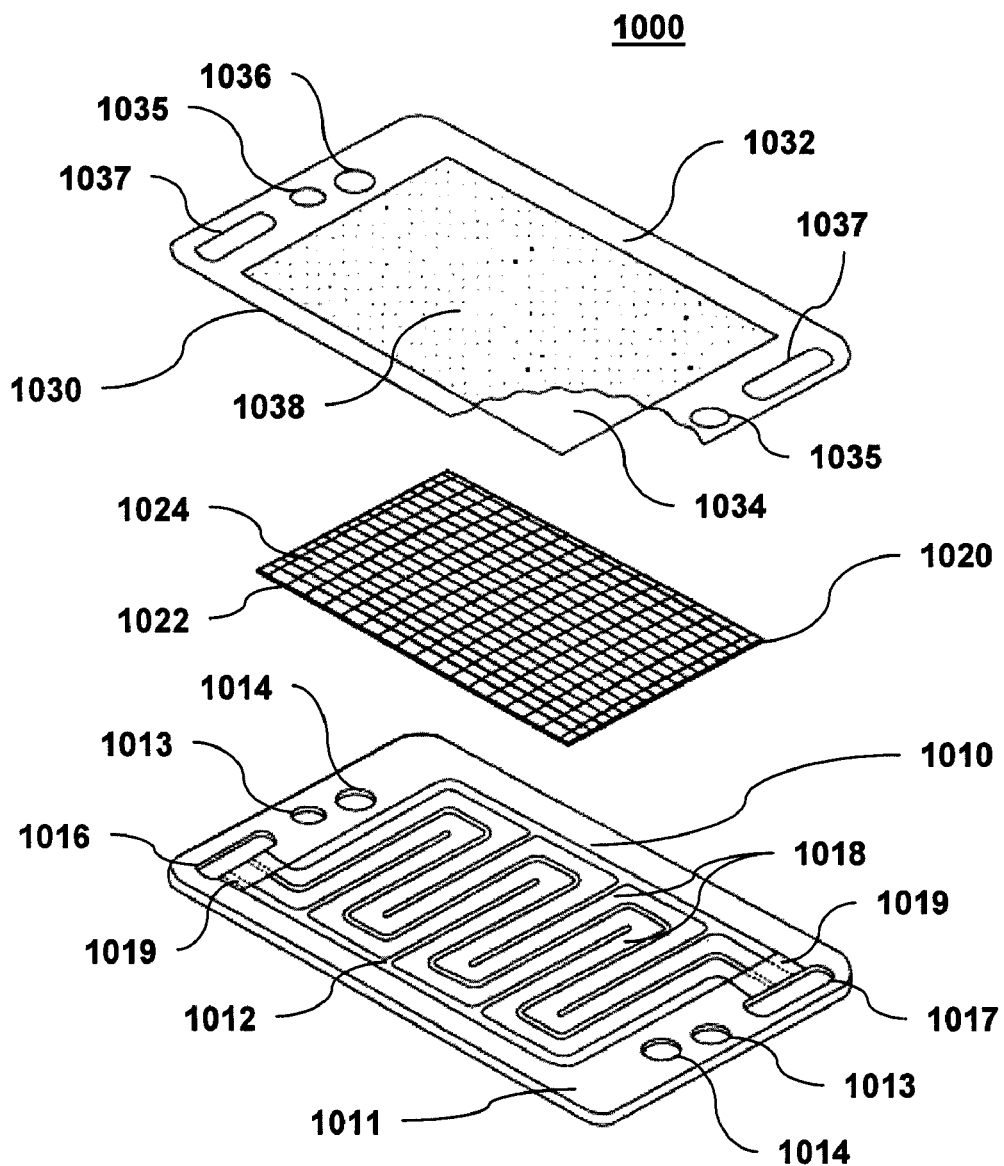
FIG. 10 is a representation of a cathode endplate for a fuel cell stack.

FIG. 10 is an exploded perspective representation of an example of a cathode assembly 1000 that may be used as a cathode assembly 838 in fuel cell stack 800. Cathode assembly 1000 includes a conductive cathode plate 1010, a cathode 1020 that includes a GDE 1022 and a cathode catalyst 1024, and an optional barrier layer 1030 that includes a screen 1032 and a hydraulic barrier 1034. The cathode plate 1010 includes a perimeter 1011, a conductive region 1012 inside the perimeter, holes 1013, 1014, 1016 and 1017, and gas flow channels 1018. The holes 1013 align with through-bolt holes that pass through the height of the stack in which the cathode assembly is present. The holes 1014 align with electrolyte conduits that pass through the height of the stack, and the holes 1016 and 1017 align with gas conduits that pass through the height of the stack. At either end of the flow channels, a bridge 1019 is present over the portion of the gas flow channels 1018 that extends from a hole 1016 or 1017 to the conductive region 1012. The bridge 1019 may be integral with the cathode plate 1010, or it may be a separate piece that fits over the portion of the gas flow channels. The bridge 1019 may be the same material as the cathode plate, or it may be a different material. The barrier layer 1030 includes a screen layer 1032 that includes a non-compressible film. The screen layer 1032 has a hole 1035 at each end for a through-bolt, a hole 1036 at each end for an electrolyte conduit (only one shown), a hole 1037 at each end for a gas conduit, and a mesh 1038.

The cathode 1020 may include a GDE 1022 that is coated on one side with a catalyst ink, such as an ink containing a cathode catalyst and a binder. The coated GDE may be dried to form a layer of catalyst 1024 on the GDE. An individual cathode 1020 may then be cut from this coated GDE, such as to a size matching that of the conductive region 1012.

The cathode assembly 1000 may be assembled by bonding the cathode 1020 to the barrier layer 1030, and then placing the barrier layer 1030 on the conductive region 1012 of the cathode plate 1010. The cathode 1020, the hydraulic barrier 1034, and the mesh 1038 overlay the conductive region 1012. The barrier layer may be attached to the cathode plate by an adhesive, such as a double-sided Kapton® tape having openings for the conductive region, through-bolts, and electrolyte and gas conduits. Pressure and/or heat may be applied to seal the cathode assembly.

Figure 11:
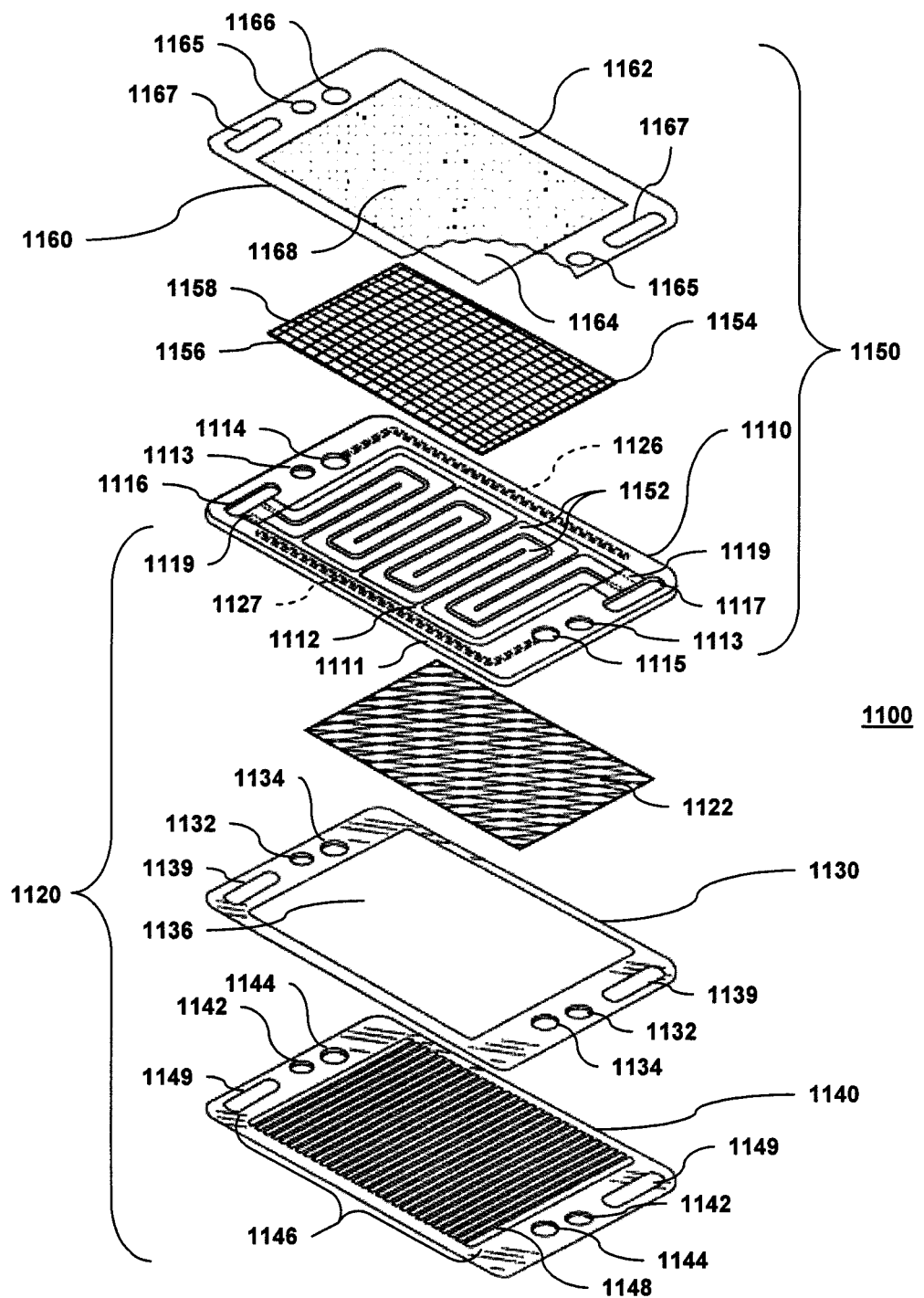
FIG. 11 is a representation of an electrode assembly for a fuel cell stack.

FIG. 11 is an exploded perspective representation of an example of an electrode assembly 1100 that may be used as an electrode assembly 840 in fuel cell stack 800. Electrode assembly 1100 includes a conductive bipolar plate 1110, an anode face 1120 and a cathode face 1150. The bipolar plate 1110 includes a perimeter 1111, a conductive region 1112, and holes 1113, 1114, 1115, 1116 and 1117. The conductive region 1112 provides for electrical conduction between the anode face 1120 and the cathode face 1150 of the electrode assembly. The holes 1113 align with through-bolt holes that pass through the height of a stack in which the electrode assembly is present. The holes 1114 and 1115 align with electrolyte conduits that pass through the height of the stack. The holes 1116 and 1117 align with gas conduits that pass through the height of the stack.

The anode face 1120 includes an anode 1122, optional gasket 1130, a microfluidic channel layer 1140, and manifolds 1126 and 1127. The anode 1122 includes an anode catalyst, and optionally includes a carbon layer. Inlet manifold 1126 is in fluid communication with hole 1114. Outlet manifold 1127 is in fluid communication with hole 1115. The optional gasket 1130 includes a hole 1132 at each end for a through-bolt, a hole 1134 at each end for an electrolyte conduit, a central opening 1136, and a hole 1139 at each end for a gas conduit. The microfluidic channel layer 1140 is a non-compressible film having a hole 1142 at each end for a through-bolt, a hole 1144 at each end for an electrolyte conduit, a channel pattern 1146 that includes multiple spaces 1148, and a hole 1149 at each end for a gas conduit. The channel pattern 1146 overlays the manifolds 1126 and 1127 and the anode 1122.

The cathode face 1150 includes gas flow channels 1152, a cathode 1154 that includes a GDE 1156 and a cathode catalyst 1158, and an optional barrier layer 1160 that includes a screen 1162 and a hydraulic barrier 1164. At either end of the flow channels, a bridge 1119 is present over the portion of the gas flow channels 1152 that extends from a hole 1116 or 1117 to the conductive region 1112. The bridge 1119 may be integral with the bipolar plate 1110, or it may be a separate piece that fits over the portion of the gas flow channels. The bridge 1119 may be the same material as the bipolar plate, or it may be a different material. The screen layer 1162 has a hole 1165 at each end for a through-bolt, a hole 1166 at each end for an electrolyte conduit (only one shown), a hole 1167 at each end for a gas conduit, and a mesh 1168. The screen layer 1162 and the assembly of the cathode face with the bipolar plate may be as described for the cathode assembly 1000.

The cathode 1154 may include a GDE 1156 that is coated on one side with a catalyst ink, such as an ink containing a cathode catalyst and a binder. The coated GDE may be dried to form a layer of catalyst 1158 on the GDE. An individual cathode 1154 may then be cut from this coated GDE, such as to a size matching that of the conductive region 1112.

Preferably the manifolds 1126 and 1127 are offset relative to the gas flow channels 1152. In the example of bipolar plate 1110, the overall width of the gas flow channels 1152 is smaller than the overall distance between the manifolds 1126 and 1127, such that the gas flow channels are completely located between the x-y footprint of the manifolds. One advantage of offsetting the manifolds relative to the gas flow channels is that the bipolar plate can be extremely thin without the manifolds and the gas flow channels intersecting. The lower limit of the plate thickness is thus based on the maximum depth of the manifolds and/or the gas flow channels. In contrast, if a portion of the manifolds and gas flow channels were on top of each other, the lower limit of the plate thickness would be based on the combined depths of the manifolds and the gas flow channels.

Increased uniformity of fluid flow within a flowing electrolyte fuel cell may be advantageous for a fuel cell that includes an anode in convective contact with the fuel. For an anode that is in convective contact with a fuel, the anode catalyst is in direct contact with the liquid electrolyte that includes the fuel, without an intervening layer or diffusion medium. Anode 758, 920 or 1122 each may be in convective contact with a fuel.

The anode catalyst may be present directly on a conductive plate, such as 751, 761, 910, 1010, or 1110. In one example, the anode catalyst is applied to a conductive plate as a catalyst ink containing the anode catalyst and the binder. One example of a catalyst ink includes Pt/Ru catalyst and Nafion® binder. Since the anode on the conductive plate is contiguous with a microfluidic channel that includes a liquid electrolyte containing a fuel, the anode catalyst may be in direct contact with the electrolyte that includes the fuel, without an intervening layer or diffusion medium.

The anode catalyst may be present on a conductive support, which is then in contact with the conductive plate. The conductive support may be, for example, a graphite layer, a metal foil or a metal mesh. In one example, a catalyst ink is applied to a porous graphite sheet, such as a GDE, and subjected to hot-pressing to stiffen the electrode and to normalize the electrode height. In another example, a catalyst ink is applied to a metal foil or mesh and then allowed to solidify. In these examples, an individual anode can be cut to an appropriate size, such as a size matching the conductive region of a conductive plate, or a size matching the inner dimensions of a trough of the conductive region. For an anode on a graphite layer, the anode may be adhered to the conductive region during assembly of the stack by a small amount of carbon paint. Since the anode on the conductive support is contiguous with a microfluidic channel that includes a liquid electrolyte containing a fuel, the anode catalyst may be in direct contact with the electrolyte that includes the fuel, without an intervening layer or diffusion medium.

In conventional flowing electrolyte fuel cells, a diffusion medium typically is present between the fuel stream and the anode catalyst. Surprisingly, it has been found that elimination of the diffusion medium between an anode catalyst layer and the fuel stream provides an unexpected improvement in the performance of the fuel cell. One possible explanation for this unexpected improvement is that the fuel efficiency of the cell is increased when the dissolved fuel does not have to pass through a diffusion medium or other barrier to interact with the anode catalyst. The rate of reduction of the fuel at the anode catalyst may be limited by the mass transport of the fuel through any material that is present between the fuel stream and the anode catalyst, since the diffusion of a solute in a liquid is a relatively slow process. When the diffusion distance is minimized or eliminated, the fuel molecules have a higher probability of reacting at the anode catalyst as the fuel or fuel mixture flows past the anode. Thus, for a given concentration of fuel in a mixture and a given flow rate of the fuel in the fuel cell, a higher number of fuel molecules can react at the anode to produce electrons.

Increased uniformity of fluid flow within a flowing electrolyte fuel cell may be facilitated by non-compressible electrodes. Anode 758, 920 or 1122 each may be a non-compressible anode. In one example, an anode with a controlled electrode height can be prepared by applying a catalyst ink to a graphite sheet and then hot-pressing the electrode, as described above.

The use of a non-compressible anode in a fuel cell can help ensure that fluid flow in the fuel cell is more uniform during normal use conditions. For example, the dimensions of the microfluidic channel can remain constant during normal use conditions when the electrode with which it is in contact is non-compressible. In contrast, if the electrode is compressible, the electrode material may flow or creep into the microfluidic channel, reducing the cross-sectional area and volume of the channel. If the reduction in the channel dimensions is not uniform across the area of the electrode, there can be variability in the electrical potential of the electrode, leading to a decrease in performance of the cell. In addition, a reduction in the cross-sectional area and volume of the channel can reduce the amount of fuel and/or electrolyte that can contact the electrode at a given fluid pressure.

Preferably the anode has a thickness dimension that is reduced by less than 25% when compressed in the thickness direction at a pressure of 160 psi for 20 minutes. More preferably, the anode has a thickness dimension that is reduced by less than 20% when compressed in the thickness direction at a pressure of 160 psi for 20 minutes. More preferably, when compressed in the thickness direction at a pressure of 160 psi for 20 minutes, the thickness dimension of the anode is reduced by less than 15%, more preferably by less than 10%, more preferably by less than 5%, and more preferably by less than 1%.

Increased uniformity of fluid flow within a flowing electrolyte fuel cell may be facilitated by a non-compressible spacer defining the microfluidic channel for the liquid electrolyte. Microfluidic channel layer 770, 940 or 1140 each may define microfluidic channels for the liquid electrolyte, and may be non-compressible. A microfluidic channel layer may include a non-compressible film material, such as a polycarbonate, a polyester, polyphenylene oxide (PPO), polyphenylene sulfide (PPS), poly(etheretherketone) (PEEK), polybenzimidazole (PBI), a polyimide (i.e. KAPTON), a polyetherimide (i.e. ULTEM), high-density polyethylene, and poly(tetrafluoro-ethylene) (PTFE). Mixtures of these materials may also be used. For example, KAPTON-FN is a polyimide film having a PTFE coating on at least one side. Preferably the microfluidic channel layer is electrically and ionically insulating.

Preferably the microfluidic channel layer has a thickness dimension that is reduced by less than 25% when compressed in the thickness direction at a pressure of 160 psi for 20 minutes. More preferably, the microfluidic channel layer has a thickness dimension that is reduced by less than 20% when compressed in the thickness direction at a pressure of 160 psi for 20 minutes. More preferably, when compressed in the thickness direction at a pressure of 160 psi for 20 minutes, the thickness dimension of the microfluidic channel layer is reduced by less than 15%, more preferably by less than 10%, more preferably by less than 5%, and more preferably by less than 1%.

A non-compressible microfluidic channel layer may be a non-compressible film material that includes a channel pattern. For example, the channel pattern may include multiple spaces parallel with the width or the length dimension of the layer. Preferably the channel pattern includes multiple spaces parallel with the width dimension of the layer. The channel pattern may be formed in a film by a variety of techniques, including photoetching and laser cutting.

In the example of microfluidic channel layer 770, 940, or 1140, the channel pattern overlays the manifolds of the conductive plate and the anode, and provides part of the microfluidic channel structure. The thickness of the film and the width of the spaces in the pattern define the dimensions of the microfluidic channels for the liquid electrolyte. In this example, the top and bottom of the microfluidic channels are provided on one side by the anode, and on the other side by a cathode plate (760), a cathode assembly (838), or the cathode face (1150) of an electrode assembly.

In one example, the liquid electrolyte is delivered to an area near the anode in a manifold, and distributed from the manifold into multiple microfluidic channels that traverse the electrode. Each of these microfluidic channels may have a dimension less than 500 micrometers. Preferably each channel has a dimension less than 400 micrometers, more preferably less than 300 micrometers, more preferably less than 250 micrometers, more preferably less than 200 micrometers, more preferably less than 100 micrometers, more preferably less than 75 micrometers, more preferably less than 50 micrometers, more preferably less than 25 micrometers, and more preferably less than 10 micrometers.

The use of a non-compressible spacer defining the microfluidic channel can help ensure that the dimensions of microfluidic channels in the cell are constant during normal use conditions. In contrast, when a compressible spacer is compressed between an anode and a cathode, the cross-sectional area and volume of the microfluidic channels may be diminished, leading to a decrease in the amount of fuel and/or oxidant that can contact the electrode at a given fluid pressure. In addition, if the reduction in the microfluidic channel dimensions is not uniform throughout the channels, then there can be variability in the electrical potential across the electrodes, leading to a decrease in performance of the cell.

The flow rate of a liquid electrolyte in an individual microfluidic channel may be from 0.01 milliliters per minute (mL/min) to 10 mL/min. Preferably the flow rate of the liquid electrolyte is from 0.1 to 1.0 mL/min, and more preferably is from 0.2 to 0.6 mL/min. The flow rate of the liquid electrolyte may also be expressed in units such as centimeters per minute (cm/min). Preferably the flow rate of the liquid electrolyte is at least 10 cm/min, more preferably at least 50 cm/min, and more preferably at least 100 cm/min. Preferably the liquid electrolyte is transported in an individual channel at a rate of from 10 to 1,000 cm/min, more preferably from 50 to 500 cm/min, and more preferably from 100 to 300 cm/min.

Increased uniformity of fluid flow within a flowing electrolyte fuel cell may be facilitated by a controlled liquid pressure drop in microfluidic channels across the anode. The pressure drop across the electrodes may be controlled by ensuring that the liquid pressure within the microfluidic channels accounts for the majority of the total liquid pressure of the fuel cell.

In one example, the liquid pressure drop across the anode is controlled by delivering the liquid electrolyte to a plurality of microfluidic channels in contact with the anode with an inlet manifold, and collecting the liquid electrolyte from the plurality of microfluidic channels with an outlet manifold. In the example of cell 700, anode assembly 900 or electrode assembly 1100, each of the microfluidic channel layers (770, 940 or 1140, respectively) overlays the manifolds and the anode, and provides part of the microfluidic channel structure. Preferably, the depth of the manifold is at least 5 times greater than the height of the microfluidic channels formed by the microfluidic channel layer. More preferably, the depth of the manifold is at least 10 times greater than the height of the microfluidic channels formed by the microfluidic channel layer.

In this example, when the liquid electrolyte flows through the fuel cell, the liquid has a first pressure, and when the liquid electrolyte flows across the anode through the microfluidic channels, the liquid has a second pressure, which is at least 70% of the first pressure. Thus, at least 70% of the total liquid pressure is accounted for by the microfluidic channels. Preferably the second pressure is at least 80% of the first pressure, more preferably is at least 85% of the first pressure, more preferably is at least 90% of the first pressure, and more preferably is at least 95% of the first pressure.

The use of a controlled liquid pressure drop in the microfluidic channel can help to minimize any differences in electrolyte flow rates between individual microfluidic channels in contact with the anode. The rate of reaction of fuel in the electrolyte may be relatively uniform across the surface of the anode. In contrast, if the liquid pressure in the microfluidic channels varies over time, the rate of reaction across the anode will also vary, leading to differences in electrical potential and/or temperature across the electrode, and impairing cell performance. Other advantages that may be related to a controlled liquid pressure drop in the microfluidic channel include easier sealing of the fuel cell, the ability to use higher flow velocities, and higher fuel conversion across the anode.

Increased uniformity of fluid flow within a flowing electrolyte fuel cell may be facilitated by the presence of a seal having controlled minimum thickness. A seal having a controlled minimum thickness may be non-compressible, or it may be compressible to a predetermined compressed thickness. Optional gasket 930 or 1130 each may be a seal having a controlled minimum thickness.

In one example, a gasket may include a non-compressible film that is hot-bonded to the perimeter (911, 1111) of a conductive plate. This type of gasket may be useful when the anode has been formed by directly applying a catalyst ink to a conductive plate. Examples of non-compressible film materials include polycarbonates, polyesters, polyphenylene oxide (PPO), polyphenylene sulfide (PPS), poly(etheretherketone) (PEEK), polybenzimidazole (PBI), polyimide (i.e. KAPTON), polyetherimide (i.e. ULTEM), high-density polyethylene (HDPE), and poly(tetrafluoroethylene) (PTFE).

In another example, a gasket may include a non-compressible film having an adhesive on each side, and having a compressible film adhered to one side of the non-compressible film. The remaining adhesive side of the film may then be adhered to the perimeter (911, 1111) of a conductive plate. This type of gasket may be useful when the anode includes an anode catalyst on a carbon layer, since the thickness of the compressed gasket can match the thickness of the anode that extends above the plane of the conductive plate. A compressible film can conform to the surface to which it is pressed. Preferably the compressible film is hydrophobic. Examples of compressible film materials include ePTFE, polysiloxanes, and expanded polyethylene.

In another example, a gasket may include a non-compressible film having a compressible film on each side. This type of gasket may be a 3-layer gasket. For example, the compressible film in a 3-layer gasket may be an adhesive having a low tack, such as a silicone adhesive. This type of gasket may be a 5-layer gasket, in which the non-compressible film has an adhesive on each side, and has a compressible film adhered to each of the adhesive sides.

In another example, a gasket may include a single material that is compressible to a minimum thickness. For example, a crosslinked polymer may be compressed initially when subjected to pressure, but has a minimum compressed thickness as the pressure is increased.

The use of one or more gaskets having controlled minimum thicknesses may help ensure that other components of the fuel cell are not subjected to compression beyond a desirable level, while providing for a liquid tight seal for the liquid electrolyte. For example, it may be desirable to compress the anode, the cathode, the microfluidic flow channel spacer and/or other components only to a particular pressure, to help ensure that the dimensions of the microfluidic channels in the cell are constant during normal use conditions. Preferably the gasket retains at least 75% of its original thickness when compressed. More preferably the gasket retains at least 80% of its original thickness when compressed, more preferably at least 85%, more preferably at least 90%, and more preferably at least 95%.

Increased uniformity of fluid flow within a flowing electrolyte fuel cell may be facilitated by the presence of a screen between the microfluidic channel and a hydraulic barrier on the cathode. Examples of screens include optional screens 769, 1032 and 1162. A screen may be made of any porous rigid material, for example metal, glass, ceramic or plastic. Specific examples of porous rigid materials include stainless steel screens and polyimide (i.e. KAPTON) screens. In one example, a screen may include a non-compressible film, at least a portion of which is in the form of a mesh, such as mesh 1038 or 1168. The mesh allows liquid to pass through at least the central area of the screen layer.

It is preferable to include a screen if a hydraulic barrier is present on the cathode catalyst. The screen may provide for a physical stabilization of the hydraulic barrier, when the fuel cell is sealed by compression. In the absence of a screen, the hydraulic barrier may flow or creep when the cell is sealed, resulting in a lack of uniformity of the cross-section of the microfluidic channels.

An optional hydraulic barrier, such as optional hydraulic barrier 1034 or 1164, may be present on the cathode to protect the electroactive area of the cathode from direct bulk contact with liquid electrolyte present in the fuel cell. If a surface of the cathode is in contact with a liquid electrolyte, that surface preferably blocks the bulk hydraulic flow of liquid electrolyte into the cathode but permits transport of water and ions between the liquid electrolyte and the cathode. The transport of ions provides the reactant to the cathode that is necessary to complete the cell reaction with the oxidant. When solvated protons from the anode are transported to the cathode, an electro-osmotic drag may occur, providing a driving force for water to accumulate within the cathode structure. Conversely, water produced by the reduction reaction at the cathode also may back-transport toward the anode, creating a force in opposition to electro-osmotic drag. The presence of a liquid electrolyte in the fuel cell may reduce the rate of electro-osmotic drag and/or increase the rate of transport of liquid water away from the cathode.

In one example, the cathode catalyst may form a fluid-tight layer at the surface of the GDE of the cathode. In this example, it is preferable for the portion of the catalyst in contact with the liquid electrolyte to be hydrophilic, so as to facilitate the transport of water through the fluid-tight layer. Such a fluid-tight catalyst layer may serve as a hydraulic barrier. In another example, the cathode includes a distinct hydraulic barrier between the GDE and the liquid electrolyte. Preferably the primary mode of transport between the two fluids is by diffusion through the barrier. Preferably the hydraulic barrier, if present, is hydrophilic so as to facilitate the transport of water and ions through the barrier to the catalyst.

Examples of materials for an optional hydraulic barrier include inorganic networks, such as porous ceramics, zeolites and catalyst layers; organic networks, such as carbon tubes and crosslinked gels; membranes, such as microfiltration membranes, ultrafiltration membranes, nanofiltration membranes and ion-exchange membranes; and combinations of inorganic networks, organic networks and/or membranes, such as inorganic/organic composites. Preferably the hydraulic barrier has a total thickness of 100 microns or less. If the hydraulic barrier is too thick or too hydrophobic to maintain proton and water transport rates in either direction, the cell can suffer resistive losses that inhibit performance.

In one example, an optional hydraulic barrier includes a membrane, such as a permeable polymeric material that restricts the transport of at least one chemical substance. See, for example, Baker, R. W. "Membrane Technology," *Encyclopedia of Polymer Science and Technology*, Vol. 3, pp. 184-248 (2005). For example, the hydraulic barrier may include a membrane separator that is typically used between the electrodes of a fuel cell, a battery, or a redox flow cell. These membrane separators include polymer electrolyte membranes (PEM), which may be cation-exchange membranes or anion-exchange membranes. Examples of PEMs that may be used as a hydraulic barrier include polymers and copolymers derived at least in part from perfluorosulfonic acid, such as Nafion® (DuPont; Wilmington, Del.), Aciplex® S1004 (Asahi Chemical Industry Company; Tokyo, Japan), XUS-13204 (Dow Chemical Company; Midland, Mich.), and GORE-SELECT® (W. L. Gore; Elkton, Md.). These membrane separators also include non-ionic polymers, such as expanded poly(tetrafluoroethylene) (i.e. GORE-TEX®, W. L. Gore); expanded polyethylene; aromatic polymers such as polyphenylene oxide (PPO), polyphenylene sulfide (PPS), polyphenylene sulfone, poly(etheretherketone) (PEEK), polybenzimidazole (PBI), polybenzazoles, polybenzothiazoles, polyimides, polyetherimides and fluorinated polystyrene; and inorganic-organic polymers, such as polyphosphazenes and poly(phenylsiloxanes). Non-ionic membrane separators typically serve as a matrix to hold the electrolyte between the two electrodes, and may be doped with acid electrolyte to become proton conducting. The acid electrolyte may be a liquid electrolyte or a solid electrolyte, such as a polymer electrolyte. These non-ionic membrane separators may be functionalized with acid groups or ammonium groups to form cation-exchange membranes or anion-exchange membranes. A membrane separator may have the cathode catalyst, such as 4 mg/cm$^2$ Pt black, bonded on one side. Unlike the membrane separator between the anode and cathode of a PEM fuel cell, which has catalyst on both sides of the membrane, this hydraulic barrier has catalyst on only one side of the layer.

In another example, an optional hydraulic barrier includes a hydrogel, which is a polymeric network that has been expanded with a liquid, where the polymeric network includes a polymer having chemical or physical crosslinks between the polymer chains. Examples of fuel cells having a hydraulic barrier that includes a hydrogel are disclosed in U.S. patent application Ser. No. 12/105,071, filed Apr. 17, 2008, entitled "Hydrogel Barrier For Fuel Cells." For example, a hydraulic barrier may include a polymeric network that has been expanded by an aqueous liquid, such as water or an electrolyte. The term "aqueous liquid" means a liquid containing at least 25 percent by weight (wt %) water. In this example, the polymer network is insoluble in the aqueous liquid, and swells when contacted with the aqueous liquid. The aqueous liquid may be an electrolyte, as described above for the liquid electrolyte. Preferably the polymer network is chemically resistant to the aqueous liquid and is thermally stable at the temperatures at which the cell may be stored and operated. Preferably the polymer network is insoluble in, and chemically resistant to, any other liquids that may contact the network during storage or operation of the fuel cell, such as the liquid electrolyte.

The polymer of the hydrogel may have an acid capacity less than 0.8 milliequivalents per gram (meq/g). Acid capacity of a polymer is determined by the following test. A known mass of the polymer is titrated with an aqueous solution of NaOH having a known concentration. The value of the equivalents of NaOH needed to neutralize the polymer is divided by the mass of the polymer, to provide the acid capacity. Preferably the polymer has an acid capacity less than 0.7 meq/g, more preferably less than 0.6 meq/g, more preferably less than 0.5 meq/g, more preferably less than 0.4 meq/g, more preferably less than 0.3 meq/g, more preferably less than 0.2 meq/g, more preferably less than 0.1 meq/g, more preferably less than 0.05 meq/g, more preferably less than 0.01 meq/g, more preferably less than 0.001 meq/g.

The polymer of the hydrogel may include acid groups covalently bound to the polymer, such as carboxylic acid groups, phosphoric acid groups and/or sulfonic acid groups. In one example, the polymer may include sulfonic acid groups covalently bound to the polymer, provided the polymer has an acid capacity less than 0.8 meq/g. Polymers including sulfonic acid groups covalently bound to the polymer may include monomer units derived from monomers such as styrene sulfonic acid, vinyl sulfate, sulfonated perfluoro(alkyl vinyl ether), 2-acrylamido-2-methyl-1-propanesulfonic acid (AMPS), 2-methyl-2-propene sulfonic acid, 2-sulfopropyl methacrylate, and 3-sulfopropyl acrylate. In another example, the polymer may include carboxylic acid groups covalently bound to the polymer. Preferably the acid capacity of a polymer that includes carboxylic acid groups is less than 0.8 meq/g. Polymers including carboxylic acid groups covalently bound to the polymer may include monomer units derived from monomers such as acrylic acid, methacrylic acid, itaconic acid, and glutamic acid. In another example, the polymer may be a polymer that has been functionalized with acid groups after polymerization, such as an acid-functionalized polymer containing aromatic groups in the polymer chain.

The polymer of the hydrogel may include base groups covalently bound to the polymer, such as amine groups, ammonium groups, imine groups, and pyridine groups. For example, the polymer may include monomer units derived from monomers such as vinyl pyridine, ethylene imine, vinylamine, vinylaniline, acryloxyethyltrimethyl ammonium chloride, N,N-diallyldimethylammonium chloride, or (3-acrylamidopropyl) trimethylammonium chloride. In another example, the polymer may be a polymer that has been functionalized with base groups after polymerization, such as a base-functionalized polymer containing aromatic groups in the polymer chain. These base groups may be present instead of, or in addition to, acid groups covalently bound to the polymer. A polymer that has no acid groups covalently bound to the polymer has an acid capacity of 0 meq/g. Preferably the polymer has no acid groups covalently bound to the polymer.

The polymer of the hydrogel may include neither acid groups nor base groups. Such a neutral polymer is preferably hydrophilic, to ensure that the polymer network swells in the aqueous liquid. A hydrophilic polymer is a polymer that, in the absence of chemical or physical crosslinking between the polymer chains, has a solubility in water greater than 10 percent by weight (wt %) at 25° C. Examples of neutral hydrophilic polymers include poly(vinyl alcohol) (PVA), poly(hydroxyethyl methacrylate) (pHEMA), poly(N-vinyl pyrrolidone) (PVP), poly(ethylene oxide) (PEO), poly(ethylene glyclol) (PEG), poly(propylene oxide) (PPO) and poly(methyl vinyl ether) (PMVE). Examples of neutral hydrophilic polymers also include cellulose and ethers and esters of cellulose, such as hydroxyethyl cellulose (HEC), hydroxypropyl cellulose (HPC), hydroxyethyl methyl cellulose (HEMC), hydroxypropyl methyl cellulose (HPMC). A neutral polymer has an acid capacity of 0 meq/g. Preferably the polymer has no acid groups covalently bound to the polymer.

A neutral hydrophilic polymer may include some monomer units that are hydrophilic and some monomer units that are hydrophobic. A monomer unit is hydrophilic if a non-crosslinked polymer containing only that monomer unit has a solubility in water greater than 10 wt % at 25° C. A monomer unit is hydrophobic if a non-crosslinked polymer containing only that monomer unit has a solubility in water of at most 10 wt % at 25° C. Examples of hydrophilic monomers include acrylamide and methacrylamide based monomers, such as acrylamide, N,N-dimethyl acrylamide, N-methyl acrylamide, N-ethyl acrylamide, N-isopropyl acrylamide, diacetone acrylamide and hydroxymethyl acrylamide; hydroxyalkyl acrylates and hydroxyalkyl methacrylates, such as hydroxyethyl methacrylate, hydroxyethyl acrylate and 4-t-butyl-2-hydroxycyclohexyl methacrylate; polyalkoxyl acrylates and polyalkoxyl methacrylates, such as polyethyleneglycol acrylates and polyethyleneglycol methacrylates; N-vinylpyrrolidinone; and N-vinylformamide. Examples of hydrophobic monomers include branched or linear $C_1$-$C_{18}$ alkyl vinyl ethers, vinyl esters, acrylamides, acrylates and methacrylates. Specific examples of these types of hydrophobic monomers include butyl acrylate, 2-ethylhexyl acrylate, ethyl acrylate, lauryl acrylate, hexadecyl acrylate and methacrylate analogs of these alkyl acrylates. Examples of hydrophobic monomers also include olefins such as ethylene, propylene, butene, isoprene and styrene, including fluorinated derivatives of these. Hydrophilic and hydrophobic monomer units may also be present in polymers that include acid and/or base groups covalently bound to the polymer.

Increased uniformity of fluid flow within a flowing electrolyte fuel cell may be facilitated by interdigitated gas flow channels for the oxidant. For example, serpentine gas flow channels 766 or 1018 may be replaced with interdigitated gas flow channels. Gas flow channels provide for flow of oxidant gas across the conductive region of the cathode between the oxidant gas inlet and the oxidant gas outlet.

The use of interdigitated gas flow channels may provide for improved distribution of the oxidant to the cathode catalyst. For gas flow channels in an interdigitated configuration, one gas flow channel is connected only to an inlet hole, while the other gas flow channel is connected only to an outlet hole. In this configuration, the gas from the inlet passes from an inlet channel, through a portion of the GDE of the cathode, to the outlet channel, and then to the gas outlet. This flow path may force the gas to reside in the GDE matrix longer, allowing the oxidant to react with cathode catalyst on the GDE that otherwise might be blocked by the walls of the channels.

Regardless of the configuration of the gas channels (serpentine, interdigitated, etc.), it is preferred for the majority of the gas pressure to be accounted for by the gas channels. For example, when the oxidant gas flows through the fuel cell, the gas has a first pressure, and when the oxidant gas flows through the gas channels, the gas has a second pressure, which is at least 70% of the first pressure. Thus, at least 70% of the total gas liquid pressure is accounted for by the gas flow channels. Preferably the second pressure is at least 80% of the first pressure, more preferably is at least 85% of the first pressure, more preferably is at least 90% of the first pressure, and more preferably is at least 95% of the first pressure. Preferably the maximum depth of the gas channels is as thin as possible, while still providing a useable gas flow.

Increased uniformity of electrical contacts within a flowing electrolyte fuel cell may be facilitated by the presence of rigid conductive plates. Conductive plates 751, 761, 910, 1010 or 1110 each may be a rigid conductive plate. Examples of rigid conducting materials that may be used as a component of a conductive plate include graphite, stainless steel and titanium. Examples of rigid insulating materials that may be used as a component of a conductive plate include polycarbonates, polyesters, polyphenylene oxide (PPO), polyphenylene sulfide (PPS), poly(etheretherketone) (PEEK), polybenzimidazole (PBI), polyimide (i.e. KAPTON), a polyetherimide (i.e. ULTEM), high-density polyethylene (HDPE), and poly(tetrafluoroethylene) (PTFE).

The use of rigid conductive plates may provide for the fuel cell to be compressed without affecting the planarity of the conductive plates. For example, if an anode, cathode or bipolar plate deviates from planarity when a fuel cell is sealed, then the cross-section of the microfluidic channels may become non-uniform.

Increased uniformity of electrical contacts within a flowing electrolyte fuel cell may be facilitated by the presence of electrolyte ports that are electrically and ionically insulated. Specifically, the electrolyte ports may be electrically and ionically insulated from the conductive portion of the conductive plate. Preferably the electrolyte inlet (753, 914, 1114) and outlet (754, 915, 1115) of a conductive plate are electrically and ionically insulated from the conductive region of the plate and any conduit channels. More preferably the electrolyte inlet, electrolyte outlet and the manifolds (755, 756, 916, 917, 1126, 1127) of an anode plate or a bipolar plate, and the holes (834, 844, 1014) for electrolyte conduits of a cathode plate, are electrically and ionically insulated from the conductive region of the plates.

In one example, the inlet, outlet, manifolds and/or holes are present in an electrically and ionically insulating perimeter around the conductive region. For example, perimeter 911, 1011, or 1111 each may be electrically and ionically insulating. Examples of electrically and ionically insulating perimeter materials include polycarbonates, polyesters, polyphenylene oxide (PPO), polyphenylene sulfide (PPS), polysulfone (i.e. UDEL), poly(etheretherketone) (PEEK), polybenzimidazole (PBI), polyimide (i.e. KAPTON), a polyetherimide (i.e. ULTEM), high-density polyethylene (HDPE), and poly(tetrafluoroethylene) (PTFE).

In another example, the inlet, outlet, manifolds and/or holes are coated with a material that is an electrical and ionic insulator, such as a polyetherimide (i.e. ULTEM) coating. This approach may be useful when the perimeter and its corresponding conductive region (911 and 912, 1011 and 1012, or 1111 and 1112) are a single piece of conducting material, such as metal, graphite or conducting polymer.

Figure 13:
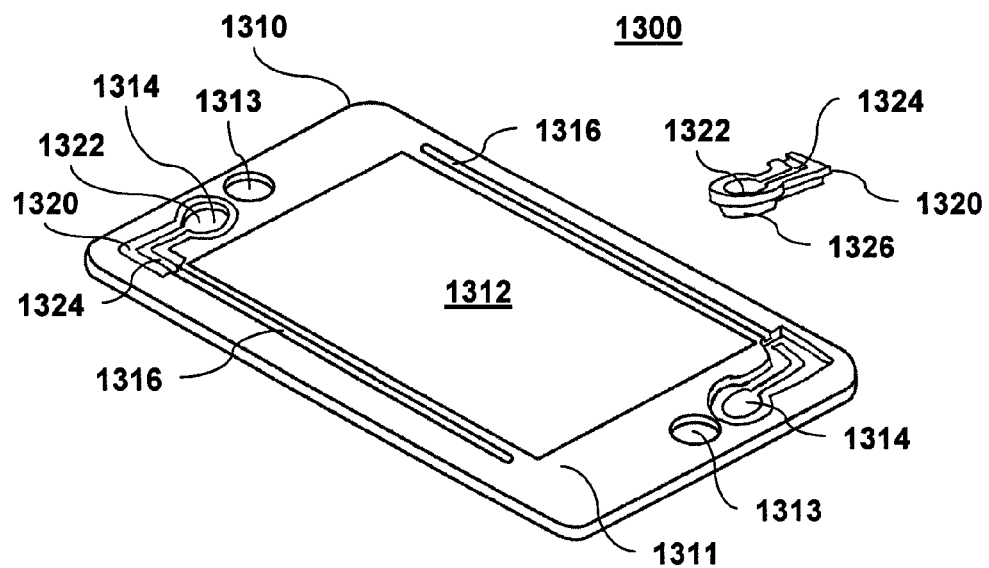
FIG. 13 is a representation of an electrode plate including electrically and ionically insulating inserts.

In another example, the perimeter of a conductive plate includes an electrically and ionically insulating insert that forms the inlet, outlet, holes, and at least a portion of the manifolds. FIG. 13 is an exploded representation of an electrode plate 1300 that includes a conductive plate 1310 and inserts 1320. The conductive plate 1310 includes a perimeter 1311, a conductive region 1312 inside the perimeter, holes 1313 and 1314, and manifolds 1316. The holes 1313 align with through-bolt holes that pass through the height of a stack in which the electrode plate is present. The holes 1314 are the inlet and outlet for a liquid electrolyte, and are in fluid communication with the manifolds 1316. Inserts 1320 include a hole 1322, a channel 1324, and a tapered portion 1326. Inserts 1320 fit into the conductive plate 1310, such that the channel 1324 forms a portion of the manifold 1316, and the hole 1322 is in fluid communication with the manifold. The tapered portion 1326 on the bottom of the insert can form a press-fit connection with the top of an insert in an electrode plate that is in contact with the bottom of the plate 1300. The press-fit connection can help to form a liquid-tight cell in a fuel cell stack, and can also assist in alignment of the electrode plates in the stack. Inserts 1320 may be any electrically and ionically insulating material. In one example, the inserts are PTFE. Electrode plate 1300 may be configured as an anode plate, as shown, or as a bipolar plate.

Insulating an electrolyte port from conductive materials in a conductive plate may minimize or eliminate corrosion of the conducting materials that could otherwise occur. Without insulation of the electrolyte port from conducting materials, an electrical or ionic current may be established between the conductive region of a plate and the liquid electrolyte. Such a current may be corrosive, if the components of the electrolyte can react electrochemically with the conducting material. This can be especially problematic for plates that are at or near the end of a stack of fuel cells and thus have a large electric potential relative to the electrolyte.

Increased uniformity of electrical contacts within a flowing electrolyte fuel cell may be facilitated by controllable sealing of the cell without multiple through-bolts around the cell. A flowing electrolyte fuel cell may include a compression plate on at least one end of the fuel cell to assist in sealing the cell. A compression plate may include a rigid plate and multiple set screws through the plate. The force of each set screw against the end of the fuel cell can be independently adjusted, so that a liquid-tight seal of the fuel cell may be obtained. The compression plate may be any rigid material, for example metal, glass, ceramic or plastic. Examples of compression plate materials include plastics such as polycarbonates, polyesters, and polyetherimides; and metals such as stainless steel and titanium.

In one example, compression plate 810 includes threaded holes 814 along the length of the plate and in the center of the plate. Set screws 816 may be threaded into the threaded holes 814 and tightened against the anode endplate 820 to contribute to the sealing of the stack. In contrast, fuel cell 700 includes eight bolt holes 716 around the perimeter of the cell, which reduces the proportion of the cell area that can be electrochemically active.

One or more of these components may be present in a flowing electrolyte fuel cell. A flowing electrolyte fuel cell including one or more of these components may be a laminar flow fuel cell (LFFC). Examples of LFFC's that may include one or more of these components include LFFC's using a single flowing electrolyte, and IDCI-based LFFC's using two flowing electrolytes.

Figure 2:
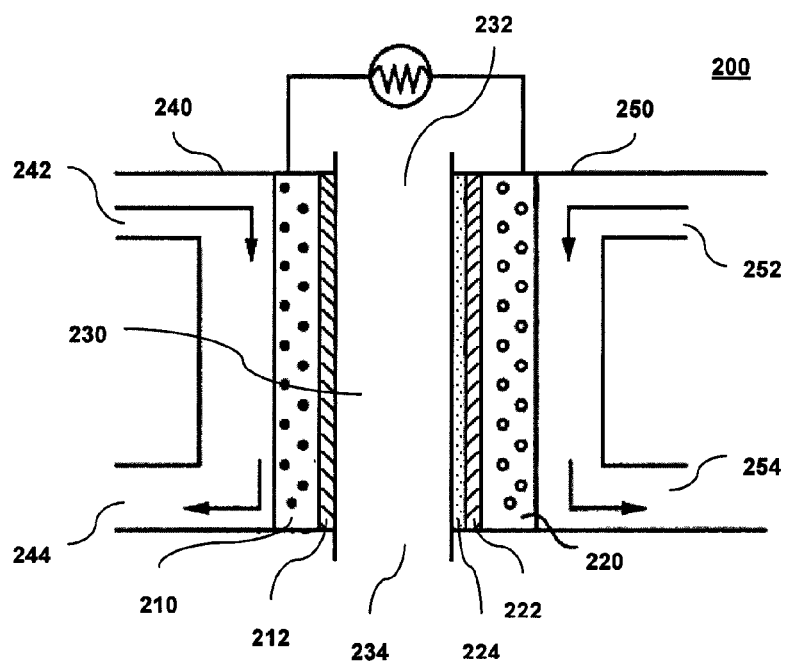
FIG. 2 is a schematic representation of a flowing electrolyte fuel cell.

FIG. 2 represents an example of a flowing electrolyte fuel cell 200 that includes an anode 210 including an anode catalyst, a cathode 220 including a gas diffusion electrode (GDE) and a cathode catalyst on the GDE, a central microfluidic channel 230 that is contiguous with the anode and with the cathode, an optional fuel channel 240 that is contiguous with the anode, an optional oxidant channel 250, and a liquid electrolyte that includes a fuel. Central channel 230 includes an inlet 232 and an outlet 234. Optional fuel channel 240 includes a fuel inlet 242 and an optional fuel outlet 244. Optional oxidant channel 250 includes an oxidant inlet 252 and an optional oxidant outlet 254. The liquid electrolyte that includes a fuel may be in the central microfluidic channel 230 and/or in the optional fuel channel 240. The anode 210 may be in convective contact with the fuel in the liquid electrolyte. The anode 210 optionally may include a conductive layer, with the anode catalyst on the conductive layer, and optionally may include a hydraulic barrier 212. The cathode 220 optionally may include a hydraulic barrier 222 on the cathode catalyst, and optionally may include a screen layer 224 on the hydraulic barrier.

In another example of fuel cell 200, the anode 210 is in contact with fuel channel 240. A fuel composition flows through the channel from fuel inlet 242 to fuel outlet 244, contacting the catalyst of the anode to form protons and electrons. The fuel composition may contain a fuel. In another example of fuel cell 200, the anode 210 is in contact with fuel channel 240, and the fuel is supplied to the anode as a stream of gaseous hydrogen or methanol. In this example, the anode 210 includes a GDE, and maintaining an adequate gas pressure at the outlet 244 may provide for essentially one-way diffusion of fuel through the GDE. When pure hydrogen or methanol is used as the gaseous fuel, no depleted fuel is formed. Thus, a fuel outlet may be unnecessary, and the fuel channel 240 may be closed off or may terminate near the end of anode 210. However, in this example, an outlet 244 for the fuel channel may be useful to remove gaseous reaction products, such as $CO_2$.

In another example of fuel cell 200, fuel channel 240 is not present, the fuel instead being in the liquid electrolyte 230. The fuel in the liquid electrolyte contacts the catalyst of the anode to form protons and electrons. The liquid electrolyte may contain a fuel such as methanol. One potential complication of this example is that there is an increased risk of fuel crossover to the cathode 220, relative to a fuel cell having the anode positioned between the fuel composition and the liquid electrolyte. This risk may be minimized by the presence of the hydraulic barrier 222 between the cathode catalyst and the liquid electrolyte and/or by using two liquid streams within the liquid electrolyte.

The cathode 220 has first and second surfaces. The first surface is separated from the anode 210 by an electrolyte. Optional hydraulic barrier 222 may be present at the first surface. The cathode 220 may further include an optional screen between the central channel 230 and the barrier layer 222. The second surface of cathode 220 may be in contact with optional oxidant channel 240. The oxidant for reaction at the cathode is provided in the optional oxidant channel 240 and/or the central channel 230.

In an example of fuel cell 200, the cathode 220 is in contact with oxidant channel 240, and the oxidant is supplied to the cathode through the oxidant channel, in the liquid electrolyte. In this example, the optional central channel is not present, and the anode and cathode are separated by stationary electrolyte 260 or 270. In another example of fuel cell 200, oxidant channel 240 is not present. In this example, oxidant is in the liquid electrolyte, which flows in central channel 250.

In yet another example of fuel cell 200, the cathode 220 is in contact with oxidant channel 240. In this example, the oxidant supplied to the cathode may be a stream of air or gaseous oxygen. For an oxidant channel 240 having an oxidant outlet 244, maintaining an adequate pressure at the outlet may provide for essentially one-way diffusion of oxidant through the GDE of cathode 220. When pure oxygen is used as the gaseous oxidant, no depleted oxidant is formed. Thus, an oxidant outlet may be unnecessary, and the oxidant channel 240 may be closed off or may terminate near the end of cathode 220. However, in this example, an outlet 244 for the oxidant channel may be useful to remove reaction products, such as water.

In fuel cell 200, the liquid electrolyte passes through the cell in a microfluidic channel that is contiguous with at least one of the anode 210 and the cathode 220. The microfluidic channel may be one of multiple microfluidic channels that traverse the area between the anode 210 and the cathode 220. The optional stationary electrolytes 260 and 270 may have flow rates of from zero to a rate that is one order of magnitude smaller than the flow rate of the liquid electrolyte. A stationary electrolyte may be a liquid that is sealed in the cell. A stationary electrolyte may be in a hydrogel. For example, an optional stationary electrolyte 260 or 270 may be the liquid that expands the polymeric network of a hydrogel.

Fuel cell 200 may further include an optional porous separator between the anode and the cathode. A porous separator may be present between optional stationary electrolytes 260 and 270, or between a stationary electrolyte and central channel 250. The porous separator can keep stationary and/or flowing electrolytes separate without interfering significantly with ion transport between the liquids. The porous separator preferably is hydrophilic, so the fluid within the electrolytes is drawn into the pores by capillary action. The liquids on either side of the separator are thus in direct contact, allowing ion transport between the two liquids. When the pores are small and the total area of the pores is a small percentage of the total area of the porous separator, mass transfer of fluid from one liquid to the other is very small, even if there is a significant difference in pressure between the liquids and across the separator. This lack of mass transfer may provide for a decrease in fuel crossover. Examples of porous separators and their use in electrochemical cells are disclosed in U.S. patent application Ser. No. 11/228,453, filed Sep. 15, 2005, entitled "Electrochemical Cells."

Fuel cell 200 may further include proton-conducting nanoparticles between the cathode and the anode. As described in U.S. patent application Ser. No. 11/533,210, filed Sep. 19, 2006, entitled "Permselective Composite Membrane For Electrochemical Cells", incorporation of proton-conducting metal nanoparticles, such as palladium nanoparticles, between the cathode and the anode may provide for a decrease in fuel crossover, while maintaining acceptable levels of proton conduction. The proton-conducting metal nanoparticles may be present in a mixture with a matrix material, and the properties of the fuel cell may be adjusted by changing the type of matrix material and/or the ratio of nanoparticles to the matrix material.

Figure 3:
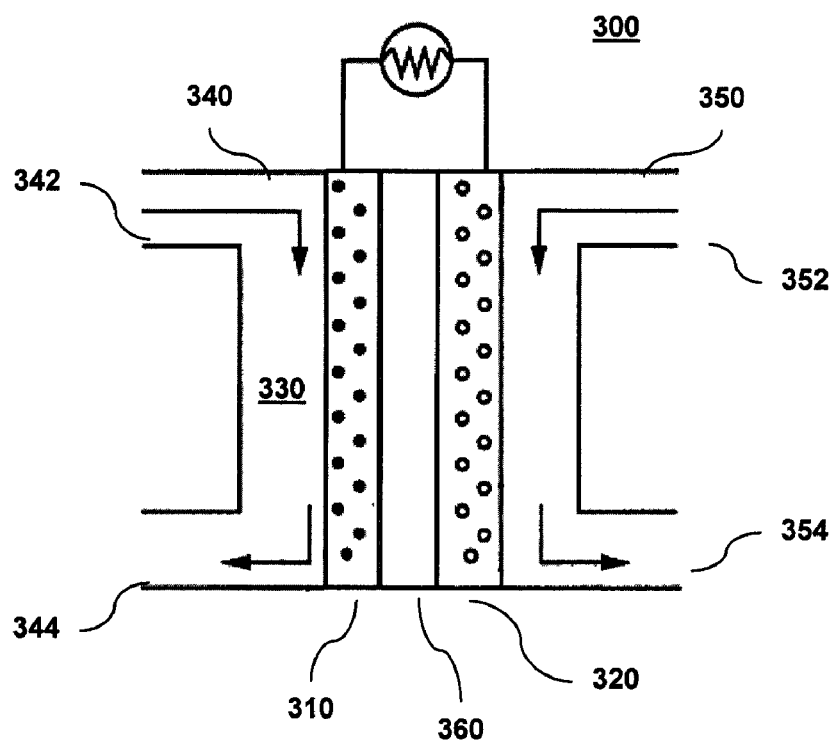
FIG. 3 is a schematic representation of a flowing electrolyte fuel cell, where the flowing electrolyte is in contact with the anode only.

FIG. 3 represents an example of a fuel cell 300 that includes an anode 310, a cathode 320, a liquid electrolyte 330, and a stationary electrolyte 360. The anode 310 has first and second surfaces, and the first surface is in contact with the stationary electrolyte 360. The second surface of anode 310 is in contact with a fuel channel 340, including a fuel inlet 342 and a fuel outlet 344. The liquid electrolyte 330 contains a fuel and flows in the fuel channel 340. The cathode 320 includes a GDE, and has first and second surfaces. The first surface of cathode 320 is in contact with an oxidant channel 350, including an oxidant inlet 352 and optional oxidant outlet 354, and the second surface of cathode 320 is in contact with the stationary electrolyte 360. Preferably the oxidant pressure in the oxidant channel 350 is no greater than 0.14 MPa, more preferably is no greater than 0.10 MPa, and more preferably is no greater than 0.07 MPa. The stationary electrolyte 360 may be a hydrogel.

Figure 4:
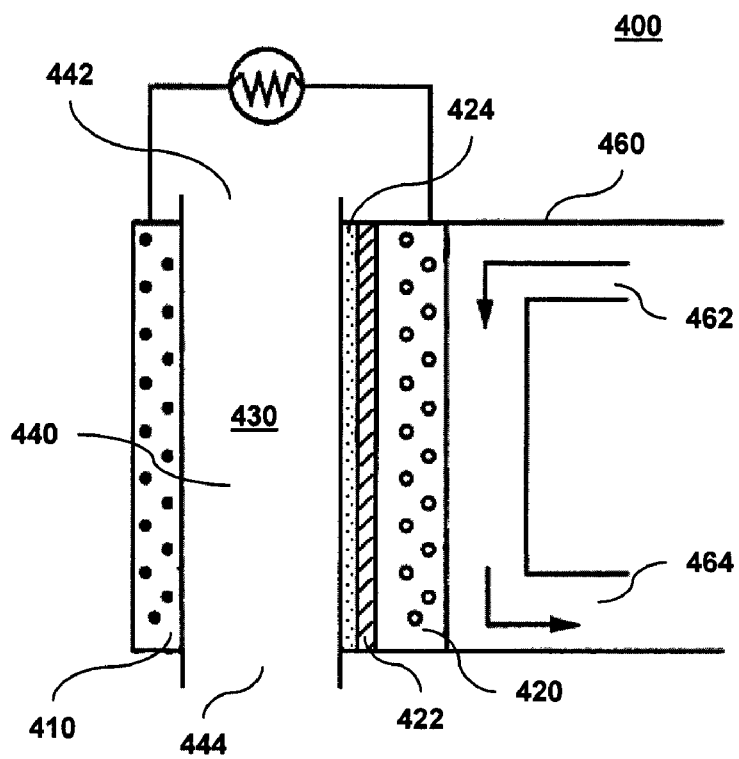
FIG. 4 is a schematic representation of a flowing electrolyte fuel cell, where the flowing electrolyte passes between the anode and the cathode.

FIG. 4 represents an example of a fuel cell 400 that includes an anode 410, a cathode 420 including a hydraulic barrier 422, and a liquid electrolyte 430 containing a fuel. The liquid electrolyte 430 is in a channel 440 having an electrolyte inlet 442 and an electrolyte outlet 444. The channel 440 is contiguous with the anode 410 and the cathode 420. The cathode 420 includes a GDE, and has first and second surfaces. The first surface of cathode 420 is in contact with an oxidant channel 460, including an oxidant inlet 462 and optional oxidant outlet 464. The second surface of cathode 420 is in contact with the channel 440, and may include optional screen 424. The hydraulic barrier 422 may be a hydrogel.

Figure 5:
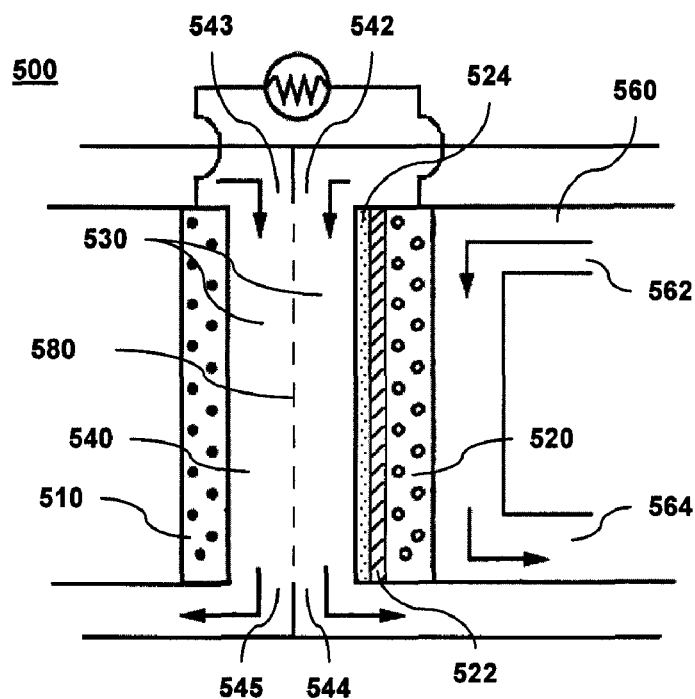
FIG. 5 is a schematic representation of a flowing electrolyte fuel cell, where the liquid electrolyte includes two electrolyte streams.

FIG. 5 represents an example of a fuel cell 500 that includes an anode 510, a cathode 520 including a hydraulic barrier 522, and a liquid electrolyte 530. The liquid electrolyte 530 is in a channel 540 having a first electrolyte inlet 542, a second electrolyte inlet 543, a first electrolyte outlet 544 and a second electrolyte outlet 545. The channel 540 is contiguous with the anode 510 and the cathode 520. The cathode 520 includes a GDE, and has first and second surfaces. The first surface of the cathode 520 is in contact with an oxidant channel 560, including an oxidant inlet 562 and optional oxidant outlet 564. The second surface of cathode 520 is in contact with the channel 540, and may include optional screen 524. The fuel cell during operation optionally may be characterized by an induced dynamic conducting interface (IDCI) 580. The hydraulic barrier 522 may be a hydrogel.

When fuel cell 500 is operating, the liquid electrolyte 530 includes two streams. The first stream flows in the channel 540 between the first inlet 542 and the first outlet 544 and is in contact with the cathode 520. The second stream flows in the channel 540 between the second inlet 543 and the second outlet 545 and is in contact with the anode 510. When entering through the first inlet 542, the first stream does not contain a fuel. When entering through the second inlet 543, the second stream contains a mixture of an electrolyte and a fuel. The composition of the first stream and of the electrolyte portion of the second stream may be the same, or they may be different. Once the first and second streams have exited the cell through the first outlet 544 and the second outlet 545, respectively, each stream independently may be recirculated back to the appropriate inlet. Each stream also independently may be treated to remove any reaction products present in the stream after exiting through the outlet.

The first and second streams may flow through the channel in a laminar flow. A laminar flow fuel cell (LFFC) uses the laminar flow properties of a microfluidic liquid stream to deliver a reagent to one or both electrodes of a fuel cell. In one example of an LFFC (referring to FIG. 5), fuel and oxidant streams flow through the microfluidic channel 540 in laminar flow, such that fluid mixing and fuel crossover is minimized. In this example, the IDCI 580 is present between the two streams, replacing the PEM of a conventional fuel cell. The IDCI can maintain concentration gradients over considerable flow distances and residence times, depending on the dissolved species and the dimensions of the flow channel. IDCI-based LFFC systems are described, for example, in U.S. Pat. No. 6,713,206 to Markoski et al., in U.S. Pat. No. 7,252,898 to Markoski et al., and in U.S. Patent Application Publication 2006/0088744 to Markoski et al.

In an example of fuel cell 500, a first stream may be introduced into the channel 540 through first inlet 542, and a second stream may be introduced into the channel 540 through second inlet 543. The first stream may optionally include an oxidant. The second stream includes a fuel. By pumping the two solutions into the channel 540, parallel laminar flow induces the IDCI 580 that is maintained during fluid flow. If the flow rates of the two fluid streams are kept constant, the IDCI is established directly between anode 510 and cathode 520, completing the electric circuit while keeping the streams from convectively mixing and while keeping the fuel from contacting the cathode. The two flow rates can be varied to locate the laminar flow boundary closer to the anode 510 or to the cathode 520 if desired.

One possible disadvantage of IDCI-based LFFCs is the need to keep the cells physically stable. Tilting or jolting of an IDCI-based LFFC may flip or twist the liquid streams, causing the fuel and oxidant to come in contact with the wrong electrode and leading to crossover, catastrophic failure, and/or cell reversal until the stable fluid flow can be restored. This disadvantage may be reduced or eliminated with the presence of a porous separator between the streams.

Figure 6:
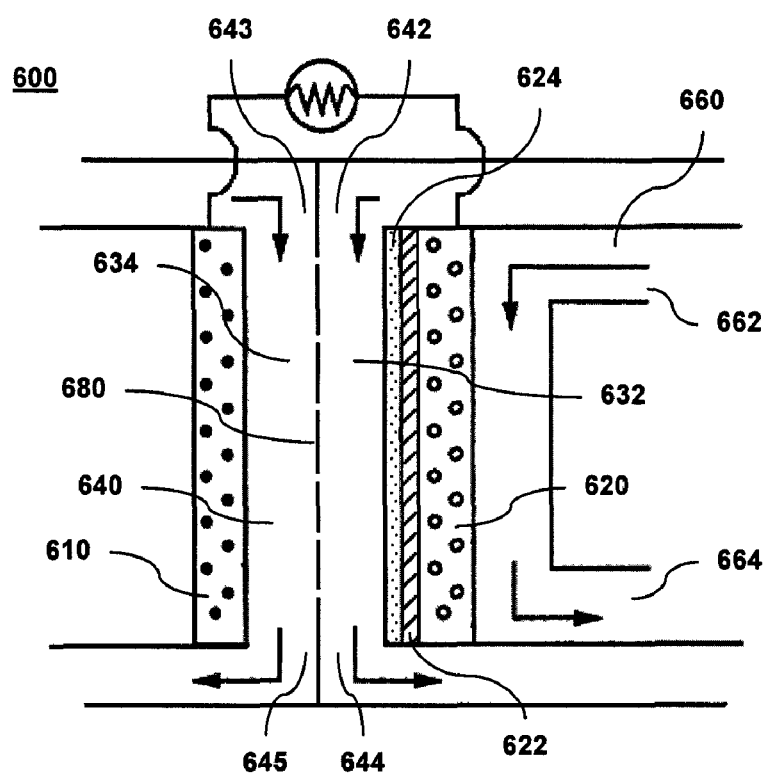
FIG. 6 is a schematic representation of a flowing electrolyte fuel cell having a porous separator.

FIG. 6 represents an example of a fuel cell 600 that includes an anode 610, a cathode 620 including a hydraulic barrier 622, a porous separator 680, and a liquid electrolyte having a first liquid stream 632 and a second liquid stream 634 on either side of the porous separator 680. The liquid electrolyte is in a channel 640 having a first electrolyte inlet 642, a second electrolyte inlet 643, a first electrolyte outlet 644 and a second electrolyte outlet 645. The channel 640 is contiguous with the anode 610 and the cathode 620. The cathode 620 includes a GDE, and has first and second surfaces. The first surface of the cathode 620 is in contact with an oxidant channel 660, including an oxidant inlet 662 and optional oxidant outlet 664. The second surface of cathode 620 is in contact with the channel 640, and may include optional screen 624. The hydraulic barrier 622 may be a hydrogel.

The porous separator 680 separates different streams, allowing them to be directed in different directions, and is useful for keeping oxidant, fuel, and/or electrolyte streams separate for subsequent recycling. Thus, the flow boundaries of the streams are not dependent on the flow rate of the fluids. The porous separator achieves this goal without interfering significantly with ion transport between the streams. The porous separator is hydrophilic, so the fluid within the streams is drawn into the pores by capillary action. The two streams of fluid on either side of the separator are thus in direct contact, allowing ion transport between the two streams. When the pores are small and the total area of the pores is a small percentage of the total area of the porous separator, mass transfer of fluid from one stream to the other is very small, even if there is a significant difference in pressure between the streams and across the separator. This lack of mass transfer may provide for a decrease in fuel crossover. Examples of porous separators and their use in electrochemical cells are disclosed in U.S. patent application Ser. No. 11/228,453, filed Sep. 15, 2005, entitled "Electrochemical Cells."

Fuel cells having increased uniformity of the distribution of reagents and temperature throughout the cell may produce at least 0.1 milliamps per square centimeter ($mA/cm^2$). Preferably these fuel cells produce at least 1 $mA/cm^2$, more preferably at least 2 $mA/cm^2$, more preferably at least 10 $mA/cm^2$, more preferably at least 50 $mA/cm^2$, more preferably at least 100 $mA/cm^2$, more preferably at least 400 $mA/cm^2$, and more preferably at least 1000 $mA/cm^2$, including 100-1000 $mA/cm^2$, 200-800 $mA/cm^2$, and 400-600 $mA/cm^2$. These fuel cells may operate at voltages of from 1.0 to 0.1 volts (V) for single cells. Preferably these fuel cells operate at voltages of from 0.7 to 0.2 V, and more preferably from 0.5 to 0.25 V for single cells.

Fuel cells having increased uniformity of the distribution of reagents and temperature throughout the cell preferably produce a current density of 200 $mA/cm^2$ without cathode flooding. The current density at which cathode flooding occurs can be measured by the polarization flooding test, which is performed as follows. A fuel cell is connected to a fuel source and a gaseous oxidant source, and electrically connected to a load. The current density is increased, and the potential is measured under two different oxidant flow regimes. In the stoichiometric flow regime, the oxidant gas flow rate is varied based on the electrical current output of the fuel cell so as to maintain the oxygen concentration at 1-3 times the stoichiometric level for the fuel cell reaction. In the elevated flow regime, the oxidant gas flow rate is set so as to maintain the oxygen concentration at over 5 times the stoichiometric level. No back pressure is applied to the oxidant stream in either regime, and the temperature is maintained at 25° C. The current density at which the measured potential for the stoichiometric flow regime is 10% less than the measured potential for the elevated flow regime for a given oxidant is taken as the onset of cathode flooding. Fuel cells having increased uniformity of the distribution of reagents and temperature throughout the cell preferably produce a current density of 300 $mA/cm^2$ without cathode flooding, more preferably of 400 $mA/cm^2$ without cathode flooding, and more preferably of 500 $mA/cm^2$ without cathode flooding, where cathode flooding is measured by the polarization flooding test.

It is desirable for the oxidant pressure to be low, so that a compressor is not required for the oxidant. Compressors can be highly parasitic of the power generated by the fuel cell. Preferably the oxidant pressure is no greater than 15 pounds per square inch (psi; 0.10 MPa). More preferably the oxidant pressure is no greater than 10 psi (0.07 MPa), and more preferably is no greater than 5 psi (0.035 MPa). The oxidant flow rate may be expressed in terms of stoichiometric units, referred to herein as a "stoich". A "stoich" is defined as the volumetric flow rate of oxidant required to supply a stoichiometric amount of the oxidant to the cathode. This flow rate increases as the current density of the cell increases and is thus dependent on the current density of the cell. Preferably the flow rate of the oxidant is from 1 to 10 stoich, more preferably from 1.2 to 5 stoich, and more preferably from 1.5 to 3 stoich.

A liquid electrolyte, whether flowing or stationary, is characterized by an osmotic pressure ($\Pi$), defined as:

$$\Pi = (\text{solute concentration}) \times (\text{number of atoms or ions in solute}) \times R \times T$$

where R is the universal gas constant in units of $kPa \cdot m^3/mol \cdot Kelvin$, T is the temperature in units of Kelvin, and the solute concentration is in units of $kmol/m^3$, giving units of osmotic pressure in terms of kPa. Osmotic pressure of the liquid electrolyte can be measured by freezing point depression osmometry or vapor pressure osmometry, which may be carried out on a commercially available osmometer, such as those available from Advanced Instruments, Inc. (Norwood, Mass.) or from KNAUER ASI (Franklin; MA).

Preferably the liquid electrolyte has an osmotic pressure of at least 1.2 megaPascals (MPa). More preferably the liquid electrolyte has an osmotic pressure of at least 2.5 MPa, more preferably of at least 3.5 MPa, more preferably of at least 10 MPa, more preferably of at least 15 MPa, more preferably of at least 20 MPa, and more preferably of at least 25 MPa. Preferably the liquid electrolyte has an osmotic pressure from 1.2 to 70 MPa, more preferably from 2.5 to 50 MPa, more preferably from 3.5 to 40 MPa.

Preferably the liquid electrolyte includes sulfuric acid at a concentration of at least 0.2 M, more preferably at least 0.25 M, more preferably at least 0.3 M, more preferably at least 0.4 M, more preferably at least 0.5 M, more preferably at least 1.0 M, more preferably at least 1.5 M, more preferably at least 3.0 M, more preferably at least 4.0 M, and more preferably at least 5.0 M. Preferably the liquid electrolyte includes sulfuric acid at a concentration of from 0.1 to 9.0 M, more preferably from 0.25 to 9.0 M, more preferably from 0.5 to 7.0 M, more preferably from 0.75 M to 5.0 M, and more preferably from 1.0 to 3.0 M. The osmotic pressure of a liquid electrolyte including a protic acid may be further increased by the addition of non-acidic salts.

During operation of a fuel cell, the liquid electrolyte in contact with the cathode preferably has an osmotic pressure that is greater than the osmotic pressure of the liquid water produced and/or accumulating at the cathode. This difference in osmotic pressure imposes a fluid pressure that may be greater than, and in a direction opposite to, the electro-osmotic drag typically produced in a fuel cell. Thus, there is a driving force for transport of water from the cathode into the electrolyte, optionally by way of a hydraulic barrier on the cathode. Rather than water building up at the cathode at a rate greater than the rate at which it can be removed by an oxidant gas flow, water at the cathode may be transported by osmosis into the liquid electrolyte. The term "osmosis" means the flux of solvent through a permeable material from a region of high chemical potential to a region of low chemical potential. Excess water may be at least partially recovered, and may be recycled back to the anode.

Preferably the difference between the osmotic pressure of the water at the cathode and the osmotic pressure of the flowing and/or stationary electrolytes independently is at least 1 MPa. More preferably the difference between the osmotic pressure is at least 1.2 MPa, more preferably is at least 2.5 MPa, more preferably is at least 3.5 MPa, more preferably is at least 10 MPa, more preferably is at least 15 MPa, more preferably is at least 20 MPa, and more preferably is at least 25 MPa. Preferably the difference between the osmotic pressure of the water at the cathode and the osmotic pressure of the flowing and/or stationary electrolytes is from 1 to 70 MPa. More preferably the difference between the osmotic pressure is from 1.2 to 70 MPa, more preferably from 2.5 to 50 MPa, and more preferably from 3.5 to 40 MPa.

Preferably the fluid pressure created in opposition to the electro-osmotic drag is not of a magnitude that would prevent the transport of solvated ions through an optional hydraulic barrier toward the cathode. This fluid pressure is related to the difference in osmotic pressure, which is dependent on the osmotic pressures of the flowing and/or stationary electrolytes and of the liquid water within the catalyst layer. Thus, adequate ion flux to maintain the reaction at the cathode can be ensured by controlling the concentration of the electrolyte(s) and the water transport capabilities of the optional hydraulic barrier. Preferably the electrolyte can act as a buffer, so that fluctuations in the water content of the electrolyte do not cause drastic changes in the osmotic pressure of the electrolyte. In one example, the volume of electrolyte in a holding chamber may be such that the electrolyte volume can change until the osmotic pressure of the electrolyte is great enough to recover the requisite product water to operate at water neutral conditions.

Increased uniformity of fluid flow within a flowing electrolyte fuel cell and/or increased uniformity of electrical contacts within the flowing electrolyte fuel cell can facilitate uniform distribution of reagents and temperature throughout the fuel cell. By increasing the uniformity of the distribution of reagents and temperature throughout a flowing electrolyte fuel cell, the physical dimensions of the fuel cell can be reduced without sacrificing electrochemical performance.

A fuel cell having increased uniformity of the distribution of reagents and temperature throughout the cell may have a fuel efficiency of at least 50%. Preferably such a fuel cell has a fuel efficiency of at least 60%, more preferably at least 70%, more preferably at least 80%, more preferably at least 90%, and more preferably a fuel efficiency of at least 95%.

A fuel cell having increased uniformity of the distribution of reagents and temperature throughout the cell may produce a current density of at least 50 $mA/cm^2$ at these fuel efficiencies. Preferably such a fuel cell may produce a current density of at least 75 $mA/cm^2$ at these fuel efficiencies, more preferably of at least 100 $mA/cm^2$, more preferably of at least 150 $mA/cm^2$, more preferably of at least 200 $mA/cm^2$, more preferably of at least 250 $mA/cm^2$, more preferably of at least 300 $mA/cm^2$, and more preferably of least 400 $mA/cm^2$ at these fuel efficiencies.

Fuel cells having increased uniformity of the distribution of reagents and temperature throughout the cell, and fuel cell stacks including such fuel cells, may be incorporated into a power supply device. A power supply device includes other components, including components that deliver the fuel and oxidant to the cell or stack. Examples of input components include reservoirs of electrolyte, fuel, and/or oxidant; pumps; blowers; mixing chambers; and valves. Other components that may be present in a power supply device include vents, electrical connectors, a power converter, a power regulator, an auxiliary power supply, a heat exchanger, and temperature control components.

A power supply device may include control components, such as sensors and computer readable program code. Sensors may be used to measure various properties of the cell, stack and/or device, such as temperature, composition of input and/or output streams, reagent supply levels, electrochemical performance of the cell or stack, and electrical performance of the device. Computer readable program code may be stored on a microprocessor, a memory device or on any other computer readable storage medium. The program code may be encoded in a computer readable electronic or optical signal. The code may be object code or any other code describing or controlling the functionality described in this application. The computer readable storage medium may be a magnetic storage disk such as a floppy disk; an optical disk such as a CD-ROM; semiconductor memory; or any other physical object storing program code or associated data. A computer readable medium may include a computer program product including the computer readable program code. Algorithms, devices and systems relating to the code may be implemented together or independently. The sensors may provide input to the code regarding the properties of the cell, stack and/or device.

Figure 12:
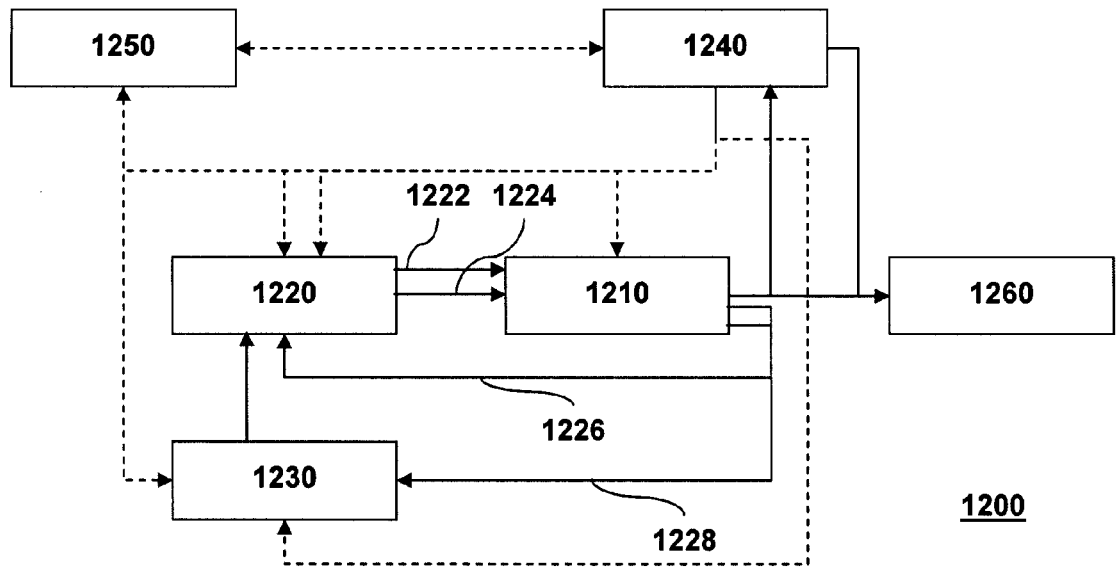
FIG. 12 is a schematic representation of a power supply device.

FIG. 12 is a schematic representation of an example of a power supply device 1200 that may be a portable power supply device. Power supply device 1200 includes a fuel cell stack 1210, a reagent system 1220, an optional heat exchanger 1230, an auxiliary power supply 1240, a control system 1250, and an output connection 1260. The fuel cell stack 1210 includes one or more fuel cells having increased uniformity of the distribution of reagents and temperature throughout the cell.

The reagent system 1220 includes an electrolyte reservoir, a fuel reservoir, an optional oxidant reservoir, a mixing chamber, one or more pumps, an optional blower, a fuel supply line 1222 for delivering fuel to the stack 1210, and an oxidant supply line 1224 for delivering oxidant to the stack. The electrolyte may be mixed with either the fuel or the oxidant. If the oxidant is air, the optional blower may be present to facilitate delivery of the oxidant to the stack. If the oxidant is a gas other than air, the reagent system 1220 may include the optional oxidant reservoir, such as a supply of compressed gas. The reagent system 1220 may include return lines for the effluent electrolyte mixture 1226 and/or for the effluent gas mixture 1228. The effluent electrolyte mixture may be returned to the mixing chamber. The effluent gas mixture may be vented outside of the stack; however, water in the effluent gas may be condensed into the mixing chamber by the optional heat exchanger 1230.

The optional heat exchanger 1230 includes a gas inlet, a gas outlet, and a heat exchange fluid. The gas inlet can accept effluent gas from the stack 1210, and the gas may be vented from the gas outlet to the surrounding environment. The gas may flow in gas flow channels through the heat exchange fluid, and/or the gas may flow around channels containing the heat exchange fluid. The heat exchange fluid preferably is at a lower temperature than the effluent gas from the stack. Heat exchange fluids may include, for example, ethylene glycol and/or propylene glycol. The temperature of the heat exchange fluid may be controlled by circulating atmospheric air around a container for the fluid. Temperature control of the heat exchange fluid also may include circulating the fluid, such as circulating through fluid channels, so that the circulating atmospheric air can more effectively absorb heat from the fluid.

The auxiliary power supply 1240 is used to provide power to the other components of the device 1200. The power from the auxiliary power supply may be used throughout the operation of the device, or it may be used until the fuel cell stack 1210 can provide sufficient power to the other components. The auxiliary power supply preferably includes a rechargeable battery. The rechargeable battery may be charged by the fuel cell stack and/or by an external power source.

The control system 1250 provides for control of the other components of the device 1200. Examples of processes that may be controlled by the control system include turning the auxiliary power supply 1240 on and off, turning the components of the reagent system 1220 on and off, adjusting the input of fuel or oxidant into an electrolyte mixture, and controlling the rate of heat exchange from the effluent gas. Examples of processes that may be controlled by the control system also include the distribution of power from the auxiliary power supply 1240 and/or the stack 1210 to the other components of the device, cycling of the fuel cell stack, safety protocols such as emergency shut-down of the device, and transmitting a signal to a user of the device. The control system may be activated by a switch and/or may be activated when an electrical load is connected to the device.

In one example, the power supply device 1200 can provide electrical power to an electrical load connected to the device when the control system 1250 is activated. In this example, the fuel is present in an electrolyte/fuel mixture. In a first phase, electrical power is supplied to the load, to the reagent system 1220, to the heat exchanger 1230, and to the control system 1250 by the auxiliary power supply 1240. At start-up, the electrolyte/fuel mixture within the fuel cell stack 1210 preferably includes a higher concentration of fuel than that used during ongoing operation of the stack. The reagent system 1220 may start the delivery of the electrolyte/fuel mixture and the oxidant simultaneously, or it may start the delivery of one reagent first, followed by the other reagent after a delay time. The stack 1210 begins to produce electrical power, and also may warm up to a predetermined operating temperature range.

In a second phase, once the power from the stack 1210 has reached a threshold level, the control system 1250 turns off the auxiliary power supply 1240. The load, the reagent system 1220, the heat exchanger 1230 and the control system 1250 are then powered by the stack 1210. The power from the stack 1210 is also used to recharge the auxiliary power supply 1240. The control system can adjust various parameters of the device, based on predetermined operating programs and/or on measurements from sensors in the device. For example, the operation and/or speed of a fan that circulates air past a heat exchange fluid container can be controlled based on the internal cell resistance, such that a lower internal resistance results in a higher rate of heat exchange. In another example, the concentration of fuel in the electrolyte/fuel mixture can be raised or lowered during operation. In another example, the auxiliary power supply 1240 can be turned on for a variety of reasons, such as an increase in power draw by the load, an "off" cycle of the stack 1210, depletion of the fuel or oxidant, or to make up for declining stack performance.

In a third phase, the device 1200 is shut down. Shut down of the device may be initiated manually or may be initiated automatically, such as by the disconnection of the load from the device. The concentration of fuel in the electrolyte/fuel mixture is raised to a level higher than that used during the second phase, and the mixture is briefly circulated through the stack 1210. The control system 1250 may perform other functions, such as closing of valves and vents, resetting of switches, and switching the output connection 1260 such that it is connected to the auxiliary power supply 1240.

Fuel cells having increased uniformity of the distribution of reagents and temperature throughout the cell, and fuel cell stacks and/or power supply devices including such fuel cells, may be useful in portable and mobile fuel cell systems and in electronic devices. Examples of electronic devices that may be powered at least in part by such cells, stacks or power supply devices include cellular phones, laptop computers, DVD players, televisions, personal data assistants (PDAs), calculators, pagers, hand-held video games, remote controls, cassette players, CD players, radios, audio players, audio recorders, video recorders, cameras, navigation systems, and wristwatches. This technology also may be useful in automotive and aviation systems, including systems used in aerospace vehicles.

The following examples are provided to illustrate one or more preferred embodiments of the invention. Numerous variations may be made to the following examples that lie within the scope of the invention.

EXAMPLES

Figure 14:
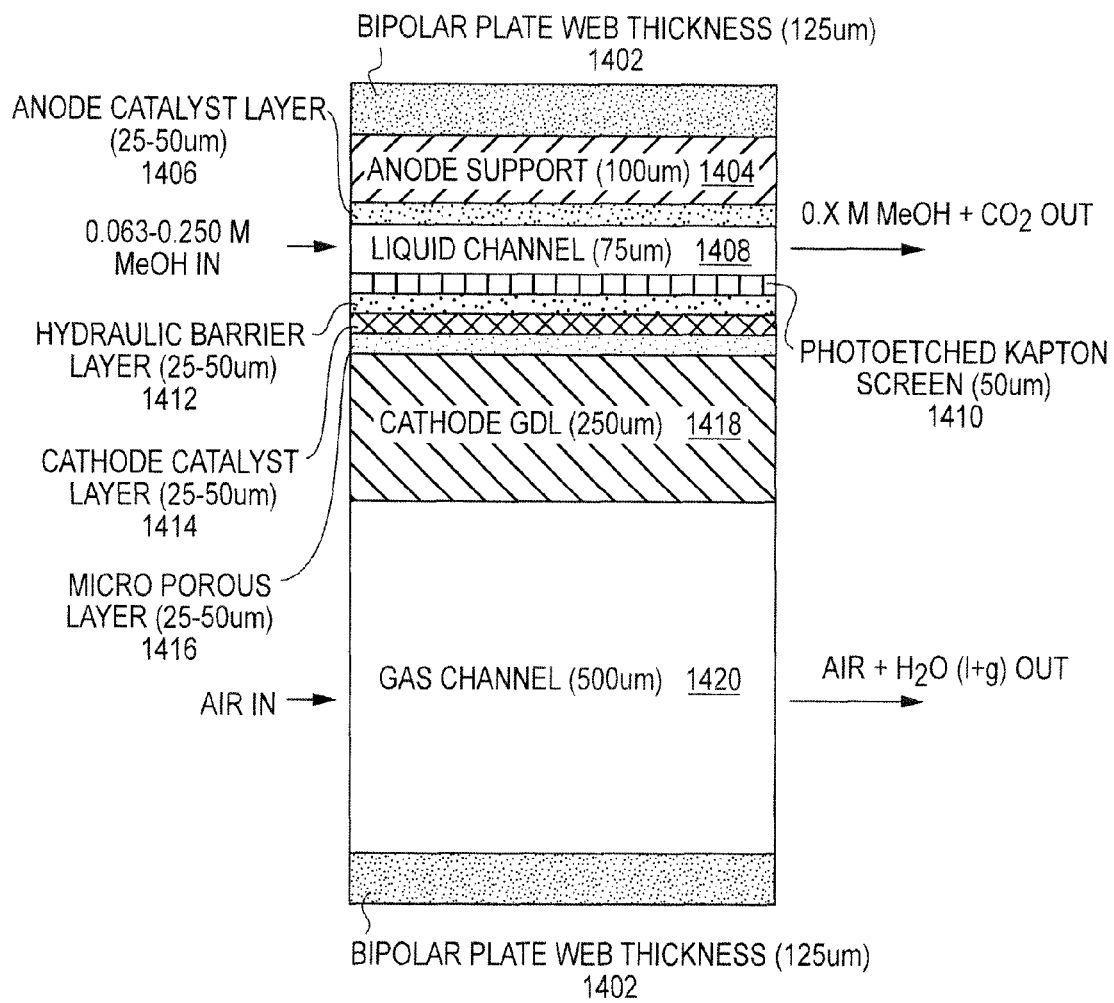
FIG. 14 is an illustration of the cross-section and actual Z dimensions of a flowing fuel stream fuel cell (single cell) utilized in this study.
Figure 21:
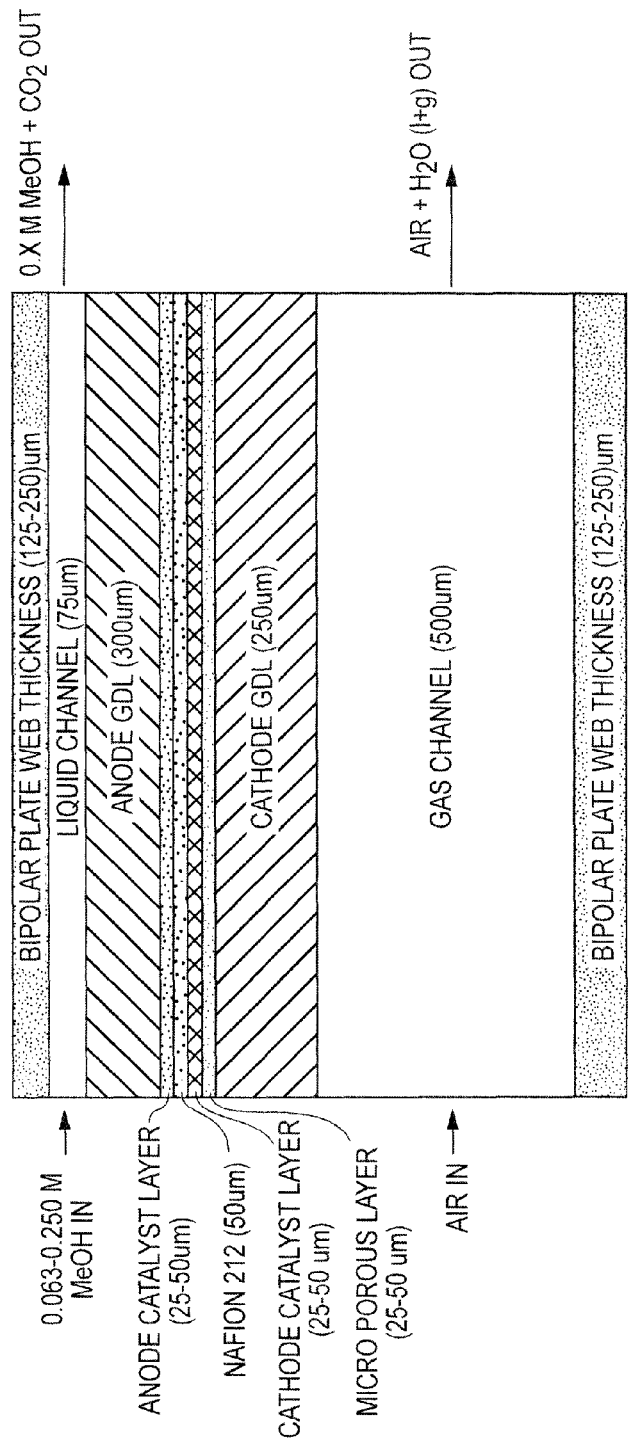
FIG. 21 is an illustration of a cross-section and actual Z dimensions of the control cell with a conventional DMFC diffusion layer.

To show that i) low bulk transport distance and ii) parallel microfluidic flow promotes high voltage efficiency, high current/power density, and high fuel efficiency at a) low fuel concentration and b) low air stoichiometry, we built a flowing fuel stream fuel cell as shown in FIG. 14 and a microfluidic control cell with conventional DMFC diffusion layer as shown in FIG. 21.

Ink Composition and Fabrication

The common practice of dispersing supported catalysts or metal blacks in Nafion® solution and relevant solvents to make inks that can be coated was adopted to fabricate electrodes used here. Commercially available catalyst powders were used in this study. Platinum supported on carbon black (Vulcan XC 72) at a nominal metal loading of 50% by weight from Johnson-Matthey (Hispec 8000, Stock #43989, lot #H23S006) was used for the cathodes. Metal alloy black of Platinum and Ruthenium, 50:50 atomic % also from Johnson-Matthey (Hispec 6000, Stock #41171, lot #DO6S015) was used for fabricating anode catalyst layers. Required amount of catalyst (supported or metal black) were weighed and mixed with known quantities of water and 15% Nafion® solution procured from Ion Power Inc. (lot #021507/02190) to provide the desired ink composition in terms of catalyst to Nafion® ratio. The catalyst to Nafion® ratio for the cathodes was tailored to 2:1 while the ratio for the anode was maintained at 9:1 for the flowing fuel stream fuel cell design and 6:1 for conventional DMFC architecture. Prior to coating, the inks were sonicated for 30 minutes and stirred for 30 minutes to achieve consistent dispersion of the solids.

Electrode Fabrication

The inks were paint-brushed onto the relevant carbon paper substrates. Multiple coats with intermittent drying at 60-70° C. in an oven were used to achieve the desired catalyst loading levels. The cathode ink was coated on SIGRACET® SGL 24 BC, a commercially available gas diffusion layer (GDL) procured from SGL Inc. The cathode GDL contained 5% wet proofing and a micro porous layer coated on the side chosen for catalyst layer deposition. The GDL had a nominal thickness of 230 µm. The metal loading was gravimetrically measured to be 1.75 mg Pt/cm$^2$. The anode ink was coated on three different types of carbon paper depending on the fuel cell architecture. For the flowing fuel stream fuel cell designs, Toray carbon paper TGPH-030, plain with no wet proofing was used as the anode substrate while Toray carbon paper both plain TGPH-030 and TGPH-090, with 20% wet proofing was used for the two DMFC cells. The two anode substrates were nominally 90 and 300 µm thick, respectively. The loading on the anodes were measured to be 6.45 and 5.3 mg metal/cm$^2$ respectively.

The cathodes were hot bonded to Nafion® 212 membranes procured from Ion Power Inc. Before the hot bonding step, a final coat of plain 15% Nafion® solution was applied to the cathode catalyst layer to enhance adhesion to the separator. The cathode catalyst layer was bonded to the separator at 275° F. for 7 minutes at 725 psi. For the flowing fuel stream fuel cell architecture, a photo-etched Kapton® screen was bonded at the above mentioned conditions to the other side of the Nafion® separator. The anodes in the flowing fuel stream fuel cell were compressed with the catalyst coated side on a mirror polished stainless steel sheet to compact the catalyst layer. The conditions for this compression step were the same as that of the cathode hot bonding step. For the DMFC architecture, the anode was bonded to the other side of the Nafion® separator at the above mentioned conditions to form the classical membrane electrode assembly (MEA).

FIGS. 21 & 14 show the control cell with a conventional DMFC diffusion layer and the specific flowing fuel stream fuel cell architecture addressed in this study. For the flowing fuel stream fuel cell design, the anode GDL acts as a mechanical substrate for holding the catalyst layer and provides limited, if any, functionality to the transport of fuel to the catalyst layer. The liquid fuel stream containing the fuel flows convectively and directly over the catalyst layer, within the Kapton® channel layer. The cathode composite is made of an etched Kapton® screen (about 85% porous for mechanical support of the barrier layer), Nafion® barrier layer to prevent the hydraulic breakthrough of the liquid to the gas side (this layer may contain any acid absorbing hydrogel, but was made with Nafion® 212 for ease of comparison and assembly), the cathode catalyst layer, and the cathode GDL with a built in micro porous layer. The cathode composite was placed over a well defined single pass serpentine gas flow channel that was machined into the graphite end plate.

Figure 16:
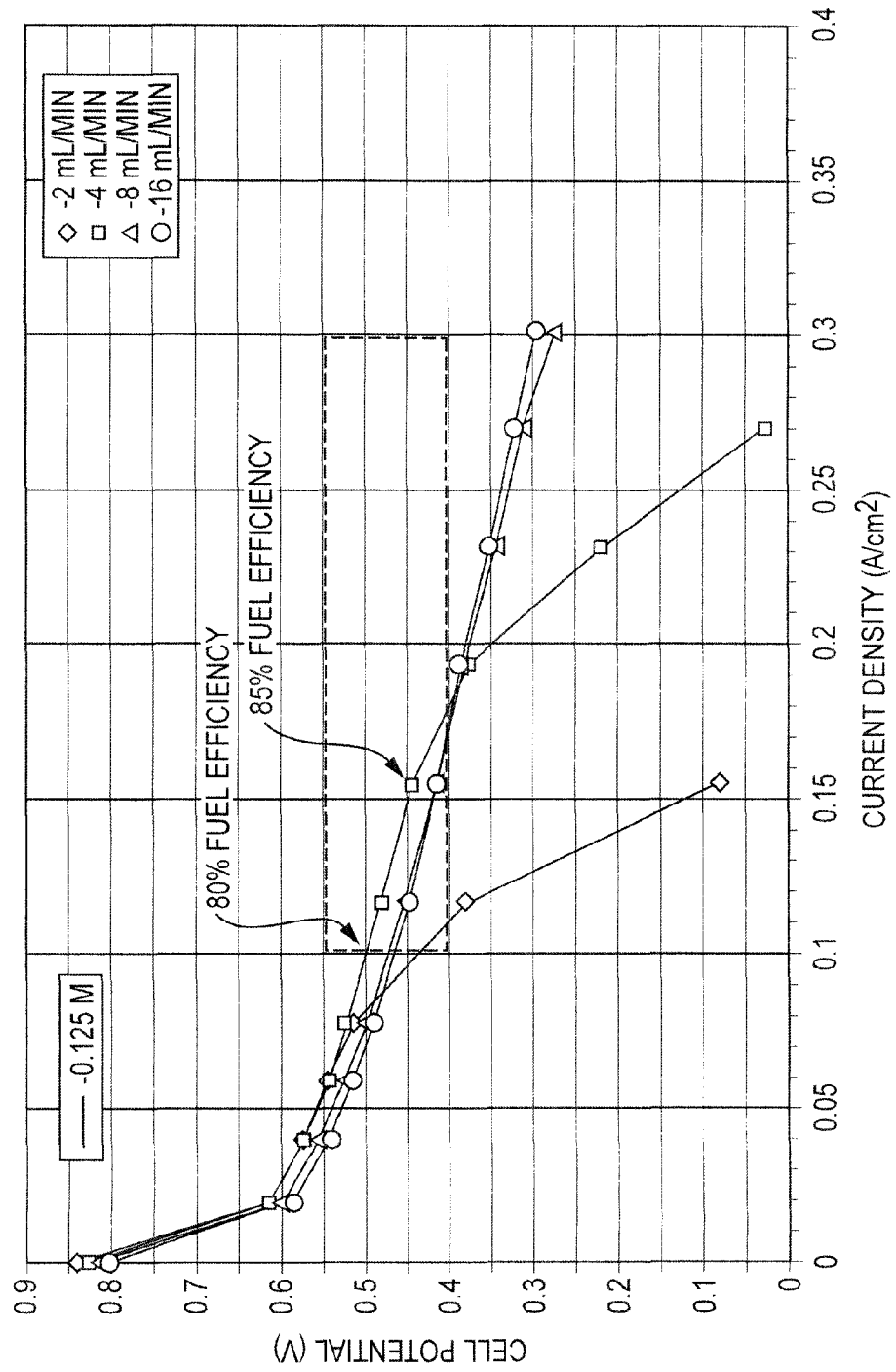
FIG. 16 is a graph of I/V performance for a flowing fuel stream fuel cell using 0.063 M MeOH and with liquid flow rates ranging from 2-16 mL/min. Fuel efficiency shown from uncorrected $CO_2$ measurements. The box represents a commercially desirable performance window.

The control cells with a conventional DMFC diffusion layer built in this study are depicted in FIG. 16 and as illustrated, the fuel/water mixture flows behind the anode GDL in 75 µm deep parallel microfluidic channels machined into the graphite end plate. Here the anode GDL indeed acts as the medium through which the reactants diffuse to the anode catalyst layer. The choice of anode GDL electrode material used for this study in the control case was representative of typical conventional DMFC designs. The thinner anode GDL material was also incorporated in this study as an improved control cell to elucidate the performance enhancements achieved by reducing bulk diffusion distance. This design is devoid of the Kapton® channel and etched screen layers. Although in traditional DMFC designs thicker Nafion® layers are used, a typical 50 µm H$_2$ PEM Nafion® 212 layer was used in this study to provide a direct comparison. The remaining cathode components are exactly the same between the two architectures.

Cell Assembly and Testing

The single cell components were assembled between two graphite mono-polar plates. FIGS. 21 and 14 illustrate the cross section of the control cell and the flowing fuel stream fuel cell assembly along the length of an individual channel. The cathode mono-polar plate contained a serpentine single-pass gas channel to distribute air. The channel was machined to be 1 mm wide and 0.75 mm deep. The anode mono-polar plate used in the control cell had inlet and exit liquid manifolds connected by 75 µm deep parallel channels that were approximately 2.5 mm wide. For the flowing fuel stream fuel cell design, the manifolds were connected through the Kapton® channel layer (75 µm) to complete the fluid path. In both architectures, rule-die cut Kapton® gaskets were used for sealing purposes. Copper current collectors were placed behind the mono-polar plates and assembled between two aluminum end plates. The endplate that housed the fluid inlets and outlets contained Teflon® sleeves for the fittings to avoid contact with the metal. A Kapton® tape heater was also included in this assembly to provide for heating. The assembly was loaded to 400 pounds in a hydraulic press (Carver Inc.) and bolted together.

The single cell assemblies were tested on custom made test stands with builtin pressure gauges and flow meters to monitor the air and liquid pressures and flow rates, respectively. Thermocouples were used to measure the cell temperature. The test stand also featured a condenser to drop out the water vapor in the exit air stream. Provisions to dilute the exit air stream with nitrogen was also included to allow the use of a $CO_2$ analyzer for crossover measurement. Prior to discharge, the cell heater was set to 70° C. and water (for DMFC) or 0.25 M trifluoromethane sulfonic acid (for the flowing fuel stream fuel cell) was pre-heated to 70° C. and circulated through the cell until thermal equilibrium was attained. An Encynova fluid pump with digital control was used for this purpose. Due to heat losses in the fluid lines and pump, the exit temperature of the liquid ranged from 60±65° C. depending on the flow rates. The circulating fluid volume was chosen to be 1 L to avoid significant fuel concentration changes over the course of the experiment. Pure methanol was added to the circulating stream to provide the desired final concentration. High purity air was supplied from compressed gas cylinder at desired flow rates set through a flow regulating needle valve. The cells were then discharged galvanostatically using one of the channels in an 8 channel Solartron 1470E multi-stat. The cell was held at each current for 90 seconds. A frequency response analyzer, Solartron 1252 A, was used to conduct a frequency sweep at a magnitude of 10 mA at each galvanic step. The real axis intercept of the frequency scan was used to estimate the ohmic (i.e. IR) drop and verified to be comparable between the two architectures. A sufficient number of preliminary galavanostatic scans were conducted to stabilize and condition the cell and to ensure reproducibility before final polarization measurements were obtained for a chosen electrode pair. Subsequent experiments (data not shown) were also conducted with other electrode pairs with similar catalyst loadings and variance shown to be minimal. Air stoichiometry was maintained manually at each step using a needle valve. Methanol cross over rates were calculated based on $CO_2$ concentration in the exit air stream measured at select current steps using the $CO_2$ analyzer. The cross-over data provided in this study has not been corrected for $CO_2$ crossover and hence is expected to be a slight over estimation as the cells are discharged. The voltage response at each current step was averaged over the previous 30 seconds to provide the V-I curves shown in this study.

Figure 15:
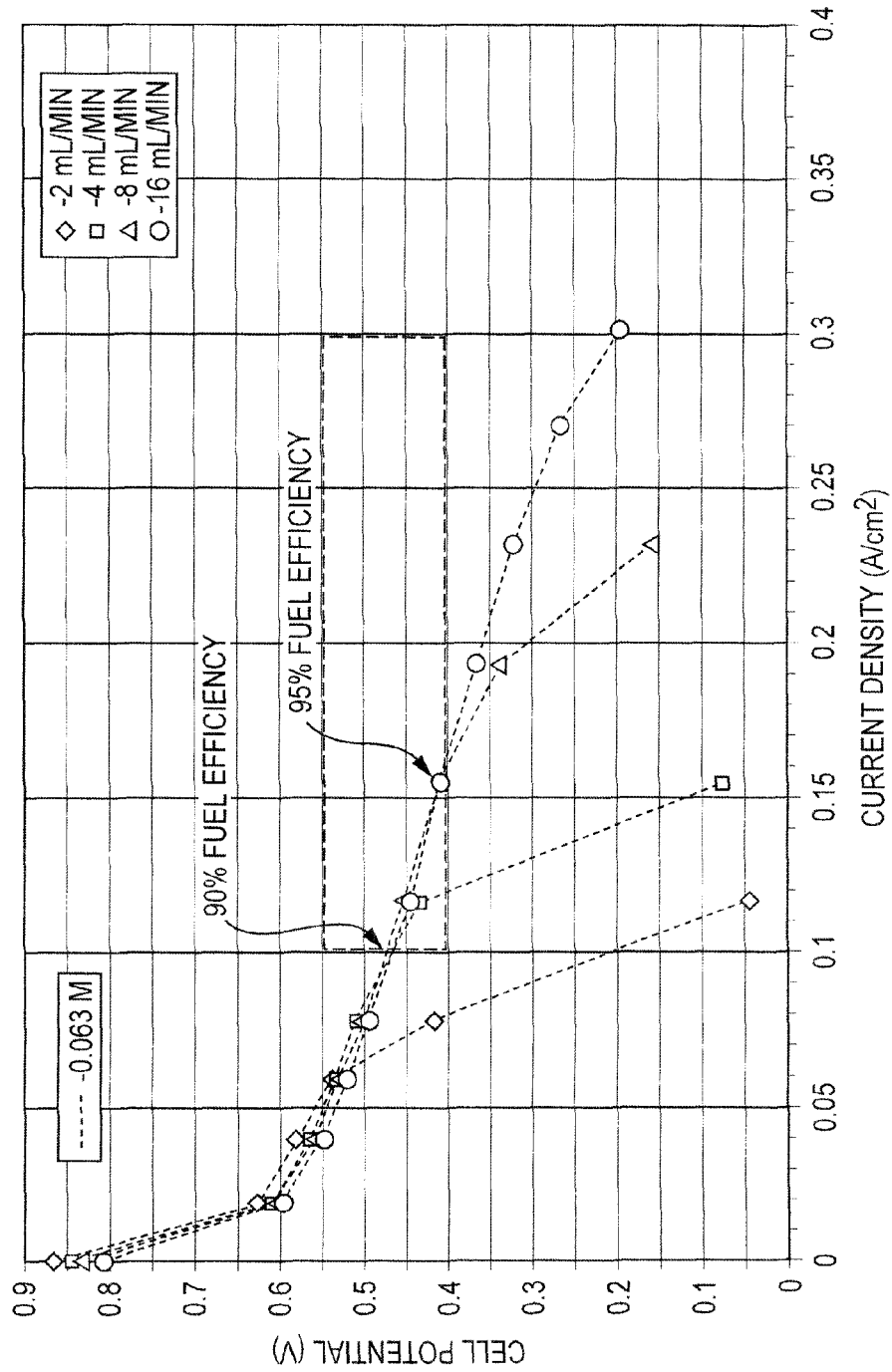
FIG. 15 is a graph of I/V performance for a flowing fuel stream fuel cell using 0.063 M MeOH and with liquid flow rates ranging from 2-16 mL/min. Fuel efficiency shown from uncorrected $CO_2$ measurements. The box represents a commercially desirable performance window.
Figure 17:
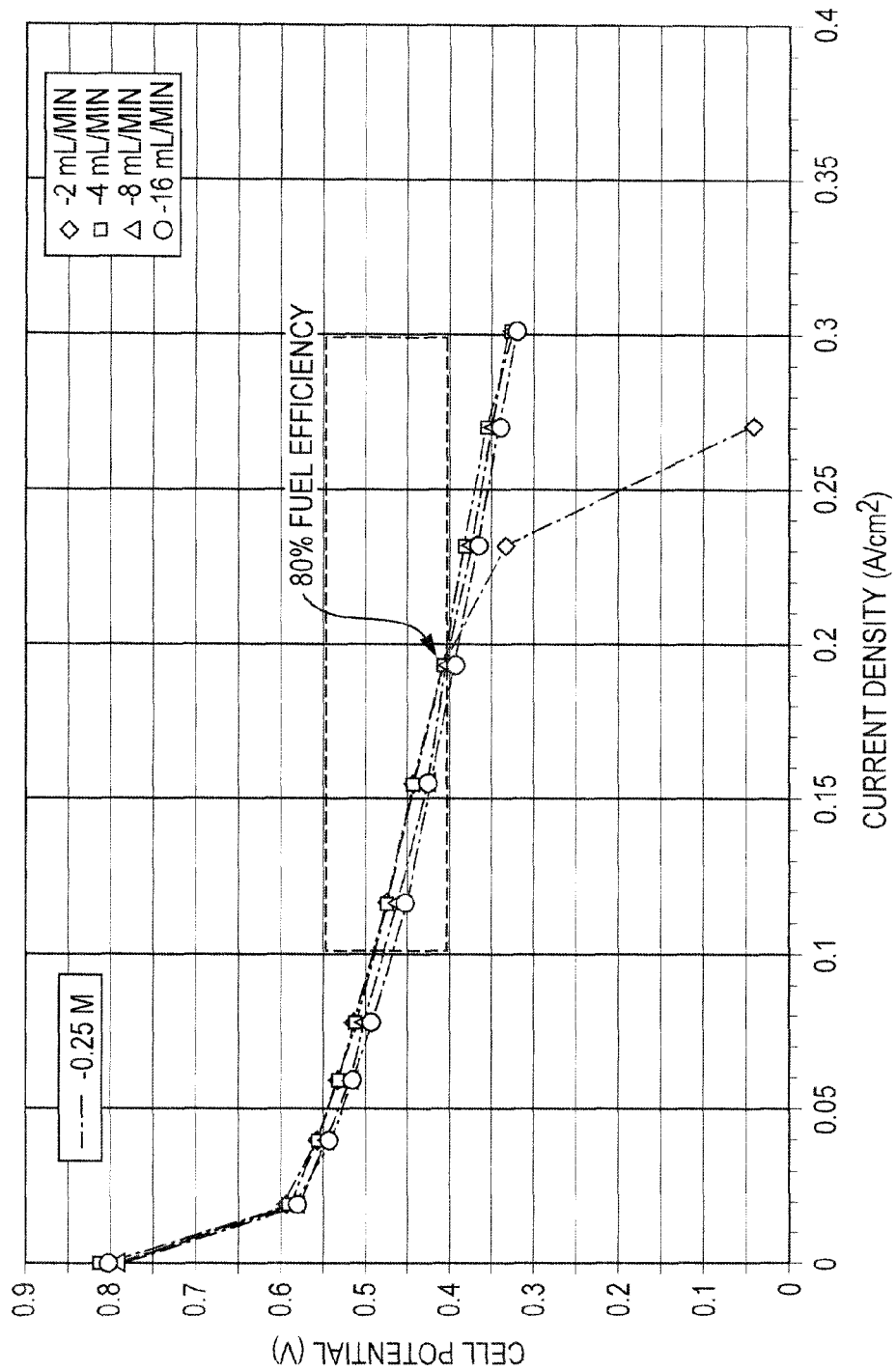
FIG. 17 is a graph of I/V performance for a flowing fuel stream fuel cell using 0.250 M MeOH and with liquid flow rates ranging from 2-16 mL/min. Fuel efficiency shown from uncorrected $CO_2$ measurements. The box represents a commercially desirable performance window.
Figure 18:
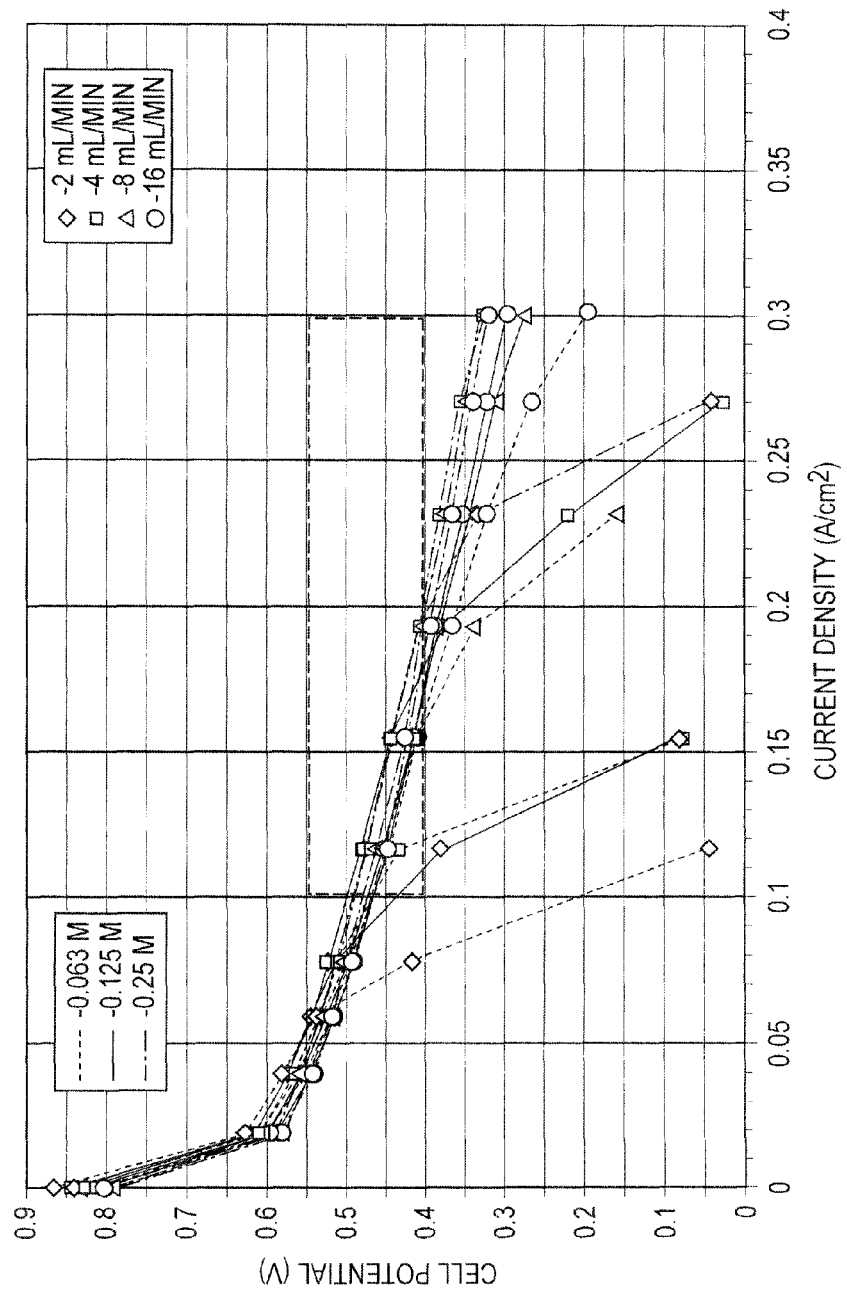
FIG. 18 is a graph of I/V performance summary for a flowing fuel stream fuel cell using 0.063-0.250 M MeOH and with liquid flow rates ranging from 2-16 mL/min. The box represents commercially desirable performance window.
Figure 22:
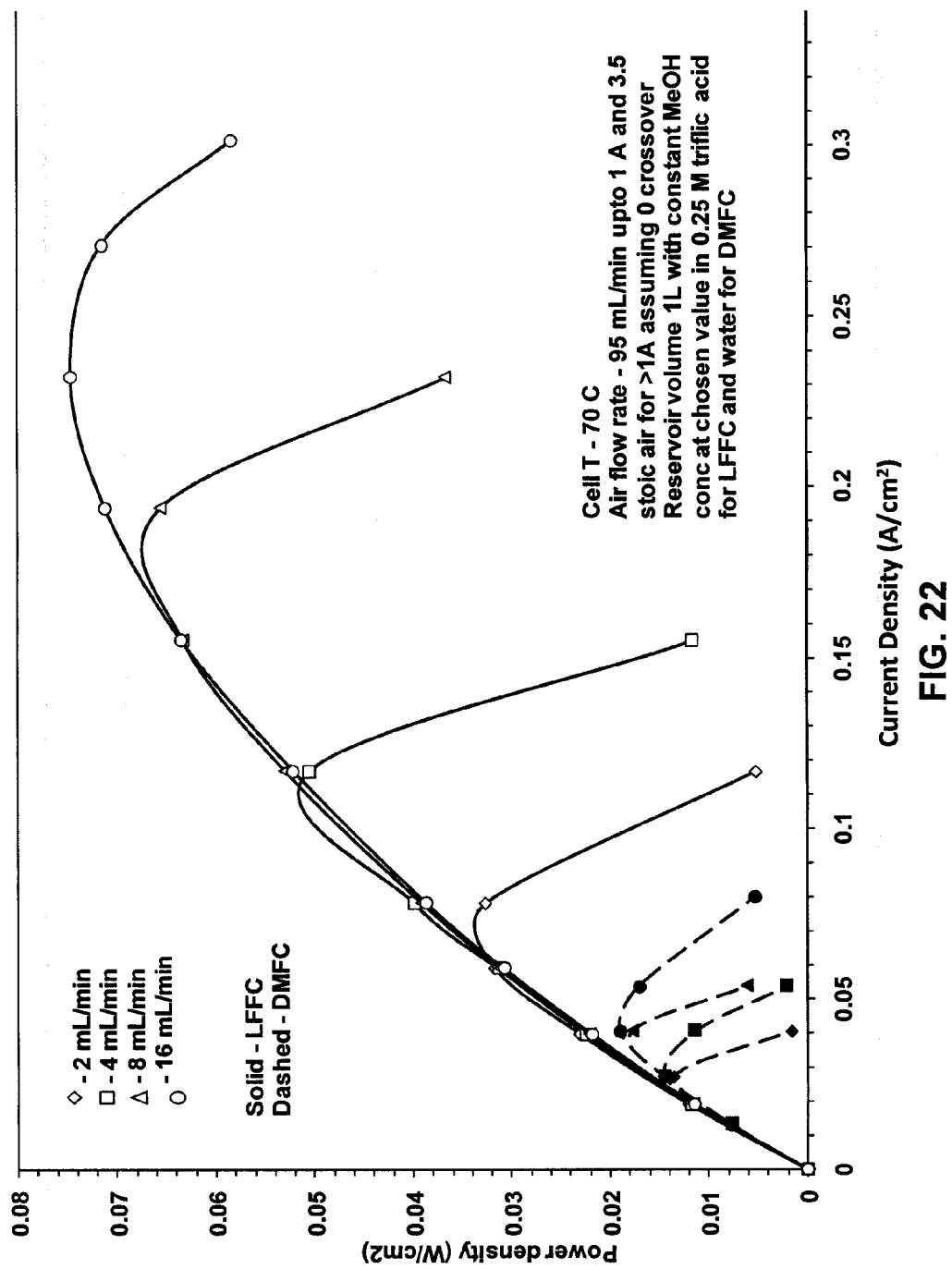
FIG. 22 is a graph of power density using 0.063 M MeOH and multiple liquid flow rates for a flowing fuel stream fuel cell and microfluidic control cell with conventional DMFC diffusion layer.

FIGS. 15-17 provide the I/V performance of the flowing fuel stream fuel cell at three different methanol concentrations (0.063-0.25 M) and four different volumetric flow rates ranging from 2-16 mL/min (for these twelve conditions the stoichiometric fuel flow rate ranged from 1-30 at 100 $mA/cm^2$). FIG. 18 provides the summary of all of these operating conditions. What we observe by comparing the figures is that the flowing fuel stream fuel cell I/V performance fits within the commercially desirable operating window for all but one of the conditions tested, namely very low flow (2 mL/min) and low concentration (0.063 M). At this low fuel concentration (as is observed in natural micro-reactors) the limiting current is a strong function of volumetric flow rate (a point driven home by observing FIG. 22).

Figure 19:
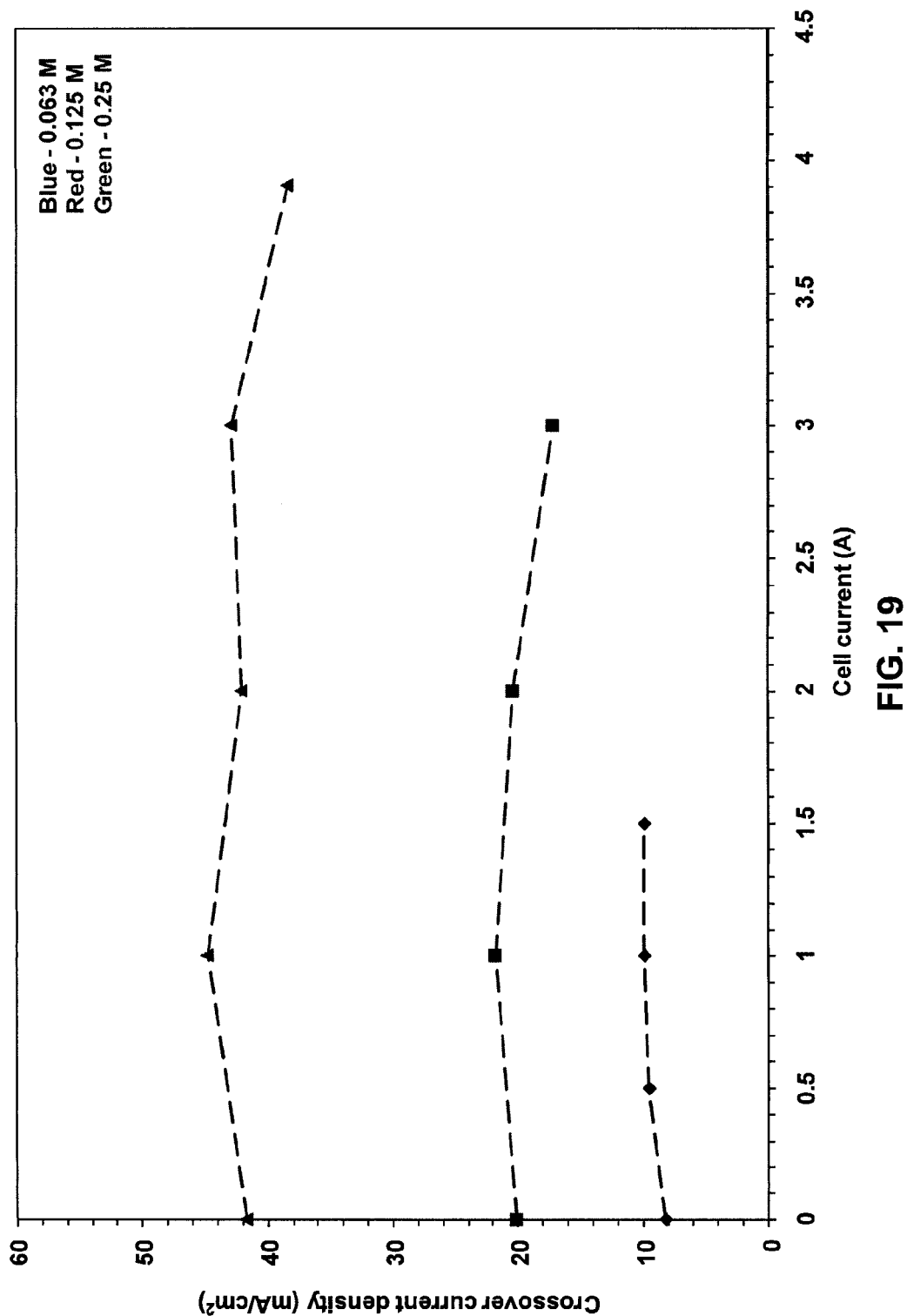
FIG. 19 is a graph of methanol crossover as a function of cell current at 3 different methanol concentrations for a flowing fuel stream fuel cell, uncorrected for $CO_2$ cross-over from the anode stream.

In FIGS. 15-17 in which the I/V performance intersects the commercial window, a fuel efficiency arrow is used to denote the fuel efficiency at the given current density. These fuel efficiency values were calculated from the uncorrected crossover current density from $CO_2$ measurements (see FIG. 19). As expected, as the methanol concentration increases, the cross-over rate increases linearly and is representative of a pure diffusion controlled loss/process to the cathode, therefore it can be expected that increasing the fuel stream flow rate will not have a significant impact on the cross-over rate. Of note in FIG. 19 is that less than 10 $mA/cm^2$ cross-over is achieved at 0.063 M MeOH (providing 90+% fuel efficiency with a cell current density above 100 $mA/cm^2$) and that the cross-over rate remains flat as a function of cell current, suggesting that fuel concentrations along the length of the microfluidic channel is nearly constant in this design.

Figure 20:
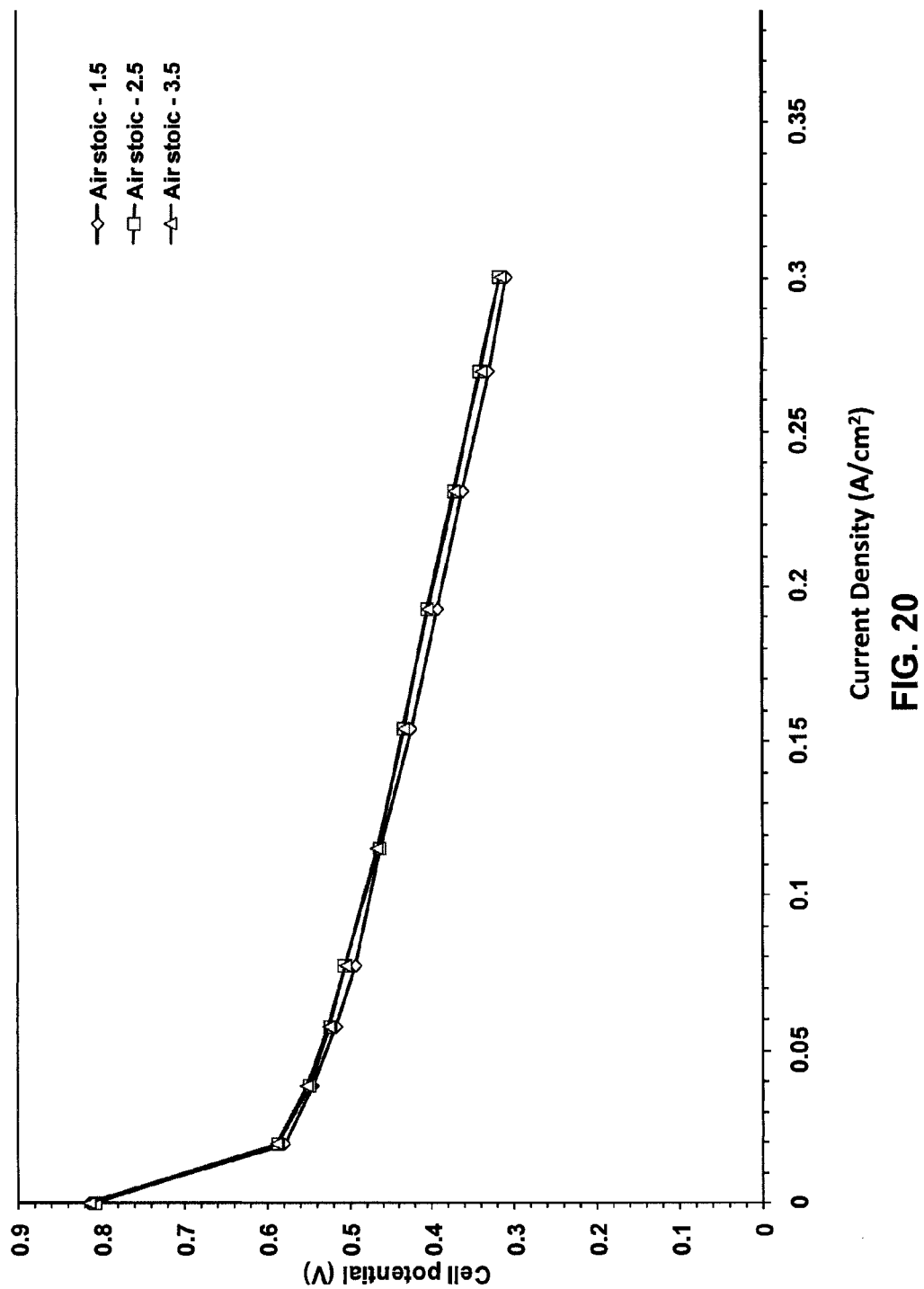
FIG. 20 is a graph of I/V performance for a flowing fuel stream fuel cell as a function of air stoichiometry at a fixed fuel concentration (0.25 M) and fixed liquid flow rate (8 mL/min).

By choosing an operating point of 0.25 M methanol and 8 mL/min fuel stream flow rate we performed an air stoichiometric run (see FIG. 20) showing that the flowing fuel stream fuel cell architecture not only worked well at low fuel concentrations (0.063-0.25 M) but also low air stoichiometry, suggesting that the highest stack temperature of 85-90° C. and hence the highest kinetics could be achieved, providing high voltage efficiency, high current/power density, and high fuel efficiency at a) low fuel concentration and b) low air stoichiometry.

Figure 23:
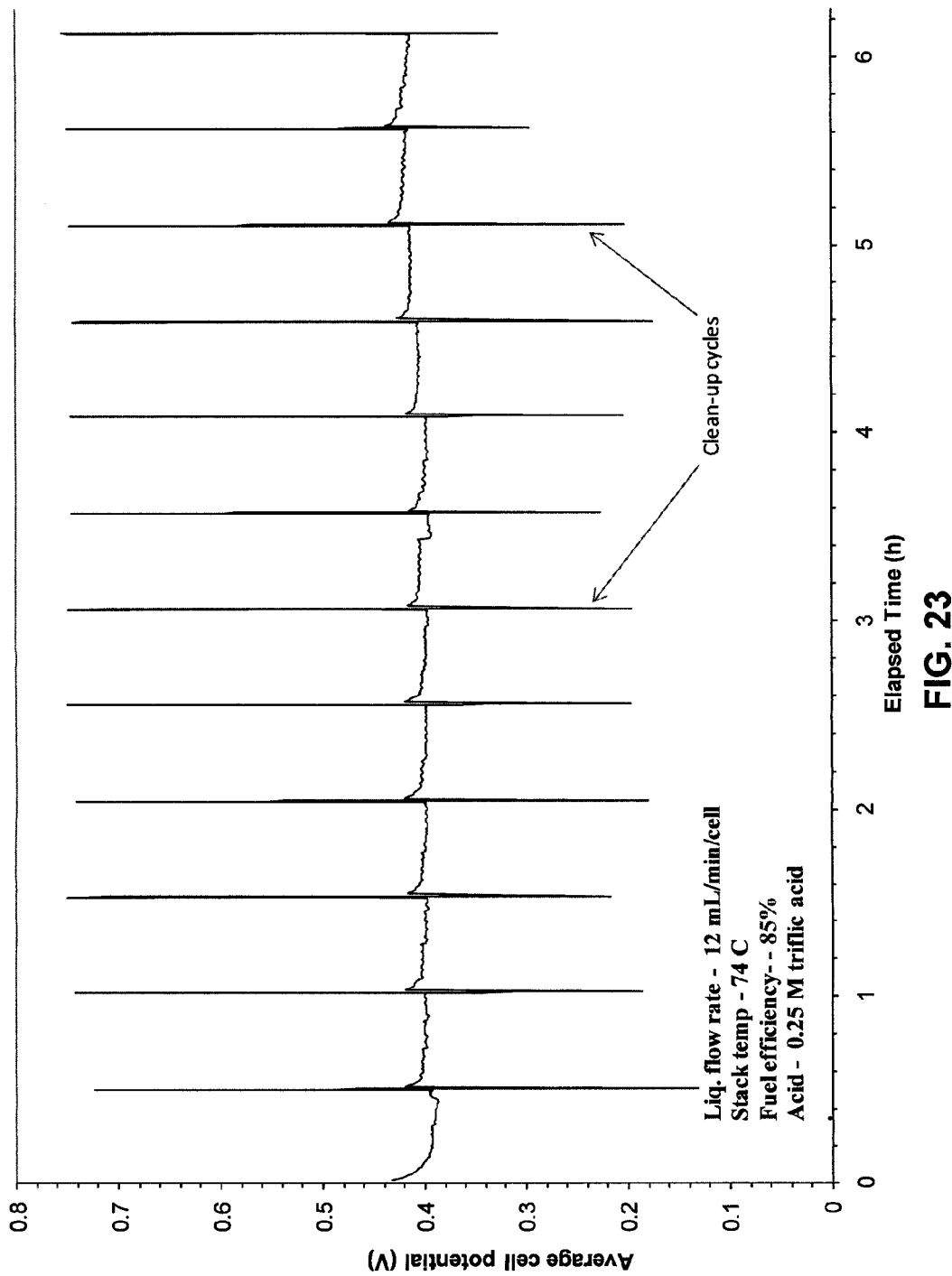
FIG. 23 is a graph of average single cell performance for a 13 cell acid based flowing fuel stream fuel cell stack performance at 200 mA/cm² current density as a function of time at 85% fuel efficiency and about 1.15 stoichiometric fuel flow rate of methanol at a fixed feed rate.

Additional experiments were carried out to determine if similar results could be achieved in a multicell stack. In a multicell stack, cell to cell uniformity and reagent distribution are important. As can be seen in FIG. 23, similar results were achieved in a 13 cell stack. Here we see 85+% fuel efficiency achieved at 200 $mA/cm^2$, and near 0.420V per cell with operating conditions inside the BOP operating window over a period of multiple hours and at steady state, right in the heart of the commercially desirable operating window.

Figure 24:
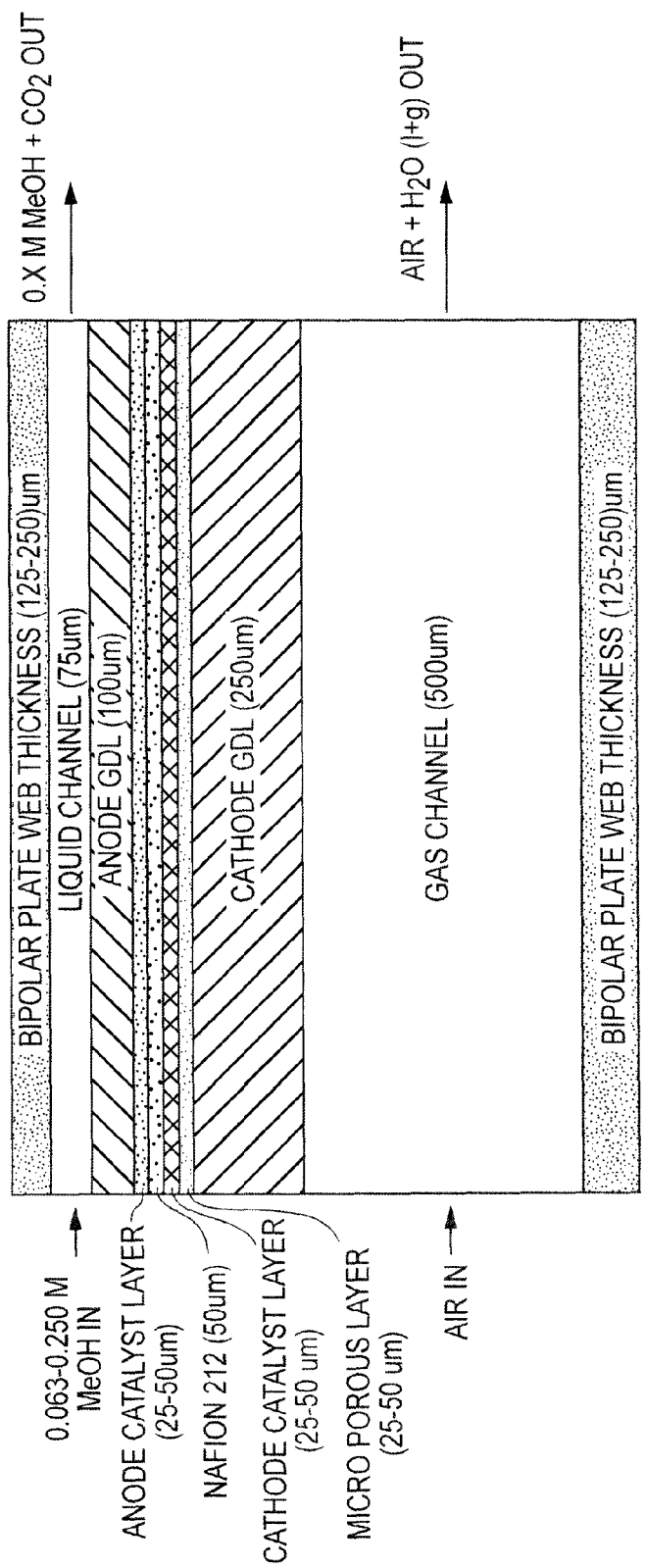
FIG. 24 is an illustration of a cross-section and actual Z dimensions of the improved DMFC cell with a thin liquid diffusion layer.

In another experiment we built an improved DMFC cell (a type of flowing fuel stream fuel cell) with identical catalyst layers and materials (see FIG. 24) that not only contained the parallel microfludic flow field, but also contained the thinnest commercially available diffusion layer (Torray TGP-030, 100 microns). Experiments were run at identical operating conditions as were performed on the control cell with the conventional diffusion layer (TGP-090, 300 microns). We observe that the IN performance of the improved DMFC becomes commercially desirable at a fuel concentration of 0.125 M methanol, 2 times less than the concentration needed for the microfluidic control cell with a conventional diffusion layer.

Figure 25:
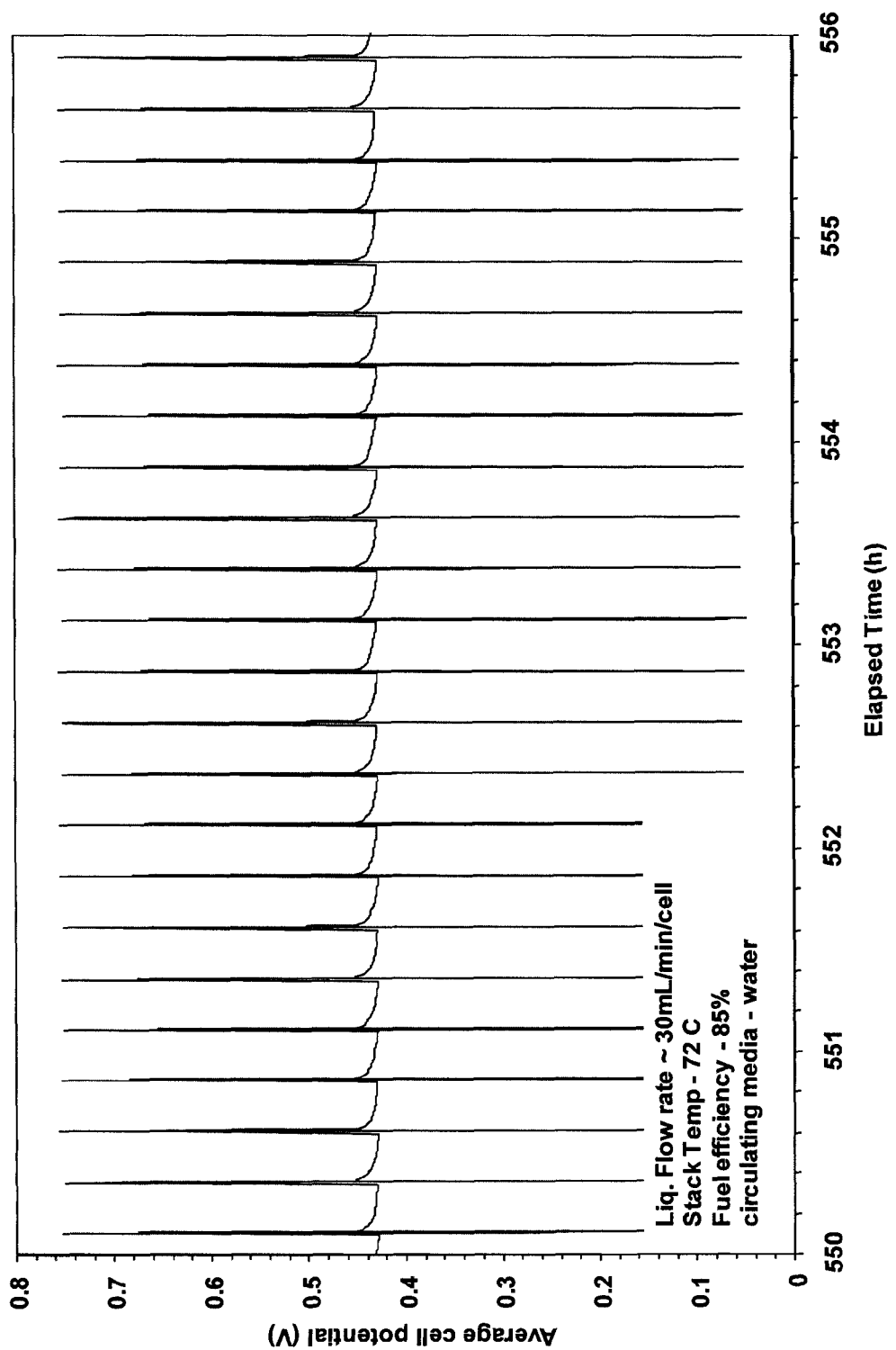
FIG. 25 is a graph of average single cell performance for a 25 cell water based flowing fuel stream fuel cell stack performance at about 100 mA/cm² current density as a function of time at 85% fuel efficiency and about 1.15 stoichiometric fuel flow rate of methanol at a fixed feed rate.
Figure 26:
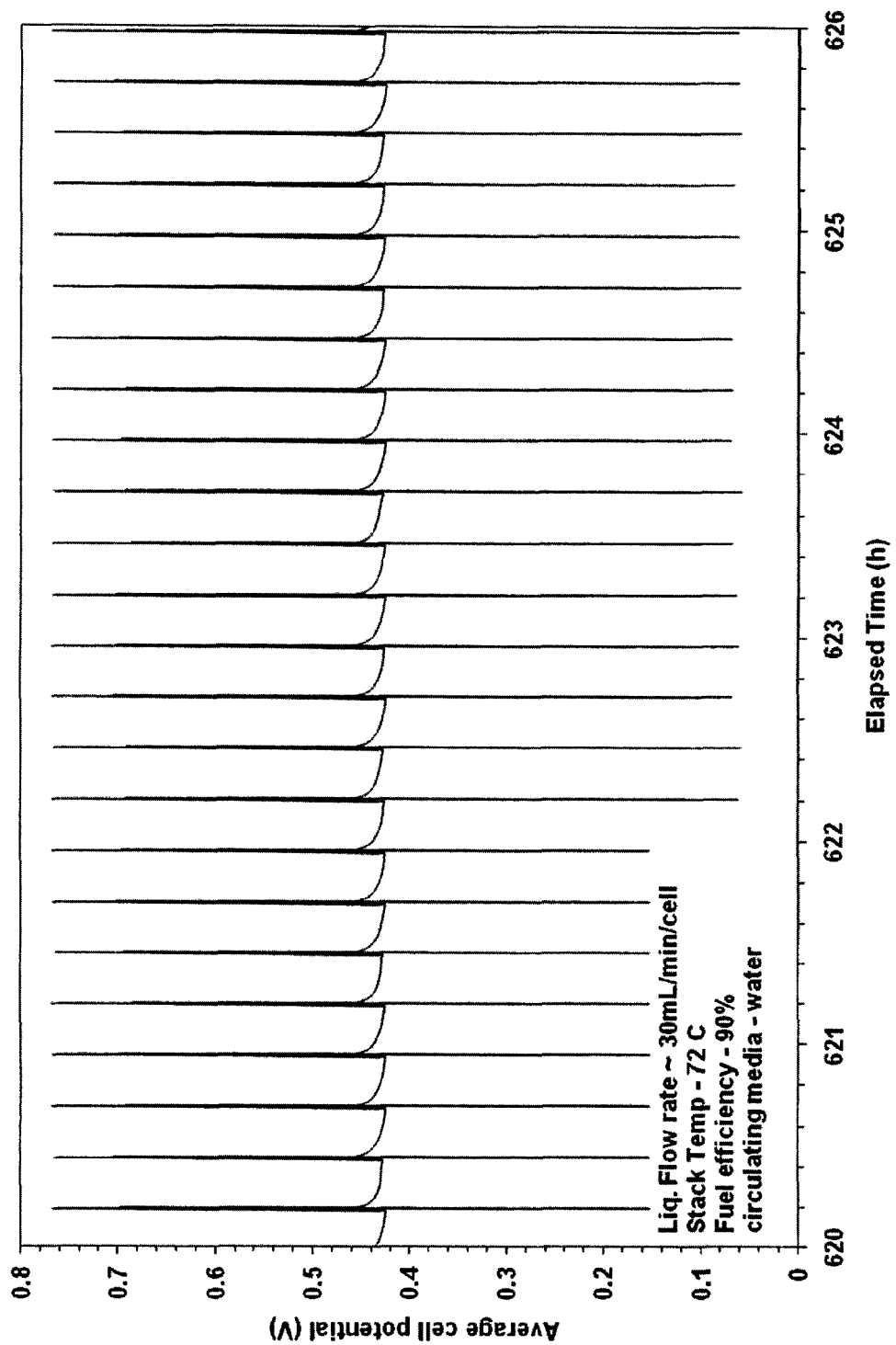
FIG. 26 is a graph of average single cell performance for a 25 cell water based flowing fuel stream fuel cell stack performance at about 100 mA/cm² current density as a function of time at 85% fuel efficiency and about 1.10 stoichiometric fuel flow rate of methanol at a fixed feed rate.

Additional experiments were carried out to determine if the divide could be scaled and transferred to a multicell stack. In a multicell stack with the expectation of scaling from the single cell results, cell to cell uniformity, dimensional tolerance, and reagent distribution are important. As can be seen in FIGS. 25 and 26, we achieved similar results in a 25 cell stack. Here we see 85+% fuel efficiency achieved at ~100 $mA/cm^2$, and near 0.450V per cell with operating conditions inside the BOP operating window over a period of multiple hours and at steady state, also right in the heart of the commercially desirable operating window, providing two stack architectures (an acid based and a water based flowing fuel stream fuel cell) to achieve similar result.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A method of generating electricity, comprising operating a fuel cell comprising
    an anode comprising an anode catalyst,
    a cathode, comprising
        a gas diffusion electrode, and
        a cathode catalyst on the gas diffusion electrode,
    a microfluidic channel contiguous with the anode, and
    a liquid comprising fuel and electrolyte, in the channel, wherein the concentration of the fuel in the liquid is 0.05-0.5M, the liquid flows through the fuel cell at a stoichiometric fuel flow rate of 3-30 mmol/(A·min.), the fuel cell produces a current density of at least 100 mA/cm$^2$, the microfluidic channel has a dimension less than 400 micrometers, and the liquid is recirculated through the channel.

2. The method of claim 1, wherein the fuel is methanol.

3. The method of claim 2, wherein the concentration of the fuel in the liquid is 0.1-0.3M.

4. The method of claim 2, wherein the concentration of the fuel in the liquid is 0.1-0.2M.

5. The method of claim 2, wherein the fuel cell produces a current density of at least 150 mA/cm$^2$.

6. The method of claim 3, wherein the liquid flows through the fuel cell at a stoichiometric fuel flow rate of 3-10 mmol/(A·min.).

7. The method of claim 3, wherein the liquid flows through the fuel cell at a stoichiometric fuel flow rate of 3-7 mmol/(A·min.).

8. The method of claim 3, wherein the fuel efficiency of the fuel cell is at least 70%.

9. The method of claim 3, wherein the fuel efficiency of the fuel cell is at least 80%.

10. The method of claim 3, wherein the fuel efficiency of the fuel cell is at least 85%.

11. The method of claim 3, wherein the fuel cell produces a current density of at least 150 mA/cm$^2$.

12. The method of claim 1, wherein the liquid flows through the fuel cell at a stoichiometric fuel flow rate of 3-10 mmol/(A·min.), and the fuel is methanol.

13. The method of claim 1, wherein the liquid flows through the fuel cell at a stoichiometric fuel flow rate of 3-7 mmol/(A·min.), and the fuel is methanol.

14. The method of claim 1, wherein the fuel efficiency of the fuel cell is at least 80%, and the fuel is methanol.

15. The method of claim 1, wherein the fuel efficiency of the fuel cell is at least 70%, and the fuel is methanol.

16. The method of claim 1, wherein the fuel efficiency of the fuel cell is at least 85%, and the fuel is methanol.

17. The method of claim 1, wherein the channel has a dimension less than 300 micrometers.

18. The method of claim 1, wherein the channel has a dimension less than 250 micrometers.

* * * * *

UNITED STATES PATENT AND TRADEMARK OFFICE
CERTIFICATE OF CORRECTION

| | | |
|---|---|---|
| PATENT NO. | : 8,163,429 B2 | Page 1 of 1 |
| APPLICATION NO. | : 12/366529 | |
| DATED | : April 24, 2012 | |
| INVENTOR(S) | : Larry J. Markoski et al. | |

It is certified that error appears in the above-identified patent and that said Letters Patent is hereby corrected as shown below:

On the Title Page, Item (56) References Cited

Column 2, Other Publications please delete "retrived" and insert --retrieved--

Page 3, Item (56) References Cited

Column 1, line 27, please delete "Naifion" and insert --Nafion--

Column 1, line 30, please delete "Naifion" and insert --Nafion--

Column 1, line 66, please delete "Halliday." and insert --Halliday--

Page 4, Item (56) References Cited

Column 2, line 41, please delete "Findamentals" and insert --Fundamentals--

Column 2, line 73, please delete "and fuel cell" and insert --and "fuel cell"--

Page 5, Item (56) References Cited

Column 1, line 2, please delete "fuel cell and oxygen carrier and "perfluror""" and insert --"fuel cell and oxygen carrier" and "perfluor"--

Column 1, line 6, please delete "perflurocarbons" and insert --"perfluorocarbons"--

Column 1, line 12, please delete "et al, °Solubility" and insert --et al., Solubility--

Column 2, line 38, please delete "A. J." and insert --J.--

Column 2, line 54, please delete "Lagmuir" and insert --Langmuir--

Page 6, Item (56) References Cited

Column 2, line 3, please delete "of Power of Sources" and insert --of Power Sources--

Signed and Sealed this
Fifteenth Day of December, 2015

Michelle K. Lee
*Director of the United States Patent and Trademark Office*